(12) United States Patent
    Zawistowski

(10) Patent No.:    US 12,600,431 B2
(45) Date of Patent:         Apr. 14, 2026

(54) VEHICLE SUSPENSION LINKAGE

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

( * ) Notice:  Subject to any disclaimer, the term of this patent is extended or adjusted under 35 U.S.C. 154(b) by 859 days.

(21) Appl. No.: 16/705,049

(22) Filed: Dec. 5, 2019

(65) Prior Publication Data

US 2021/0171151 A1      Jun. 10, 2021
US 2021/0371045 A9      Dec. 2, 2021

Related U.S. Application Data

(63) Continuation of application No. 15/925,165, filed on Mar. 19, 2018, now Pat. No. 11,173,983.

(Continued)

(51) Int. Cl.
    B62K 25/28          (2006.01)
    B62K 25/26          (2006.01)
(52) U.S. Cl.
    CPC ................................. B62K 25/286 (2013.01)
(58) Field of Classification Search
    CPC ...... B62K 25/286; B62K 25/26; B62K 25/28; B62K 25/20

(Continued)

(56) References Cited

U.S. PATENT DOCUMENTS 421,748 A      2/1890  McErlain
519,855 A      5/1894  Whitaker (Continued)

FOREIGN PATENT DOCUMENTS

CA      2293366 A1    12/1998
CA      2980086 A1     6/2005

(Continued)

OTHER PUBLICATIONS

Translation of DE 102004059187 to Soucek, published Jun. 14, 2006. (Year: 2006).*

(Continued)

*Primary Examiner* — Anne Marie M Boehler
(74) *Attorney, Agent, or Firm* — Dorsey & Whitney LLP

(57)                      ABSTRACT

Disclosed herein is a two-wheel vehicle suspension linkage. The suspension linkage includes a suspended body-1, a seatstay body-2, a link body-3, a chainstay body-4, a link body-5, and a link body-6 operatively coupled with one another. The link body-3 includes jointed connections with the suspended body-1 defining an IVC[1][3], the chainstay body-4 defining an IVC[3][4], and the link body-6 defining an IVC[3][6]. The chainstay body-4 includes an additional jointed connection with the seatstay body-2 defining an IVC[2][4]. The link body-5 includes additional jointed connections with suspended body-1 defining an IVC[1][5], seatstay body-2 defining an IVC[2][5], and the link body-6 defining an IVC[5][6]. A lower base line is defined by IVC[1][3] and IVC[3][4]. An upper base line is defined by IVC[1][5] and IVC[2][5]. The IVC[5][6] is located outside the upper and lower base lines. The suspension linkage includes a damper unit configured to resist movement between two or more of the suspended body-1, seatstay body-2, link body-3, chainstay body-4, link body-5, or link body-6.

21 Claims, 37 Drawing Sheets

Related U.S. Application Data

(60) Provisional application No. 62/473,259, filed on Mar. 17, 2017.

(58) Field of Classification Search
USPC ................................................. 280/284, 285
See application file for complete search history.

(56) References Cited

U.S. PATENT DOCUMENTS

| | | | |
|---|---|---|---|
| 591,306 | A | 10/1897 | Tolson |
| 630,232 | A | 8/1899 | Hughes et al. |
| 712,784 | A | 11/1902 | Ellis |
| 724,871 | A | 4/1903 | Hunter |
| 944,795 | A | 12/1909 | Leet et al. |
| 1,043,269 | A | 11/1912 | Stephenson |
| 1,068,583 | A | 7/1913 | Harley |
| 1,168,702 | A | 1/1916 | Babis, Jr. |
| 1,220,606 | A | 3/1917 | Chelstrom |
| 1,261,440 | A | 4/1918 | Rigby |
| 1,283,030 | A | 10/1918 | Ashton |
| 1,369,356 | A | 2/1921 | Rigby |
| 2,173,520 | A | 9/1939 | Klatt |
| 3,803,933 | A | 4/1974 | Huret et al. |
| 3,813,955 | A | 6/1974 | Huret et al. |
| 3,847,028 | A | 11/1974 | Bergles |
| 3,917,313 | A | 11/1975 | Smith et al. |
| 3,977,697 | A | 8/1976 | MacPike et al. |
| 4,058,181 | A | 11/1977 | Buell |
| 4,076,271 | A | 2/1978 | Doncque |
| 4,114,918 | A | 9/1978 | Lutz |
| 4,241,617 | A | 12/1980 | Fujimoto et al. |
| 4,265,329 | A | 5/1981 | de Cortanze |
| 4,279,172 | A | 7/1981 | Nagano et al. |
| 4,322,088 | A | 3/1982 | Miyakoshi et al. |
| 4,360,214 | A | 11/1982 | Isono |
| 4,408,674 | A | 10/1983 | Boyesen |
| 4,410,196 | A | 10/1983 | Ribi |
| 4,415,057 | A | 11/1983 | Yamaguchi |
| 4,429,760 | A | 2/1984 | Koizumi et al. |
| 4,433,747 | A | 2/1984 | Offenstadt |
| 4,463,824 | A | 8/1984 | Boyesen |
| 4,463,964 | A | 8/1984 | Takayanagi et al. |
| 4,485,885 | A | 12/1984 | Fukuchi |
| 4,500,302 | A | 2/1985 | Crepin |
| 4,506,755 | A | 3/1985 | Tsuchida et al. |
| 4,540,193 | A | 9/1985 | Noda et al. |
| 4,544,044 | A | 10/1985 | Boyesen |
| RE32,059 | E | 12/1985 | Nagano |
| 4,558,761 | A | 12/1985 | Boyesen |
| 4,561,519 | A | 12/1985 | Omori |
| 4,574,909 | A | 3/1986 | Ribi |
| 4,582,343 | A | 4/1986 | Waugh |
| 4,586,913 | A | 5/1986 | Nagano |
| 4,596,302 | A | 6/1986 | Suzuki et al. |
| 4,619,633 | A | 10/1986 | Nagano |
| 4,621,706 | A | 11/1986 | Boyesen |
| 4,671,525 | A | 6/1987 | Ribi |
| 4,673,053 | A | 6/1987 | Tanaka et al. |
| 4,679,811 | A | 7/1987 | Shuler |
| 4,702,338 | A | 10/1987 | Trema |
| 4,735,277 | A | 4/1988 | Prince |
| 4,744,434 | A | 5/1988 | Miyakoshi et al. |
| 4,789,042 | A | 12/1988 | Pitts |
| 4,789,174 | A | 12/1988 | Lawwill |
| RE32,924 | E | 5/1989 | Nagano |
| 4,830,391 | A | 5/1989 | Silk |
| 4,878,884 | A | 11/1989 | Romano |
| 4,951,791 | A | 8/1990 | Creixell |
| 5,011,459 | A | 4/1991 | Van De Vel |
| 5,121,937 | A | 6/1992 | Lawwill |
| 5,205,572 | A | 4/1993 | Buell et al. |
| 5,226,674 | A | 7/1993 | Buell et al. |
| 5,244,224 | A | 9/1993 | Busby |
| 5,259,637 | A | 11/1993 | Busby |
| 5,282,517 | A | 2/1994 | Prince |
| 5,295,702 | A | 3/1994 | Buell |
| 5,299,820 | A | 4/1994 | Lawwill |
| 5,306,036 | A | 4/1994 | Busby |
| 5,332,246 | A | 7/1994 | Buell |
| 5,335,929 | A | 8/1994 | Takagaki et al. |
| 5,354,085 | A | 10/1994 | Gally |
| 5,356,165 | A | 10/1994 | Kulhawik et al. |
| 5,360,078 | A | 11/1994 | Rifenburg et al. |
| 5,370,411 | A | 12/1994 | Takamiya et al. |
| 5,409,248 | A | 4/1995 | Williams |
| 5,409,249 | A | 4/1995 | Busby |
| 5,417,445 | A | 5/1995 | Smart |
| 5,429,380 | A | 7/1995 | Lawwill |
| 5,435,584 | A | 7/1995 | Buell |
| 5,441,292 | A | 8/1995 | Busby |
| 5,452,910 | A | 9/1995 | Harris |
| 5,474,318 | A | 12/1995 | Castellano |
| 5,498,013 | A | 3/1996 | Hwang |
| 5,509,679 | A | 4/1996 | Leitner |
| 5,553,881 | A | 9/1996 | Klassen et al. |
| 5,570,896 | A | 11/1996 | Collins |
| 5,597,366 | A | 1/1997 | Ozaki |
| 5,607,367 | A | 3/1997 | Patterson |
| 5,611,557 | A | 3/1997 | Farris et al. |
| 5,628,524 | A | 5/1997 | Klassen et al. |
| 5,658,001 | A | 8/1997 | Blanchard |
| 5,678,837 | A | 10/1997 | Leitner |
| 5,688,200 | A | 11/1997 | White |
| 5,772,228 | A | 6/1998 | Owyang |
| 5,791,674 | A | 8/1998 | D'Aluisio et al. |
| 5,816,966 | A | 10/1998 | Yang et al. |
| 5,826,899 | A | 10/1998 | Klein et al. |
| 5,899,480 | A | 5/1999 | Leitner |
| 5,901,974 | A | 5/1999 | Busby et al. |
| 5,957,473 | A | 9/1999 | Lawwill |
| 6,012,999 | A | 1/2000 | Patterson |
| 6,076,845 | A | 6/2000 | Lawwill et al. |
| 6,086,080 | A | 7/2000 | Scheffer |
| 6,102,421 | A | 8/2000 | Lawwill et al. |
| 6,131,934 | A | 10/2000 | Sinclair |
| 6,203,042 | B1 | 3/2001 | Wilcox |
| 6,206,397 | B1 | 3/2001 | Klassen et al. |
| 6,244,610 | B1 | 6/2001 | Kramer-Massow |
| 6,406,048 | B1 | 6/2002 | Castellano |
| 6,439,593 | B1 | 8/2002 | Tseng |
| 6,450,520 | B1 | 9/2002 | Girard |
| 6,488,301 | B2 | 12/2002 | Klassen et al. |
| 6,543,799 | B2 | 4/2003 | Miyoshi |
| 6,629,903 | B1 | 10/2003 | Kondo |
| 6,712,374 | B2 | 3/2004 | Assier |
| 6,793,230 | B1 | 9/2004 | Cheng |
| 6,843,494 | B2 | 1/2005 | Lam |
| 6,845,998 | B2 | 1/2005 | Probst |
| 6,871,867 | B2 | 3/2005 | Parigian |
| 6,877,591 | B1 | 4/2005 | Hso |
| 6,886,846 | B2 | 5/2005 | Carroll |
| 6,902,504 | B2 | 6/2005 | Fukuda |
| 6,926,298 | B2 | 8/2005 | Ellsworth et al. |
| 6,955,373 | B2 | 10/2005 | Chang |
| 6,969,081 | B2 | 11/2005 | Whyte |
| 7,025,698 | B2 | 4/2006 | Wickliffe |
| 7,048,292 | B2 | 5/2006 | Weagle |
| 7,066,481 | B1 | 6/2006 | Soucek |
| RE39,159 | E | 7/2006 | Klassen et al. |
| 7,097,190 | B2 | 8/2006 | Matsumoto et al. |
| 7,100,930 | B2 | 9/2006 | Saiki |
| 7,104,908 | B2 | 9/2006 | Nagano |
| 7,128,329 | B2 | 10/2006 | Weagle |
| 7,131,511 | B2 | 11/2006 | Arnold |
| 7,210,695 | B2 | 5/2007 | Griffiths |
| 7,216,883 | B2 | 5/2007 | Oconnor |
| 7,296,815 | B2 | 11/2007 | Ellsworth et al. |
| 7,350,797 | B2 | 4/2008 | Carroll |
| 7,377,535 | B2 | 5/2008 | Chamberlain |
| 7,392,999 | B2 | 7/2008 | Oconnor |
| 7,395,892 | B2 | 7/2008 | Alonzo |
| 7,413,208 | B2 | 8/2008 | Weng |
| 7,427,077 | B2 | 9/2008 | Lesage et al. |
| 7,467,803 | B2 | 12/2008 | Buckley |

(56) References Cited

U.S. PATENT DOCUMENTS

| | | |
|---|---|---|
| 7,494,146 B2 | 2/2009 | Tseng |
| 7,556,276 B1 | 7/2009 | Dunlap |
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,971,892 B2 | 7/2011 | Sasnowski et al. |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,168,977 B2 | 10/2015 | Mcleay |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,359,039 B2 | 6/2016 | Lumpkin |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy |
| 9,598,140 B2 | 3/2017 | Berthold |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,908,583 B2 | 3/2018 | Matheson et al. |
| 9,919,765 B2 | 3/2018 | Wickliffe et al. |
| 9,988,122 B2 | 6/2018 | Pedretti |
| 10,011,318 B2 | 7/2018 | Beale |
| 10,099,739 B2 | 10/2018 | Nishikawa |
| 10,160,512 B2 | 12/2018 | Beale |
| 10,336,398 B2 | 7/2019 | Hudec |
| 10,343,742 B2 | 7/2019 | Zawistowski |
| 10,363,988 B2 | 7/2019 | Buckley |
| 10,640,169 B2 | 5/2020 | Pedretti |
| 10,703,433 B2 | 7/2020 | Lauer |
| 10,737,742 B2 | 8/2020 | Soncrant |
| 10,926,830 B2 | 2/2021 | Zawistowski |
| 11,052,964 B2 | 7/2021 | Wallace |
| 2001/0024024 A1 | 9/2001 | Klassen et al. |
| 2003/0038450 A1 | 2/2003 | Lam |
| 2003/0090082 A1 | 5/2003 | Ellsworth et al. |
| 2003/0160421 A1 | 8/2003 | Assier |
| 2003/0193163 A1 | 10/2003 | Chamberlain et al. |
| 2003/0193164 A1 | 10/2003 | Parigian |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0022428 A1 | 2/2006 | Whyte |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0261556 A1 | 10/2009 | Beale et al. |
| 2009/0261557 A1* | 10/2009 | Beale ..................... B62K 19/18 |
| | | 280/284 |
| 2009/0278331 A1 | 11/2009 | Graney |

(56)  References Cited

U.S. PATENT DOCUMENTS

| | | |
|---|---|---|
| 2009/0283986 A1 | 11/2009 | Falke |
| 2009/0322055 A1 | 12/2009 | Arraiz |
| 2010/0059965 A1 | 3/2010 | Earle |
| 2010/0102531 A1 | 4/2010 | Graney et al. |
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0115181 A1 | 5/2011 | Weagle |
| 2011/0140387 A1 | 6/2011 | Andal et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |
| 2013/0285346 A1 | 10/2013 | Wimmer |
| 2014/0001729 A1 | 1/2014 | Hudec |
| 2014/0015220 A1 | 1/2014 | Talavasek |
| 2014/0042726 A1 | 2/2014 | Canfield et al. |
| 2014/0060950 A1 | 3/2014 | Beutner |
| 2014/0109728 A1 | 4/2014 | Mcrorie, III |
| 2014/0167385 A1 | 6/2014 | Gogo et al. |
| 2014/0217697 A1 | 8/2014 | Buckley |
| 2014/0318306 A1 | 10/2014 | Tetsuka |
| 2015/0001829 A1 | 1/2015 | Berthold |
| 2015/0035241 A1 | 2/2015 | Mcleay |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0257371 A1 | 9/2016 | Droux |
| 2016/0272273 A1 | 9/2016 | Colegrove et al. |
| 2016/0280317 A1 | 9/2016 | Hoogendoorn |
| 2016/0311493 A1 | 10/2016 | Scheffer |
| 2016/0318582 A1 | 11/2016 | Johnson et al. |
| 2016/0375956 A1 | 12/2016 | Talavasek et al. |
| 2017/0101152 A1 | 4/2017 | Pedretti |
| 2017/0151996 A1* | 6/2017 | Southall ................. B62K 25/28 |
| 2018/0037295 A1* | 2/2018 | Beale .................... B62K 25/30 |
| 2018/0072378 A1 | 3/2018 | Talavasek et al. |
| 2018/0072379 A1 | 3/2018 | Talavasek et al. |
| 2018/0072380 A1 | 3/2018 | Talavasek et al. |
| 2018/0072739 A1 | 3/2018 | Goldman et al. |
| 2018/0140387 A1 | 5/2018 | Richard |
| 2018/0148123 A1 | 5/2018 | Neilson |
| 2018/0229798 A1 | 8/2018 | Hoogendoorn et al. |
| 2018/0265165 A1 | 9/2018 | Zawistowski |
| 2018/0297661 A1 | 10/2018 | Beale |
| 2018/0304958 A1 | 10/2018 | Madsen |
| 2019/0039682 A1 | 2/2019 | Zawistowski |
| 2019/0144069 A1 | 5/2019 | Beale |
| 2019/0300096 A1 | 10/2019 | Chamberlain et al. |
| 2019/0300097 A1 | 10/2019 | Chamberlain et al. |
| 2020/0070930 A1 | 3/2020 | Buckley |
| 2020/0247500 A1 | 8/2020 | Zawistowski |
| 2021/0046996 A1 | 2/2021 | Beale |
| 2021/0269117 A1 | 9/2021 | Zawistowski |
| 2022/0153381 A1 | 5/2022 | Zawistowski et al. |
| 2022/0306240 A1 | 9/2022 | Talavasek et al. |
| 2023/0070334 A1 | 3/2023 | Zawistowski |

FOREIGN PATENT DOCUMENTS

| | | | |
|---|---|---|---|
| DE | 692011 C | 6/1940 | |
| DE | 9405076 U1 | 5/1994 | |
| DE | 9416803 U1 | 12/1994 | |
| DE | 4435482 A1 | 4/1996 | |
| DE | 102004059187 A1 * | 6/2006 | .......... B62K 25/286 |
| DE | 102019002456 A1 | 10/2019 | |
| DE | 102021104753 A1 | 9/2021 | |
| EP | 0422324 A1 | 4/1991 | |
| EP | 0723907 B1 | 7/1998 | |
| EP | 0941917 A2 | 9/1999 | |
| EP | 1026073 A1 | 8/2000 | |
| EP | 1060979 A2 | 12/2000 | |
| EP | 1238900 A2 | 9/2002 | |
| EP | 2540609 A1 | 1/2013 | |
| EP | 2706002 A1 | 3/2014 | |
| EP | 1799534 B1 | 8/2014 | |
| EP | 2812234 A1 | 12/2014 | |
| FR | 541520 A | 7/1922 | |
| FR | 933079 A | 4/1948 | |
| FR | 2774966 A1 | 8/1999 | |
| GB | 17336 | 10/1913 | |
| GB | 2086319 A | 5/1982 | |
| GB | 2338216 A | 12/1999 | |
| GB | 2522461 A | 7/2015 | |
| GB | 2525870 B | 1/2017 | |
| GB | 2590808 B | 7/2022 | |
| GB | 2594780 B | 7/2022 | |
| GB | 2605244 A | 9/2022 | |
| JP | H0725378 A | 1/1995 | |
| NL | 2027223 B1 | 2/2022 | |
| WO | 9422710 A1 | 10/1994 | |
| WO | 9803390 A1 | 1/1998 | |
| WO | 9818671 A1 | 5/1998 | |
| WO | 9856645 A1 | 12/1998 | |
| WO | 9965760 A1 | 12/1999 | |
| WO | 9944880 A9 | 1/2000 | |
| WO | 03010042 A1 | 2/2003 | |
| WO | 03018392 A1 | 3/2003 | |
| WO | 03021129 A1 | 3/2003 | |
| WO | 2004045940 A2 | 6/2004 | |
| WO | 2005030564 A2 | 4/2005 | |
| WO | 2005030565 A1 | 4/2005 | |
| WO | 2005090149 A1 | 9/2005 | |
| WO | 2006005687 A1 | 1/2006 | |
| WO | 2006032052 A2 | 3/2006 | |
| WO | 2006061052 A1 | 6/2006 | |
| WO | 2008025950 A1 | 3/2008 | |
| WO | 2008130336 A1 | 10/2008 | |
| WO | 2009121936 A1 | 10/2009 | |
| WO | 2010033174 A1 | 3/2010 | |
| WO | 2010103057 A1 | 9/2010 | |
| WO | 2010121267 A1 | 10/2010 | |
| WO | 2012024697 A1 | 2/2012 | |
| WO | 2012027900 A1 | 3/2012 | |
| WO | 2012063098 A1 | 5/2012 | |
| WO | 2012122634 A1 | 9/2012 | |
| WO | 2013028138 A2 | 2/2013 | |
| WO | 2013078436 A1 | 5/2013 | |
| WO | 2013119616 A1 | 8/2013 | |
| WO | 2013142855 A2 | 9/2013 | |
| WO | 2013192622 A1 | 12/2013 | |
| WO | 2014009019 A1 | 1/2014 | |
| WO | 2014029759 A1 | 2/2014 | |
| WO | 2014202890 A1 | 12/2014 | |
| WO | 2015004490 A1 | 1/2015 | |
| WO | 2015196242 A1 | 12/2015 | |
| WO | 2016036237 A1 | 3/2016 | |
| WO | 2016097433 A1 | 6/2016 | |
| WO | 2016134471 A1 | 9/2016 | |
| WO | 2018027192 A1 | 2/2018 | |
| WO | 2018170505 A1 | 9/2018 | |
| WO | 2019010394 A1 | 1/2019 | |

(56)  References Cited

FOREIGN PATENT DOCUMENTS

| WO | 2021133996 A1 | 7/2021 |
| WO | 2021174088 A1 | 9/2021 |
| WO | 2021257865 A1 | 12/2021 |
| WO | 2023039543 A1 | 3/2023 |

OTHER PUBLICATIONS

EPO, "Extended European Search Report for EP 18768549.0", mailed Feb. 8, 2021.
"Netherland s Intellectual Property Office, Search Report and Opinion", issued Nov. 15, 2021, for Dutch Application No. 2027668, 24 pages.
"Spotted: A New Commencal Supreme Breaks Cover at the Portugal Cup", Article published on Mar. 7, 2022.
"What's Going On With Commencal's Prototype DH Race Bike?", Article published on Jun. 9, 2021.
Aston, Paul, "Canyon Sender—Review", https://www.pinkbike.com/news/canyon-sender-review-2017.html, Mar. 13, 2017, 33 pages.
Aston, Paul, "Robot Bike Co R160—First Look", https://www.pinkbike.com/news/robot-bike-co-r160-first-look-2016.html (Accessed Jun. 30, 2020), May 27, 2016, 39 pages.
Author Unknown, "Sarrus Linkage", Wikipedia, http://en.wikipedia.org/wiki/Sarrus_linkage, 1 page, at least as early as Aug. 20, 2010.
Chen, "Design of Structural Mechanisms", A dissertation submitted for the degree of Doctor of Philosophy in the Department of Engineering Science at the University of Oxford, St Hugh's College, 2003, 160 Pages.
Cunningham, Richard, "First Look: Felt 2014", https://www.pinkbike.com/news/First-Look-Felt-2014.html (Accessed Jun. 30, 2020), Aug. 7, 2013, 20 pages.
DB Bikes, "Felt Compulsion 50 Mountain Bike 2017", https://downhillbikesforsale.com/products/Felt-Compulsion-50-Mountain-Bike-2017.html, (Accessed Jun. 30, 20), 9 pages.
EP, "European Extended Search Report", Application No. 12851566.5, May 28, 2015, 7 pages.
EP, "Extended European Search Report", Application No. 11818903.4, Sep. 15, 2015, 8 pages.
EP, "Supplementary Search Report", Application No. 05798319.9, Dec. 11, 2009, 1 page.
Foale, Tony, "Motorcycle Handling and Chassis Design: The Art and Science", https://epdf.pub/motorcycle-handling-and-chassis-design-the-art-and-science.html, Mar. 2002, 498 pages.
Giant Bicycles, "Anthem Advanced Pro 29 1", https://www.giant-bicycles.com/us/anthem-advanced-pro-29-1-2021, (Accessed Sep. 14, 2020), 8 pages.
Kavik Bicycles, "Kavik Regen Suspension", (Accessed Jun. 30, 2020), 2 pages.
Li, "Movable Spatial 6R Linkages", XP055249075, Retrieved from the Internet on Oct. 13, 2016: URL:http://people.ricam.oeaw.ac.at/z.li/pu blications/talks/6.pdf, Oct. 2, 2013, 48 Pages.
Mountain Bike Action, "Bike Test: Felt Compulsion 1 27.5", https://mbaction.com/oct-felt-compulsion-1-27-5/, (Accessed Jun. 30, 2020), 10 pages.
Overholt, Zach, Bikerumor , "IB17: Tantrum Cycles makes it to production, gets noticed by Adventure Capitalists", https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
PCT, "International Search Report and Written Opinion", Application No. PCT/US2020/016265, Jun. 19, 2020, 18 pages.
PCT, "International Search Report and Written Opinion", Application No. PCT/US2011/048696, Dec. 14, 2011, 10 pages.
PCT, "International Search Report and Written Opinion", Application No. PCT/US2015/065090, Feb. 12, 2016, 11 pages.
PCT, "International Search Report and Written Opinion", Application No. PCT/US2012/066427, Jan. 18, 2013, 12 pages.
PCT, "International Search Report and Written Opinion", Application No. PCT/US2018/041054, Sep. 28, 2018, 12 pages.
PCT, "International Search Report and Written Opinion", Application No. PCT/US2018/023124, Aug. 2, 2018, 14 pages.
PCT, "International Search Report and Written Opinion", Application No. PCT/US2005/33410, Nov. 29, 2006, 5 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, Dan, "First Ride: 2021 Canyon Sender CFR", https://www.pinkbike.com/news/first-ride-2021-canyon-sender-cfr.html, Aug. 11, 2020, 23 pages.
Sarrut, "Note Sur La Transformation Des Mouvements Rectilignes Alternatifs", Académie des Sciences, 36, 1036-1038, 1853, 5 Pages.
U.S. Patent and Trademark Office, "U.S. Appl. No. 62/815,675", filed Mar. 8, 2019, Mar. 8, 2019.
U.S. Patent and Trademark Office, "U.S. Appl. No. 62/833,496", filed Apr. 12, 2019, Apr. 12, 2019.
U.S. Patent and Trademark Office, "U.S. Appl. No. 62/867,169", filed Jun. 26, 2019, Jun. 26, 2019.
Zawistowski, "Quantifying Wheel Path", Think Turquoise, http://www.yeticycles.com/blog/?p=237 [Retrieved from the Internet on Jul. 27, 2011], Jul. 18, 2010, 4 Pages.
Worsey, "Forbidden Druid Review—Are high pivots just for downhill?," Enduro Mountainbike Magazine, Jun. 16, 2021, Mar. 4, 2019, [retrieved on Jun. 16, 2021] from the Internet: <url: https://enduro-mtb.com/en/forbiden-druid-review/>, 15 pages.
PCT International Search Report & Written Opinion mailed Jul. 16, 2021, for PCT Application No. PCT/US2021/020034, 16 pages.
U.K. Intellectual Property Office, "Combined Search and Examination Report under Sections 17 and 18(3)," mailed on Aug. 25, 2021, for U.K. Application No. GB2102854.3, 8 pages.
U.S. Patent and Trademark Office, Final Office Action mailed on Jul. 22, 2021, for U.S. Appl. No. 15/925,165, 15 pages.
Netherlands Patent Office, Written Opinion and Search Report mailed Sep. 24, 2021, in Dutch with English portions, for Netherlands Application No. 2027223, 17 pages.
GB IPO, "Combined Search and Exam Report", App. No. 2020235.4, Apr. 21, 2021, 6 pages.
MTBR: Mountain Bike Review Forum, "Jayem Discussion Starter #1—Knolly Suing Intense for Building Bikes with Seat-tubes in Front of the BB", https://www.mtbr.com/threads/knolly-suing-intense-for-building-bikes-with-seat-tubes-in-front-of-the-bb.1173867/, Jan. 2021, 16 pages.
U.K. Intellectual Property Office, "Search under Section 17," mailed Jul. 7, 2022, for U.K. Application No. GB2208682.1, 3 pages.
European Patent Office, "Communication Pursuant to Article 94(3) EPC," mailed Jul. 8, 2022, for European Application No. 18768549.0, 6 pages.
European Patent Office, "Extended European Search Report," mailed Oct. 4, 2022, for European Application No. 20747607.8, 6 pages.
German Patent Office, "Examination Notice and Search Report," mailed Apr. 13, 2022, for German Application No. 10 2020 134 843.6, 7 pages.
U.S. Patent and Trademark Office, "International Search Report," mailed Jan. 20, 2023, for PCT Application No. PCT/US2022/076232, 2 pages.
U.S. Patent and Trademark Office, "Written Opinion," mailed Jan. 20, 2023, for PCT Application No. PCT/US2022/076232, 11 pages.
Brown, "Preview: Nicolai Bikes Available in the U.S.: The belt-drive, big-hit bikes will be distributed by Nicolai USA," Bike Mag, Jun. 3, 2014, 9 pages.
Overholt, "SOC 14: Effigear Calls in the Cavalerie for new Gear Box Bikes in the US," Bike Rumor, Apr. 23, 2014, 16 pages.
European Patent Office, European Extended Search Report mailed Sep. 21, 2022, for European Application No. 20747607.8, 2 pages.
Netherlands Patent Office, "Written Opinion and Search Report," mailed Feb. 22, 2023, for Dutch Application No. 2029897, in Dutch with partial English translation, 12 pages.
Outside Magazine, "Robot Bike Co R160 Custom—Review," Author: Paul Aston, Oct. 17, 2016, 46 pages.
Nicolai Maschinenbau, "History of Nicolai," Gesellschaft für Zweirad und Maschinenbau mbh, at least as early as 1995, 3 pages.

(56) References Cited

OTHER PUBLICATIONS

Nicolai, "Nicolai Trombone Frame," at least as early as 1995, 6
pages.

\* cited by examiner

VEHICLE SUSPENSION LINKAGE

CROSS REFERENCE TO RELATED APPLICATIONS

This application is a continuation application of U.S. nonprovisional application Ser. No. 15/925,165, filed Mar. 19, 2018, entitled "Vehicle Suspension Linkage," which claims the benefit of priority pursuant to 35 U.S.C. § 119(e) of U.S. provisional application No. 62/473,259, filed 17 Mar. 2017, entitled "Vehicle Suspension Linkage," both of which are hereby incorporated herein by reference in their entirety.

TECHNICAL FIELD

The technology described herein relates to vehicle suspension systems, specifically, to linkages within a vehicle suspension system.

BACKGROUND

Vehicle suspension terminology depends upon the reference frame considered. Consider a static vehicle that has two wheels, each of which are supported by the ground and a suspended body which is operatively coupled to each wheel. In a two-wheel vehicle, such as a bicycle, electric bicycle or pedelec or motorcycle, etc. there is typically one rear wheel known as the driven wheel which includes a driven cog. There is also one front wheel. A driving cog is operatively coupled to the suspended body. A driving chain or belt connects the driven cog and the driving cog. The driving cog, which is connected to the driven cog via the driving chain/belt, is rotated by a crank under human power, or by a motor, or by combined motor and human power. The reaction of the driven wheel and the ground causes the vehicle to accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are operatively coupled to each other in a manner that allows the bodies to flex, cam, rotate or translate relative to one another. The linkage constrains the movement in which the driven wheel and brake may travel relative to the suspended body. A combination of damper(s) and/or spring(s) is/are typically arranged to react to relative motion between the suspended body and the driven wheel. The linkage is highly responsible for the vehicles dynamic response to acceleration and deceleration as well as the mechanical advantage over the shock/damper.

With a typical 4-bar linkage rear suspension system, the acceleration response, the deceleration response, and the mechanical advantage over the shock/damper are significantly dependent upon one another. This makes it difficult to optimize all three, and as a result these designs require compromise in the quality of the ride.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein relates to vehicle suspension linkages. In one embodiment, a two-wheel vehicle suspension linkage is provided. The suspension includes a suspended body-1, a seatstay body-2, a link body-3, a chainstay body-4, a link body-5, and a link body-6 operatively coupled with one another. The link body-3 includes jointed connections with the suspended body-1 defining an IVC[1][3], the chainstay body-4 defining an IVC[3][4], and the link body-6 defining an IVC[3][6]. The chainstay body-4 includes an additional jointed connection with the seatstay body-2 defining an IVC[2][4]. The link body-5 includes additional jointed connections with suspended body-1 defining an IVC[1][5], seatstay body-2 defining an IVC[2][5], and the link body-6 defining an IVC[5][6]. A lower base line is defined by IVC[1][3] and IVC[3][4]. An upper base line is defined by IVC[1][5] and IVC[2][5]. IVC[5][6] is located outside the upper and lower base lines. The suspension includes a damper unit configured to resist movement between two or more of the suspended body-1, seatstay body-2, link body-3, chainstay body-4, link body-5, or link body-6.

In yet another embodiment, a two-wheel vehicle suspension linkage is provided. The suspension includes a suspended body-1, a seatstay body-2, a link body-3, a chainstay body-4, a link body-5, and a link body-6 operatively coupled with one another. The link body-3 includes jointed connections with the suspended body-1 defining an IVC[1][3] and the chainstay body-4 defining an IVC[3][4]. The chainstay body-4 includes additional jointed connections with the seatstay body-2 defining an IVC[2][4] and the link body-6 defining an IVC[4][6]. The link body-5 includes additional jointed connections with suspended body-1 defining an IVC[1][5], seatstay body-2 defining an IVC[2][5], and the link body-6 defining an IVC[5][6]. The IVC[3][4] migration path reverses as the suspension moves from the extended state at least partially to the compressed state. The suspension includes a damper unit configured to resist movement between two or more of the suspended body-1, seatstay body-2, link body-3, chainstay body-4, link body-5, or link body-6.

In yet another embodiment, a 6-bar suspension linkage in provided. The suspension includes a plurality of linkage bodies including a suspended body-1, a seatstay body-2, a link body-3, a chainstay body-4, a link body-5, and a link body-6, with the plurality of linkage bodies operatively coupled with one another. No more than two of the plurality of linkage bodies, that define the wheel path, have jointed connection to the suspended body-1. The plurality of linkage bodies define a plurality of IVCs defining a plurality of IVC migration paths. At least one IVC migration path reverses as the suspension moves from the extended state at least partially to the compressed state.

In yet another embodiment, a two-wheel vehicle suspension linkage is provided. The suspension includes a suspended body-1, a seatstay body-2, a link body-3, a chainstay body-4, a link body-5, and a link body-6 operatively coupled with one another. The link body-3 includes jointed connections with the suspended body-1 defining an IVC[1][3], the chainstay body-4 defining an IVC[3][4], and the link body-6 defining an IVC[3][6]. The chainstay body-4 includes additional jointed connections with the seatstay body-2 defining an IVC[2][4]. The link body-5 includes additional jointed connections with suspended body-1 defining an IVC[1][5], seatstay body-2 defining an IVC[2][5], and the link body-6 defining an IVC[5][6]. The line defined by IVC[3][6] and IVC[5][6] is outside IVC[1][3] and IVC[3][4]. The suspension includes a damper unit configured to resist movement between two or more of the suspended body-1, seatstay body-2, link body-3, chainstay body-4, link body-5, or link body-6.

In yet another embodiment, a six-bar vehicle suspension for a two wheel vehicle is provided. The suspension includes a suspended body-1, a link body-2, a link body-3, a link body-4, a link body-5, and a link body-6, operatively coupled with one another defining a plurality of IVCs. Three or more of the plurality of the IVCs in the system are within about a 5 mm diameter circle from the extended state to the compressed state. The suspension includes a damper unit configured to resist movement between two or more of the suspended body-1, link body-2, link body-3, link body-4, link body-5, or link body-6. In one additional or alternative aspect of this embodiment, three or more of the plurality of the IVCs in the system can be substantially the same as one another from the extended state to the compressed state. In one additional or alternative aspect of this embodiment, the linkage can include the link body-2 is a seatstay body-2, and the link body-4 is a chainstay body-4, and are operatively coupled with one another such that the link body-3 includes jointed connections with the suspended body-1 defining an IVC[1][3]; the chainstay body-4 defining an IVC[3][4], and the link body-6 defining an IVC[3][6]; the chainstay body-4 includes additional jointed connections with the seatstay body-2 defining an IVC[2][4] and the link body-6 defining an IVC[3][6]; and the link body-5 includes additional jointed connections with suspended body-1 defining an IVC[1][5], seatstay body-2 defining an IVC[2][5], and the link body-6 defining an IVC[5][6]. In one additional or alternative aspect of this embodiment, the relationship between the chainstay body-4 and the link body-6 can define an IVC[4][6]. In one additional or alternative aspect of this embodiment, the chainstay can be a binary link, and the IVC[3][4], IVC[3][6], and IVC[4][6] can be substantially the same.

In yet another embodiment, a two-wheel vehicle suspension linkage is provided. The suspension includes a rear wheel having an axis and a wheel travel due to articulation of a suspension linkage. The wheel travel defines a driven wheel axis path length (DWAP[L]) along a path of the wheel travel at the axis. A plurality of link bodies form the suspension linkage including a suspended vehicle body-1. The plurality of link bodies define a dynamic instantaneous velocity center (DIVC) and a dynamic instantaneous velocity center length (DIVC[L]). The DIVC path has a curvature inflection point around 10-50% of the total vertical wheel travel. The dynamic instantaneous velocity center length (DIVC[L]) is about two times greater or more than a length of the driven wheel axis path length (DWAP[L]). The suspension includes damper unit configured to resist movement between two or more of the plurality of link bodies.

In yet another embodiment, a six-bar vehicle suspension for a two wheel vehicle is provided. The suspension includes a plurality of suspension linkage bodies that define a wheel path including a suspended body-1, a seatstay body-2, a link body-3, a chainstay body-4, a link body-5, and a link body-6 operatively coupled with one another. No more than two suspension linkage bodies, that define a wheel path, are operatively coupled to suspended body. The seatstay body-2 is the wheel carrier body. The seatstay body-2 includes a jointed connection with the chainstay body-4 defining an IVC[2][4]. A diving wheel to driving cog (DWDC) line is defined by a reference line between a driven wheel axis and an axis of the driving cog. The IVC[2][4] is located at or above the DWDC line when the suspension is in at least the extended state. The suspension includes a damper unit configured to resist movement between two or more of the suspended body-1, seatstay body-2, link body-3, chainstay body-4, link body-5, or link body-6.

In yet another embodiment, a six-bar vehicle suspension for a two wheel vehicle is provided. The suspension includes a plurality of suspension linkage bodies that define a wheel path including a suspended body-1, a seatstay body-2, a link body-3, a chainstay body-4, a link body-5, and a link body-6 operatively coupled with one another. The link body-3 is connected to each of suspended body-1, chainstay body-4 and link body-6 via a flexible joint. The chainstay body-4 is connected to each seatstay body-2 and link body-3 via a flexible joint. The link body-5 is connected to suspended body-1, seatstay body-2 and link body-6 via flexible joint. The seatstay body-2 is the wheel carrier body. The seatstay body-2 includes a jointed connection with the chainstay body-4 defining an IVC[2][4]. The diving wheel to driving cog (DWDC) line is defined by a reference line between a driven wheel axis and an axis of the driving cog. The IVC[2][4] is located below the DWDC line when the suspension is in at least the extended state. The suspension includes a damper unit configured to resist movement between two or more of the suspended body-1, seatstay body-2, link body-3, chainstay body-4, link body-5, or link body-6.

In yet another embodiment, a six-bar vehicle suspension for a two wheel vehicle is provided. The suspension includes a plurality of suspension linkage bodies that define a wheel path. The linkage bodies include a suspended body-1, a seatstay body-2, a link body-3, a chainstay body-4, a link body-5, and a link body-6 operatively coupled with one another forming a plurality of relationships. The relationships define an instantaneous force center (IFC) that first moves generally rearward and then moves generally forward as the suspension is moved from the extended to the compressed state.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, a minimum radius of curvature of the DIVC migration path between a curvature inflection point and the DIVC at the extended state is greater than a minimum radius of curvature of the DIVC migration path between said curvature inflection point and the DIVC at the compressed state. In another aspect, the dynamic instantaneous velocity center length (DIVC[L]) is about two times greater or more than a length of the driven wheel axis path length (DWAP[L]). In another aspect, the line defined by IVC[3][6] and IVC[5][6] is outside IVC[1][3] and IVC[3][4]. In another aspect, the plurality of link bodies defining a DIVC[R] that is greater than or about equal to 2. In another aspect, a total driven wheel suspension travel distance and an intermediate driven wheel suspension travel distance having a percent travel of about 10-50%.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, the plurality of link bodies includes a body-2 that is a dynamic body. In another aspect, the body-2 is the brake carrier body or the wheel carrier body. In another aspect, the body-2 is the wheel carrier body and the brake carrier body.

In another aspect, chainstay body-4 is the wheel carrier body or the brake carrier body. In another aspect, chainstay body-4 is a dynamic body and the wheel carrier body. In another aspect, the seatstay body-2 is a dynamic body and the brake carrier body. In another aspect, chainstay body-4 is a dynamic body and the brake carrier body, wherein the seatstay body-2 is a dynamic body and the wheel carrier body.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, the link body-3 includes jointed connections with the suspended body-1 defining an IVC[1][3] and the chainstay body-4 defining an IVC[3][4]. In another aspect, the chainstay body-4 includes additional jointed connections with the seatstay body-2 defining an IVC[2][4] and the link body-6 defining an IVC[4][6]. In another aspect, the link body-5 includes additional jointed connections with suspended body-1 defining an IVC[1][5], seatstay body-2 defining an IVC[2][5], and the link body-6 defining an IVC[5][6]. In another aspect, a migration path of IVC[3][6] reverses as the suspension moves from the extended state at least partially to the compressed state.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, the relationship between the suspension body-1 and the link body-6 defines an IVC[1][6], wherein the IVC[3][6] is not coincident to the IVC[1][6] when the suspension is in the extended state. In another aspect, the relationship between the suspension body-1 and the link body-6 defines an IVC[1][6], wherein IVC[1][6] moves towards IVC[3][6] as the suspension moves from the extended state at least partially to the compressed state. In another aspect, the relationship between the suspension body-1 and the link body-6 defines an IVC[1][6], wherein the migration path of IVC[1][6] intersects the migration path of IVC[3][6]. In another aspect, the relationship between the suspension body-1 and the link body-6 defines an IVC[1][6], wherein IVC[3][6] is coincident to IVC[1][6] at an instance between the extended and compressed suspension states. In another aspect, the relationship between the suspension body-1 and the link body-6 defines an IVC[1][6], wherein IVC[1][6] is coincident to IVC[3][6] when the suspension is in the compressed state. In another aspect, the relationship between the suspension body-1 and the link body-6 defines an IVC[1][6], and IVC[3][6] is coincident to IVC[1][6] when the suspension is in the extended state, but IVC[3][6] is not coincident to IVC[1][6] when the suspension is in the compressed state.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In another aspect, the relationship between suspended body-1 and the chainstay body-4 defines IVC[1][4] and the IVC[3][4] is not coincident to the IVC[1][4] when the suspension is in the extended state. In another aspect, the relationship between suspended body-1 and the chainstay body-4 defines IVC[1]

[4] and IVC[1][4] moves towards IVC[3][4] as the suspension moves from the extended state at least partially to the compressed state. In another aspect, the relationship between suspended body-1 and the chainstay body-4 defines IVC[1][4] and the migration path of IVC[1][4] intersects the migration path of IVC[3][4]. In another aspect, the relationship between suspended body-1 and the chainstay body-4 defines IVC[1][4] and IVC[3][4] is coincident to IVC[1][4] at an instance between the extended and compressed suspension states. In another aspect, the relationship between suspended body-1 and the chainstay body-4 defines IVC[1][4] and IVC[1][4] is coincident to IVC[3][4] when the suspension is in the compressed state. In another aspect, the relationship between suspended body-1 and the chainstay body-4 defines IVC[1][4], and IVC[3][4] is coincident to IVC[1][4] when the suspension is in the extended state, but IVC[3][4] is not coincident to IVC[1][4] when the suspension is in the compressed state.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In another aspect, IVC[3][6] and IVC[3][4] are on the same side of IVC[1][3] with respect to a plane perpendicular to the ground and passing through IVC[1][3] in at least the extended state. In another aspect, the damper unit includes a joint connection to the suspended body-1 or link body-5. In another aspect, the damper unit is connected between suspended body-1 and link body-5. In another aspect, seatstay body-2 includes a jointed connection with the chainstay body-4 defining an IVC[2][4] and a driven wheel to driven cog (DWDC) line is defined as a reference line extending between a driven wheel axis and the driven cog axis and IVC[2][4] is located below the DWDC line when the suspension is in at least the extended state. In another aspect, seatstay body-2 includes a jointed connection with the chainstay body-4 defining an IVC[2][4] and a driven wheel to driven cog (DWDC) line is defined as a reference line extending between a driven wheel axis and the driven cog axis and IVC[2][4] is located on or above the DWDC line when the suspension is in at least the extended state.

In accordance with one embodiment, the suspension linkage includes a suspended body-1, a seatstay body-2, a link body-3, a chainstay body-4, a link body-5, and a link body-6 operatively coupled with one another defining instantaneous velocity centers (IVCs). The link body-3 includes jointed connections with the suspended body-1 defining an IVC[1][3], the chainstay body-4 defining an IVC[3][4], and the link body-6 defining an IVC[3][6]. The chainstay body-4 includes an additional jointed connection with the seatstay body-2 defining an IVC[2][4]. The link body-5 includes additional jointed connections with suspended body-1 defining an IVC[1][5], seatstay body-2 defining an IVC[2][5], and the link body-6 defining an IVC[5][6]. A lower base line is defined by IVC[1][3] and IVC[3][4]. An upper base line is defined by IVC[1][5] and IVC[2][5]. The IVC[5][6] is located outside the upper and lower base lines. The suspension linkage includes a damper unit configured to resist movement between two or more of the suspended body-1, seatstay body-2, link body-3, chainstay body-4, link body-5, or link body-6.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1A:
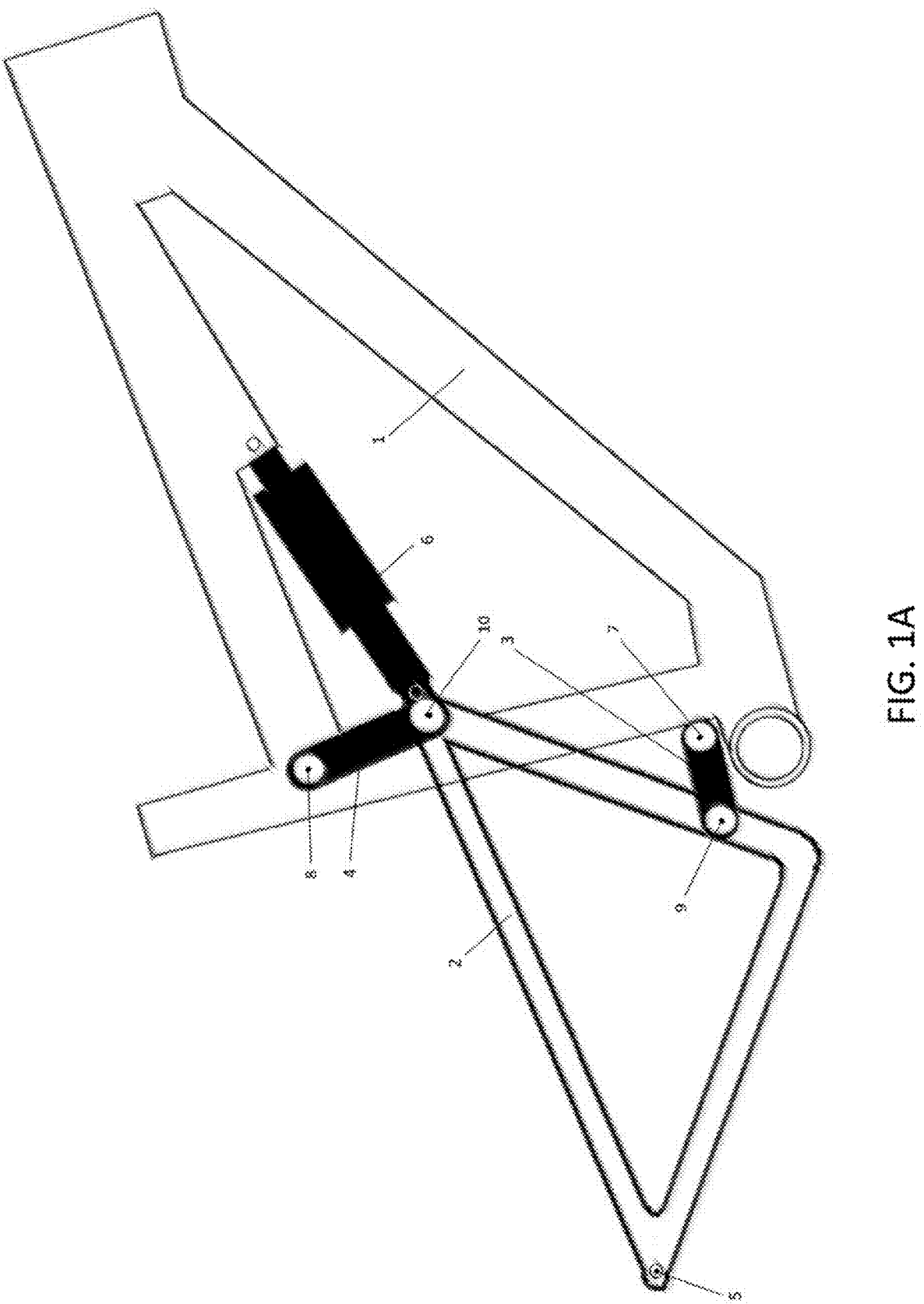
FIG. 1A is a side view of a 4-bar linkage bicycle suspension system in the extended state.

Disclosed herein is as a system or linkage that operatively couples a suspended body to a driven wheel. In accordance with the various embodiments provided herein, the suspension system linkage improves suspension performance based on the interrelationships of its linkage bodies and the related instantaneous velocity centers (IVCs). In one example, the linkage has 15 IVCs. In particular, the linkage may be a 6-bar linkage.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art.

Accordingly, provided herein are various methods or algorithms suitable for analyzing suspension systems. For example, various methods are provided for calculating unknown IVCs of a linkage for a suspension system. Such analytical methods are provided for fuller understanding of the various mechanisms discussed herein. For example, a triangular method may be used to determine an unknown IVC of interest. Additionally or alternatively, plotting the positional relationships of IVCs in a linkage of a suspension can be utilized. Accordingly, the positions of IVCs may change depending on the configuration of the system. A particular IVC may be in a different position depending on whether the system is in a compressed or extended state. IVC migration paths can be determined and vectors running tangential to such migration paths can be analyzed. Thus, the interrelationships between IVCs can be analyzed, allowing for a mathematical analysis of the movement of the linkage subsystem. Finally, methods to calculate anti-squat, anti-rise, and leverage rate is detailed.

As it is understood that throughout this disclosure the relationship of various linkages are described with respect to characteristics of those linkages. One analysis system useful for assessing these relationships is the Mobility Analysis of Mechanisms. The Mobility Analysis of Mechanisms (Kutz-bach (or Grübler) mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots can include revolute, slider, cam joints, or any other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real world accuracy of the characteristics discussed herein while allowing for real world variance in the characteristics. Note that if bodies are coupled as one and not considered completely rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$\text{mobility} = m = 3(n-1-p)+p$$

n=number of bodies (or links or members)
p=number of joints
$\Sigma f$=sum of the kinetic variables in the mechanism As an example, this equation may be applied to a 4-bar linkage. The following solves the equation for a 4-bar linkage:

$$p = n = 4$$

$$m = 3(n-1-p)+p$$

$$m = 3(4-1-4)+4$$

$$m = 3(-1)+4$$

$$m = -3+4$$

$$m = 1$$

As another example, this equation may be applied to a 6-bar linkage. The following solves the equation for a 6-bar linkage:

$$n = 6$$

$$p = 7$$

$$m = 3(n-1-p)+p$$

$$m = 3(6-1-7)+7$$

$$m = 3(-2)+7$$

$$m = -6+7$$

$$m = 1$$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing vehicle suspension linkages design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT[T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to a body-1 and a body-2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but always depend upon suspended body-1 since this is the body in which a passenger or rider will be included.

As used herein DIVC[AD] can define both the acceleration and deceleration response of the vehicle.

As used herein DIVC[A] can define the acceleration response of the vehicle.

As used herein DIVC[D] can define the deceleration response of the vehicle.

As used herein DIVC[C] is defined as a DIVC that includes the acceleration component. DIVC[C] can be equal to DIVC[A] or DIVC[AD].

As used herein DIVC[E] is defined as a DIVC that includes the deceleration component. DIVC[E] can be equal to DIVC[D] or DIVC[AD].

As used herein DIVC is a general term and therefore a DIVC may be a DIVC[AD] or a DIVC[A] or a DIVC[D] or a DIVC[C] or a DIVC[E]. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC [AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z]].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicles 2 wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. 100% anti-squat is when the anti-squat force is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point an anti-squat below 100% is ideal so that the driving force is minimized, and the suspension can be utilized later in the travel where pedaling typically does not occur. This also minimizes feedback from the driving force to the rider. It is important to note that too high of an anti-squat is not ideal because it results in high feedback from the driving force to the rider and is detrimental to pedaling efficiency because the load transfer and anti-squat force are far from equilibrium.

When the vehicle decelerates the force distribution changes and the front wheel load is increased while the rear wheel load is decreased. As a result, the rear suspension tends to extend or rise. This is known in vehicle dynamics as anti-rise. The magnitude of anti-rise is directly related to the DIVC[E] migration.

100% anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Based upon the number of bodies present in the structure, the total number of instantaneous velocity centers (IVCs) can be determined. The following equation can be used:

$$\text{Number of Instance Centers} = N = \frac{n(n-1)}{2}$$

$n = $ number of bodies moving relative to one another $N = $ total number of instantaneous velocity centers of the linkage As an example, this equation may be applied to a 4-bar linkage. In this example, $n=4$. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, $n=6$. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

Figure 1B:
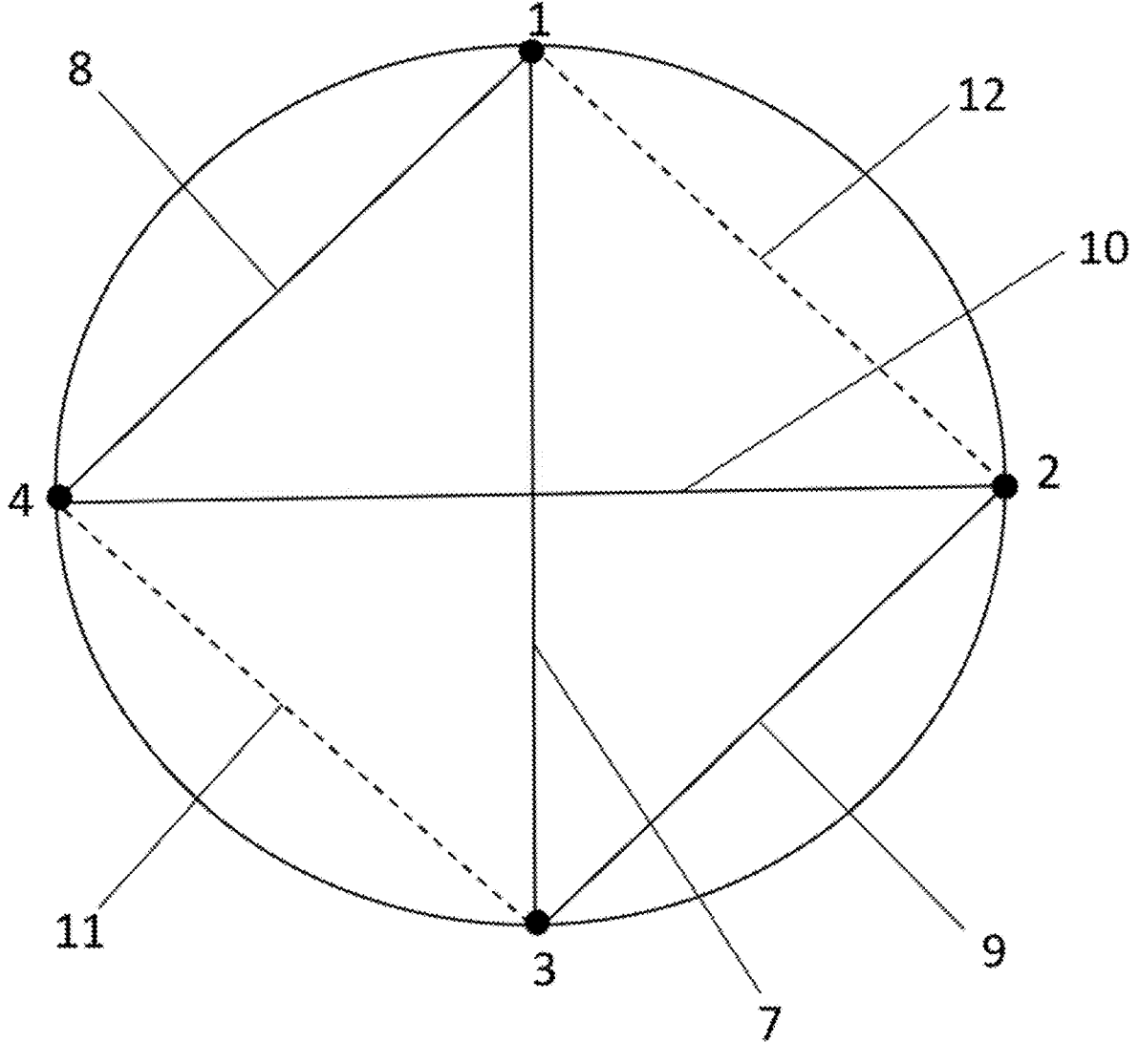
FIG. 1B is an analytical schematic representing the relationships between the various parts and IVCs of the suspension system of FIG. 1A.
Figure 1C:
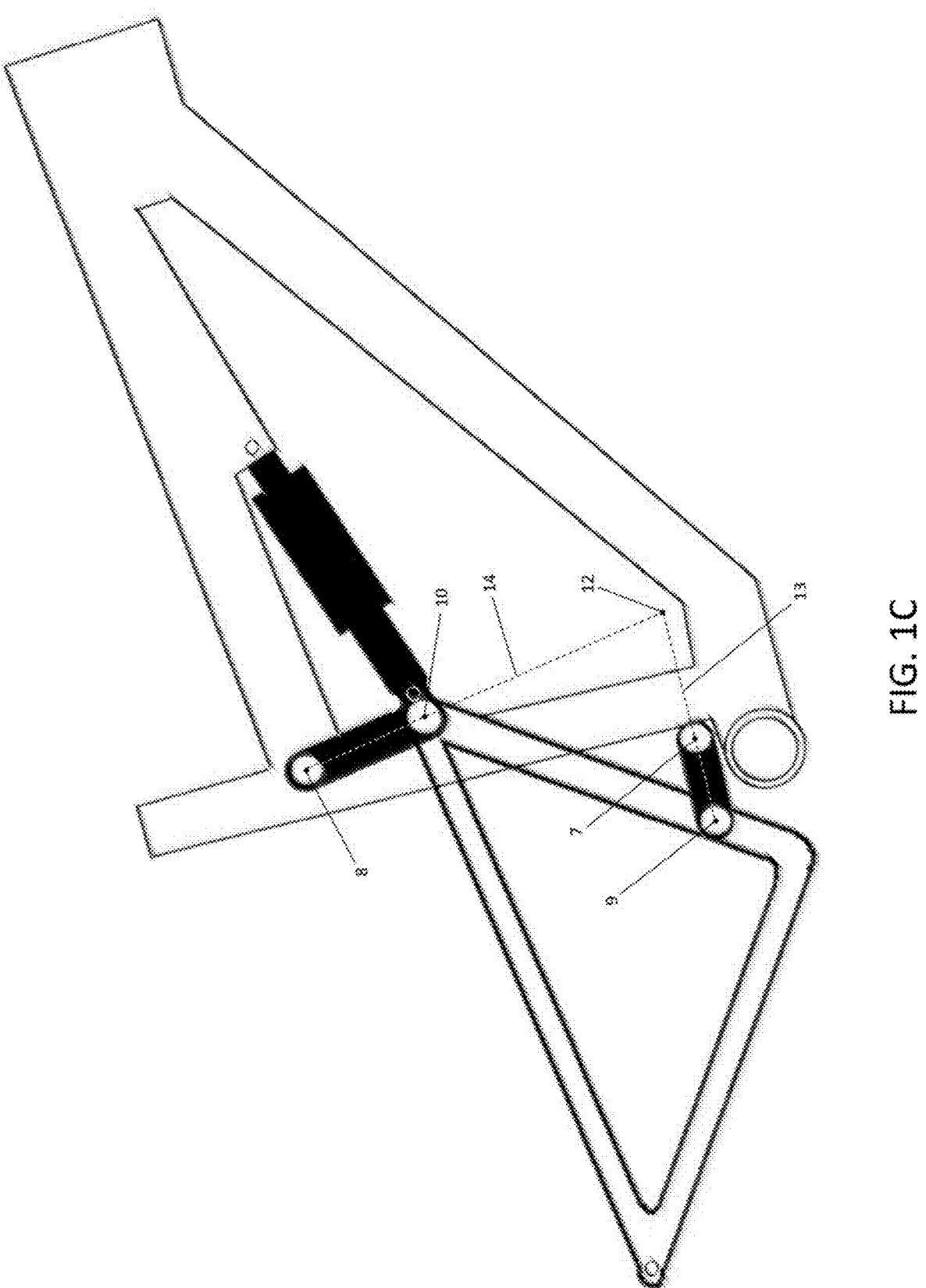
FIG. 1C shows a visual representation of a method of solving for a hidden IVC in the suspension system of FIG. 1A.

Turning now to the figures, FIGS. 1A-C represent a conventional 4-bar linkage system. The 4-bar linkage is presented herein as an example of the application of the analysis systems provided herein. FIG. 1A shows a 4-bar linkage bicycle suspension system in the extended state. In this example, and as used herein generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider. In the example shown, the suspension system includes a suspended body-1 and a rear triangle 2. The rear triangle 2 (e.g. chain stay and seat stay) is a DB and is operatively coupled to a lower link 3 and an upper link 4. Both the lower link 3 and the upper link 4 are operatively coupled to suspended body 1. The suspension system includes a driven wheel axis 5 and a damper 6. As mentioned previously, there are six IVCs in a 4-bar linkage. Four of the six IVCs are shown in FIG. 1A: SIVC[1][3] 7, SIVC[1][4] 8, IVC[2][3] 9 and IVC[2][4] 10.

FIG. 1B is a schematic diagram representing the relationships between the various parts and IVCs of the suspension system of FIG. 1A. The schematic diagram operates as a simplified representation of the system useful for clarity. The suspended body 1, rear triangle 2, lower link 3, and upper link 4 are represented by points along the circumference of the analytical schematic. Lines represent the six IVCs linking each part of the suspension system. Solid lines show the four IVCs, SIVC[1][3] 7, SIVC[1][4] 8, IVC[2][3] 9, and IVC[2][4] 10, depicted in FIG. 1A, while the dashed lines represent the two IVCs, IVC[3][4] 11 and DIVC[1][2] 12, not shown in FIG. 1A.

As shown by the solid lines in FIG. 1B, only the lower link 3 and the upper link 4 are operatively coupled to suspended body 1, lower link 3 is operatively coupled to rear triangle 2, and upper link 4 is operatively coupled to rear triangle 2. Any change in the linkage layout affects the IVC migrations as their dependencies are also changed.

The dashed lines in FIG. 1B, IVC[3][4] 11 and DIVC[1][2] 12, are derived through graphical analysis. For example, two different triangles including IVC[1][2] 12 may be used to solve for IVC[1][2] 12. In this example, DIVC[1][2] 12 may be derived using known SIVC[1][4] 8 and IVC[2][4] 10 (which form a triangle with DIVC[1][2] 12) and known SIVC[1][3] 7 and IVC[2][3] 9 (which form a separate triangle with DIVC[1][2] 12).

FIG. 1C shows a visual representation of a method of solving for IVC[1][2] 12. In this example, a first dashed line 13 is extended through IVC[1][3] 7 and IVC[2][3] 9. A second dashed line 14 is extended through IVC[1][4] 8 and IVC[2][4] 10. The first and second dashed lines 13, 14 intersect at DIVC[1][2] 12. It is contemplated that this same method may be used to determine all IVCs of a linkage system. IVC migration paths may then be drawn that connect all IVC locations from the extended to the compressed suspension states.

In accordance with various embodiments, the suspension system can include a suspension setup having more than four links. It may be noted that while some of the concepts discussed herein might be accomplished with four links, in preferred embodiments as shown herein by example six links are used. As is suitable, more or few links can also be used to accomplish the various concepts as discussed herein.

Figure 2:
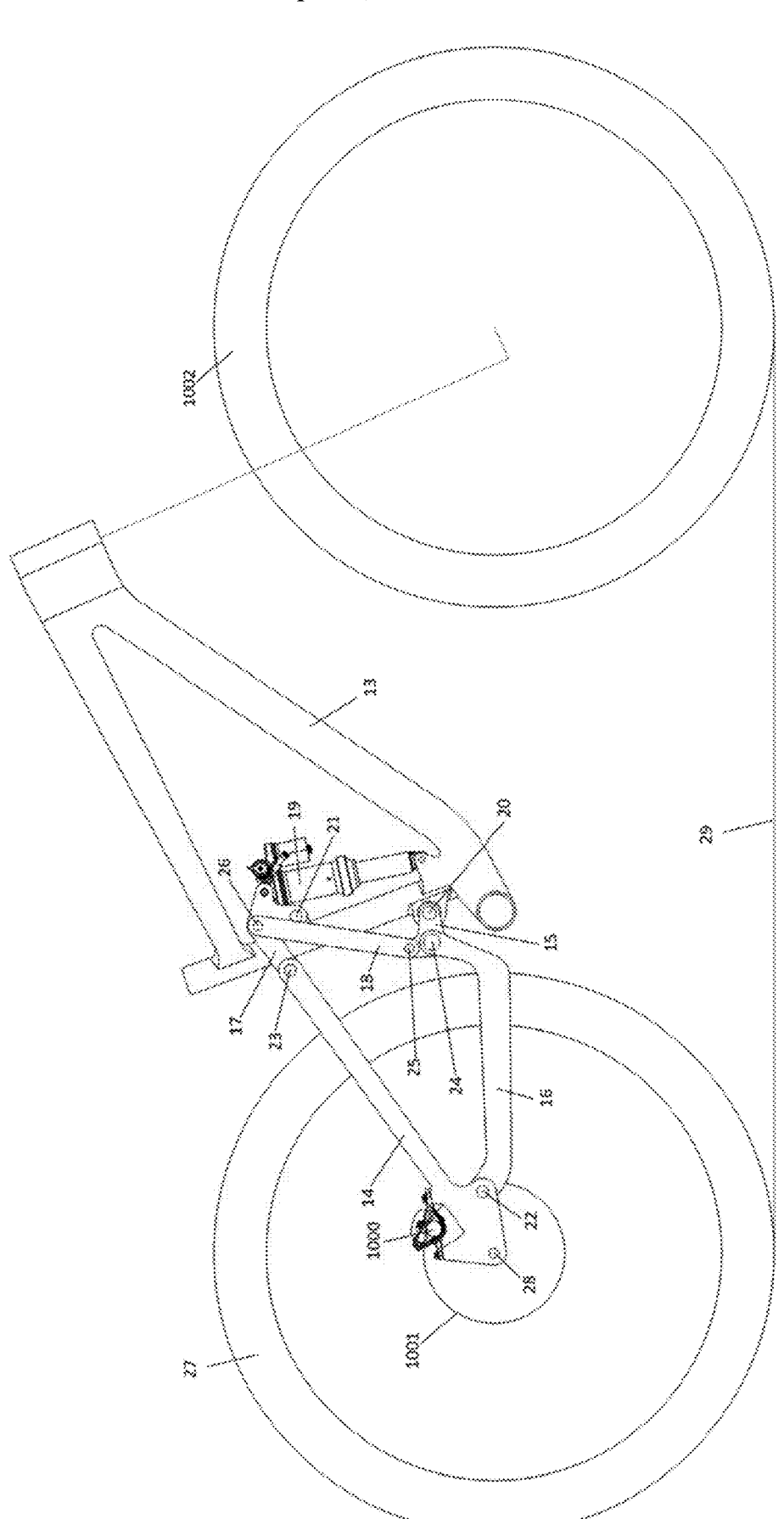
FIG. 2 shows one embodiment of a 6-bar linkage of the disclosed suspension system in the extended state.

In accordance with various embodiments as shown in FIG. 2, the suspension system can include a 6-bar linkage.

FIG. 2 specifically illustrates a 6-bar suspension system in the extended state. In this embodiment, the suspension body 13 is suspended by the suspension system at least at the rear of the bike and preferably by a suspension fork at the front, which is not shown herein for simplicity of the figures. As shown in FIG. 2, a seat-stay 14 is a dynamic body (DB), comprising a wheel carrier and a brake carrier. Brake caliper 1000 is operatively connected to seatstay 14 in this embodiment. Note that in other embodiments 14 maybe be a wheel carrier only, a brake carrier only, or it can be a non-dynamic body. The seat-stay 14 can include a driven wheel axis 28. In accordance with the embodiment, the seat-stay 14 is operatively coupled to a driven wheel 27. The driven wheel 27 engages with the ground 29. Brake rotor 1001 is operatively connected to driven wheel 27, and driven wheel 27 is operatively connected to seatstay 14. Front wheel 1002 is operatively connected to a fork which is operatively connected to suspended body 13. A chain-stay 16 is operatively coupled to the seat-stay 14. A bottom link 15 is operatively coupled to front triangular body 13, the chain-stay 16 and a center link 18. A top link 17 is operatively coupled to the front triangular body 13, the seat-stay 14 and the center link 18. A damper 19 is operatively coupled to the front triangular body 13 and the top link 17. As illustrated in the formula below, there are 15 IVCs in a 6-bar linkage.

$$N_6 = \frac{6(6-1)}{2} = \frac{30}{2} = 15$$

Seven of the 15 IVCs are shown in FIG. 2: SIVC[13][15] 20, SIVC[13][17] 21, IVC[14][16] 22; IVC[14][17] 23, IVC[15][16] 24, IVC[15][18] 25, and IVC[17][18] 26. In this embodiment, IVC[15][16] 24 and IVC[15][18] 25 are situated on the same side of SIVC[13][15] 20.

Figure 3:
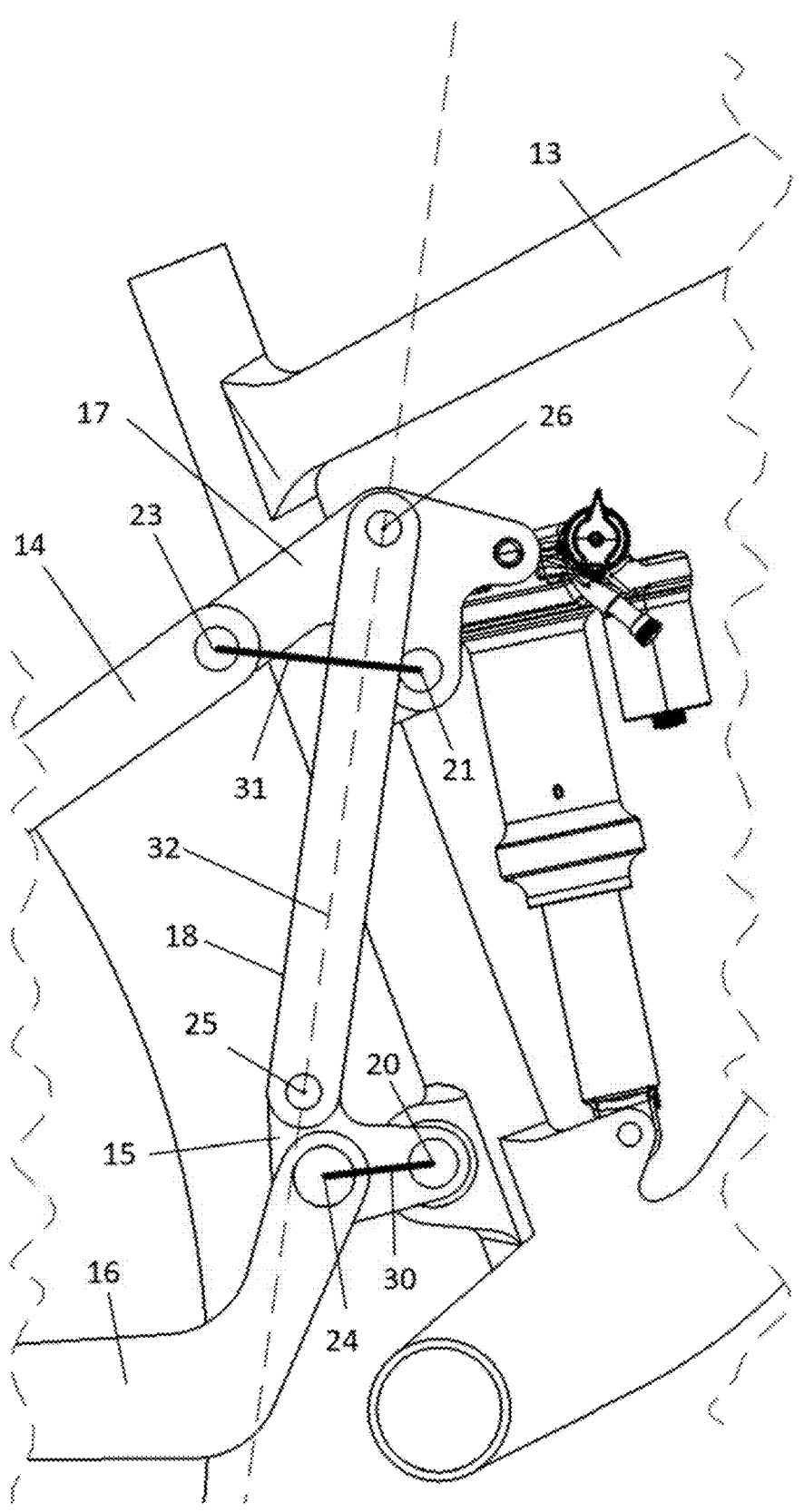
FIG. 3 is a close-up view of a portion of IVCs of the suspension system of FIG. 2.

FIG. 3 is a detail view of a portion of IVCs of the suspension system of FIG. 2. FIG. 3 shows six of the 15 IVCs of the suspension system: SIVC[13][15] 20, SIVC[13][17] 21, IVC[14][17] 23, IVC[15][16] 24, IVC[15][18] 25 and IVC[17][18] 26. A lower base line 30 extends from SIVC[13][15] 20 to IVC[15][16] 24. An upper base line 31 extends from SIVC[13][17] 21 to IVC[14][17] 23. As shown, dashed line 32 passes through IVC[15][18] 25 and IVC[17][18] 26. IVC[17][18] 26 is positioned above upper base line 31. The dashed line 32 does not intersect with the lower base line 30.

Figure 4A:
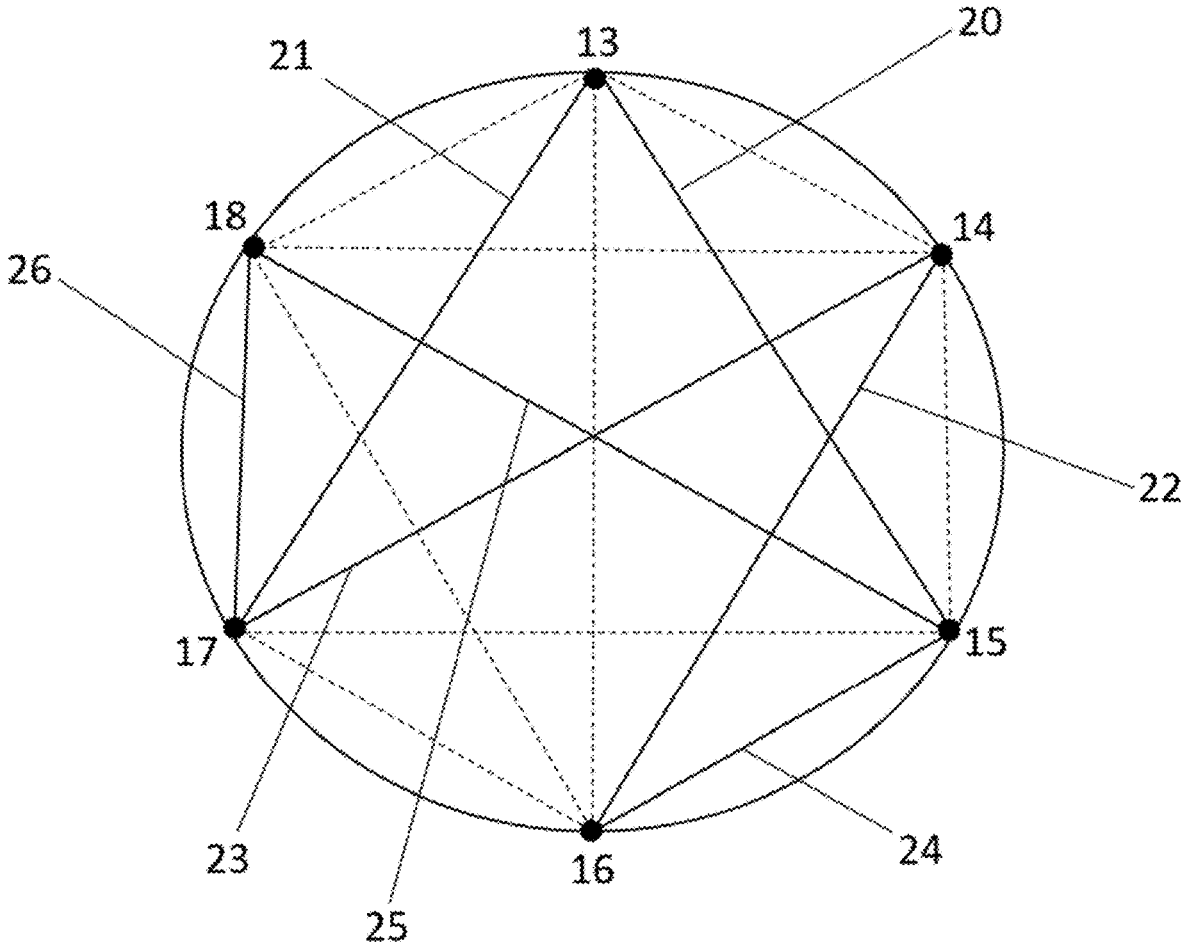
FIG. 4A is an analytical schematic representing the relationships between the various parts and IVCs of the suspension system of FIG. 2

FIG. 4A is an analytical schematic representing the relationships between the various parts and IVCs of the suspension system of FIG. 2. FIGS. 4B-I show various methods of solving for the hidden IVCs to connect all the points in the analytical schematic of FIG. 4A. Referencing FIG. 4A, the front triangular body 13, seat-stay 14, bottom link 15, chain-stay 16, top link 17, and center link 18 are represented by points along the circumference of the analytical schematic. Lines represent the 15 IVCs linking each part of the suspension system. Solid lines show the seven IVCs, SIVC [13][15] 20, SIVC[13][17] 21, IVC[14][16] 22; IVC[14][17] 23, IVC[15][16] 24, IVC[15][18] 25, and IVC[17][18] 26, depicted in FIG. 2, while the dashed lines represent the eight IVCs, DIVC[AD][13][14], IVC[13][16], IVC[13][18], IVC[14][15], IVC[14][18], IVC[15][17], IVC[16][17], and IVC[16][18], not shown in FIG. 2. The analytical schematic FIG. 4A shows that there are two linkage bodies operatively coupled to front triangular body 13: bottom link 15 and top link 17 because the connections with the suspended body 13 are limited SIVC[13][15] 20 and SIVC[13][17] 21 in this example.

As can be seen in FIG. 4A, the 6-bar system is significantly more complex than a 4-bar system. For example, DIVC[AD][13][14] is derived using more IVC relationships. Notably, changes to the basic linkage layout can have a significant effect on IVC migration paths. This in effect gives rise to many more possible IVC migration paths through the suspension travel from a fully extended to a fully compressed state.

In the embodiments of FIGS. 4B-G, the IVC DIVC[AD] [13][14] is not visually established. The DIVC[AD][13][14] can be solved for using the known IVCs (shown in solid lines) in FIG. 4A. All of the unknown IVC are established by the dotted lines forming the additional connections between the known IVCs by using the information provided by two IVC "sets" that form a triangle with the unknown IVC. However, other methods are contemplated to solve for DIVC[AD][13][14] as well.

Figure 4B:
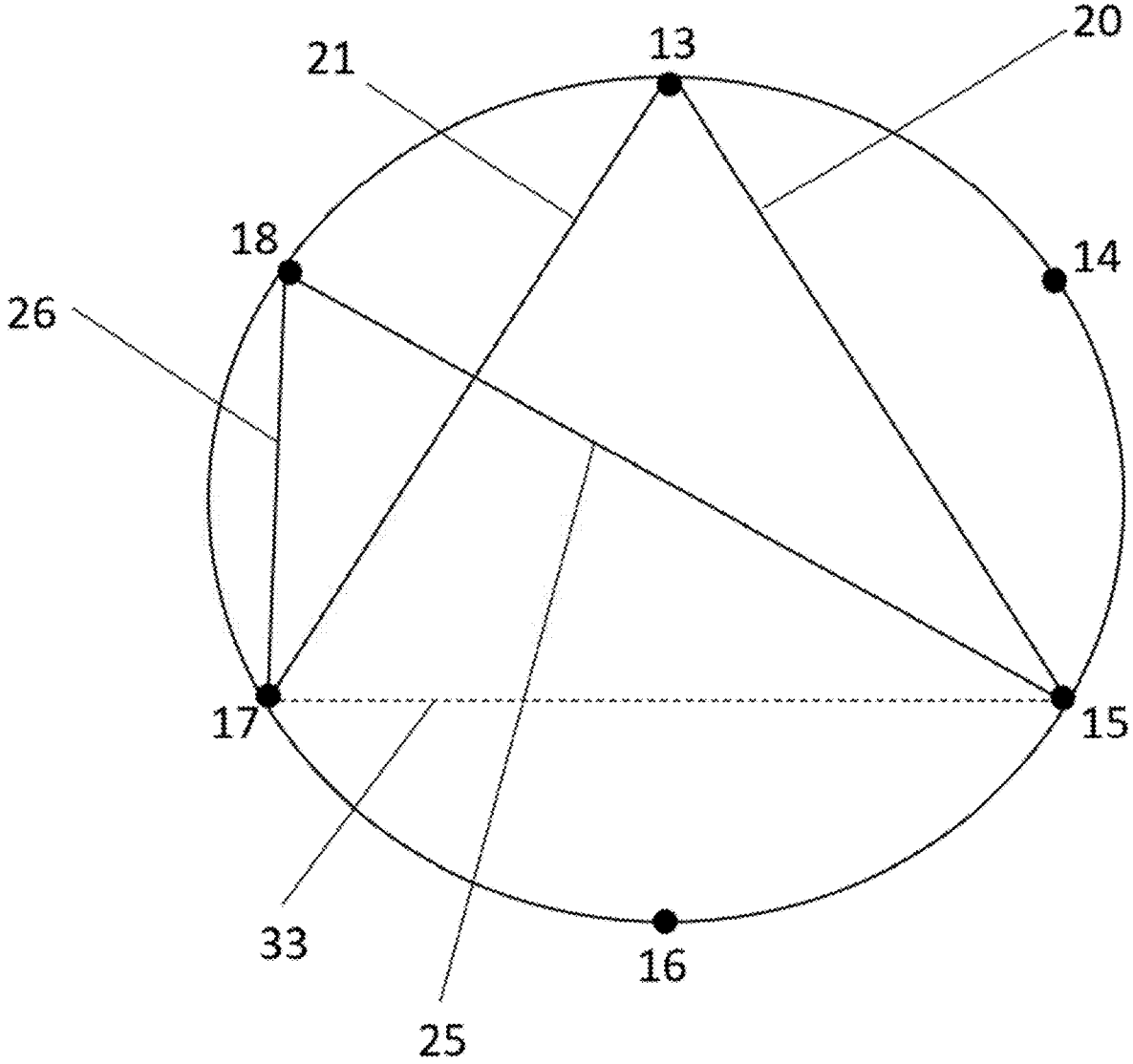
FIG. 4B is an analytical schematic showing a step of solving for one unknown IVC in a method of determining a selected unknown IVC in one embodiment.

FIG. 4B shows the first step in the method of solving for DIVC[AD][13][14] using the analytical schematic. In this example, unknown IVC[15][17] 33 is determined using known positions IVC[13][15] 20 and IVC[13][17] 21 and known positions IVC[15][18] 25 and IVC[17][18] 26.

Figure 4C:
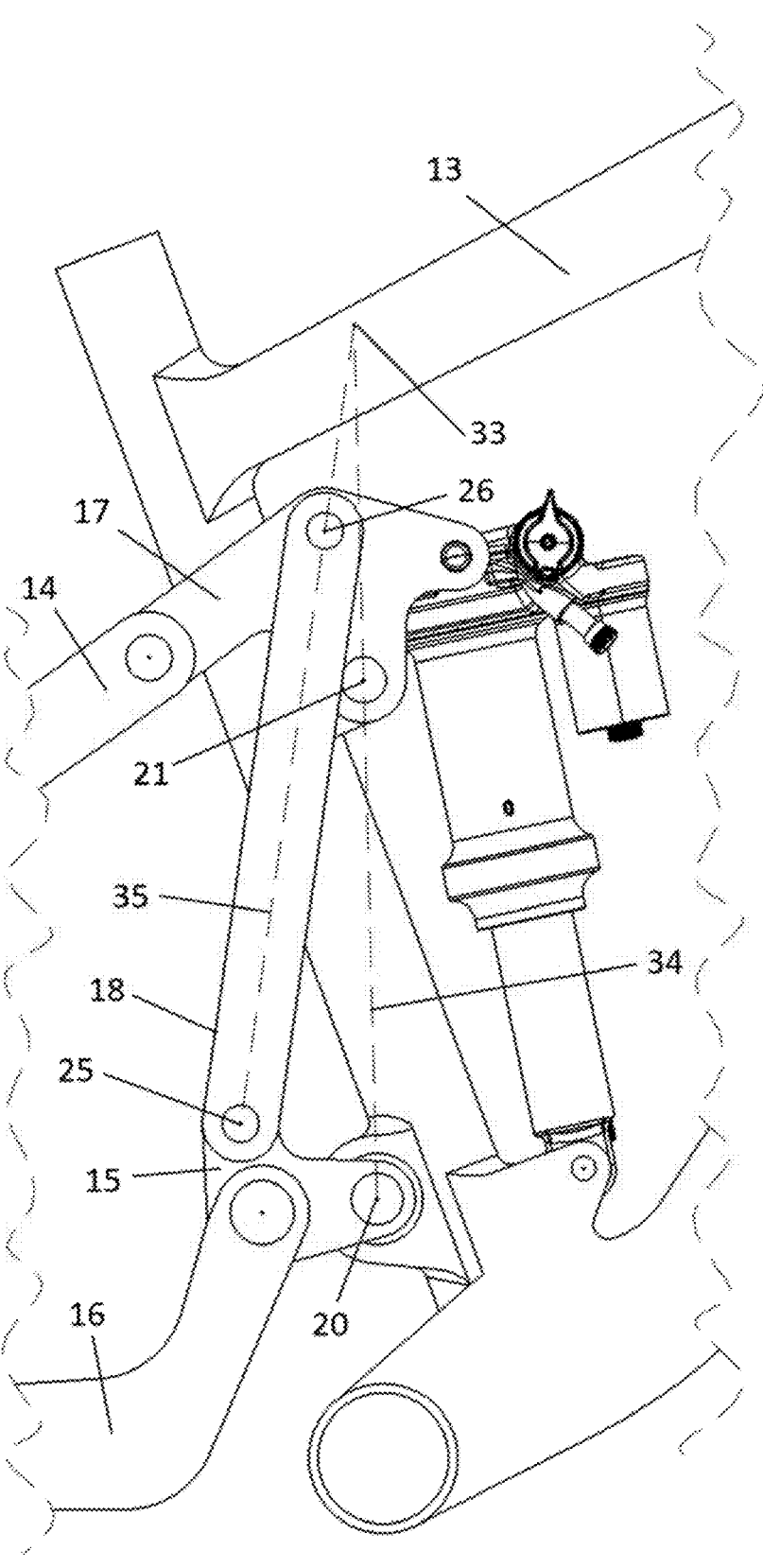
FIG. 4C is a detailed view of a portion of the suspension system of FIG. 2 used to determine a spatial position of the solved-for IVC in FIG. 4B within the suspension system of the embodiment of FIG. 4B.

FIG. 4C shows a method of determining the spatial positioning of the hidden IVC solved for in FIG. 4B within the suspension system. In this example, the four known sides of the two triangles 20, 21, 25, 26 of FIG. 4B are represented as linkage points 20, 21, 25, 26 in the suspension system in FIG. 4C. Dashed lines are extended through two linkage points that each represent sides of the same triangle in FIG. 4B. For example, dashed line 34 is extended through SIVC [13][15] 20 and SIVC[13][17] 21 and dashed line 35 is extended through IVC[15][18] 25 and IVC[17][18] 26. The dashed lines 34 and 35 intersect at IVC[15][17] 33.

Figure 4D:
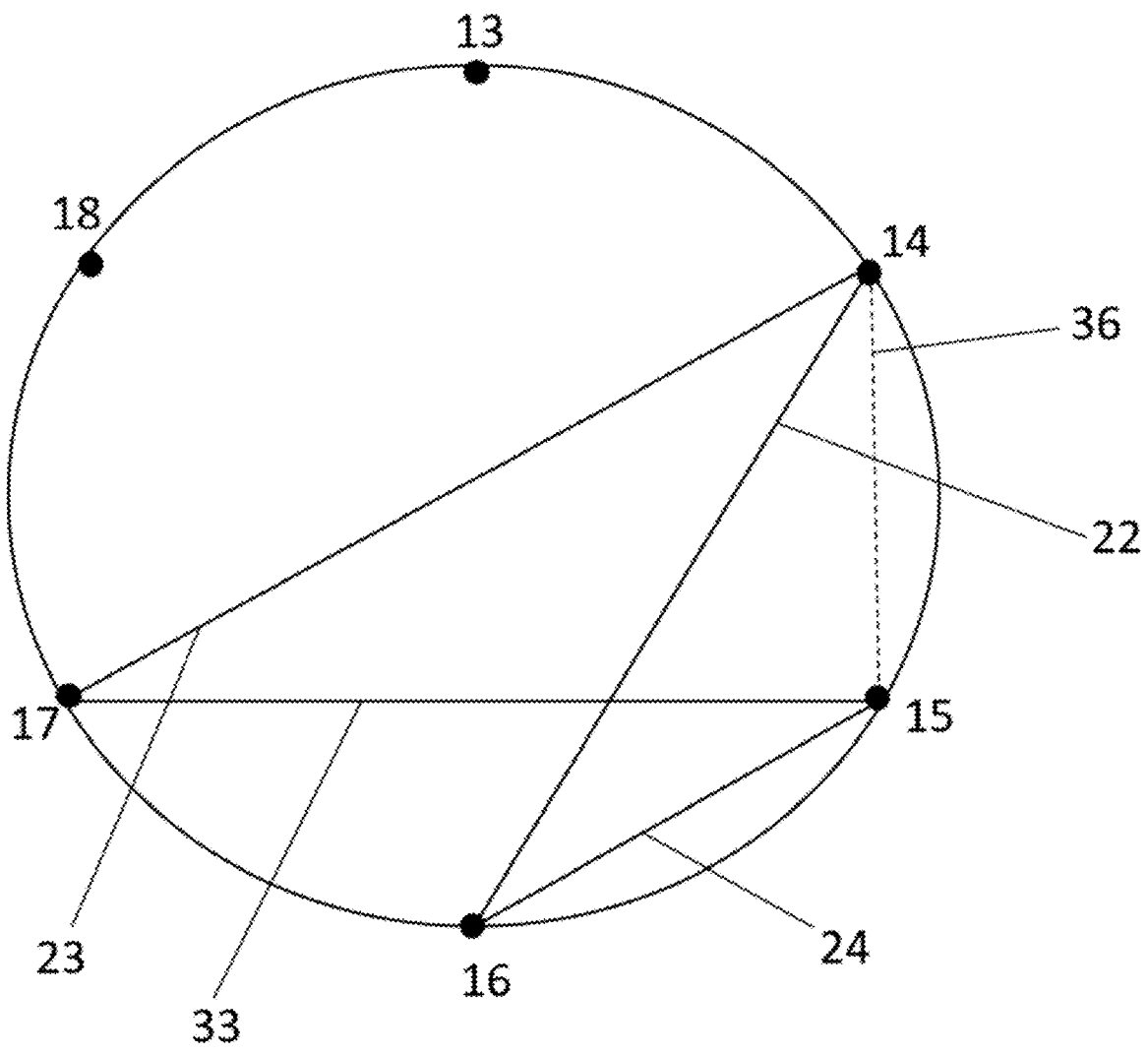
FIG. 4D is an analytical schematic showing a step of solving for another unknown IVC using the solved-for IVC in FIG. 4B in the method of determining the selected unknown IVC of the embodiment of FIG. 4B.

FIG. 4D shows an example of a next step in the method of solving for DIVC[AD][13][14]. In this example, unknown IVC[14][15] 36 is determined using known IVC [14][16] 22 and IVC[15][16] 24 and known IVC[14][17] 23 and solved-for IVC[15][17] 33.

Figure 4E:
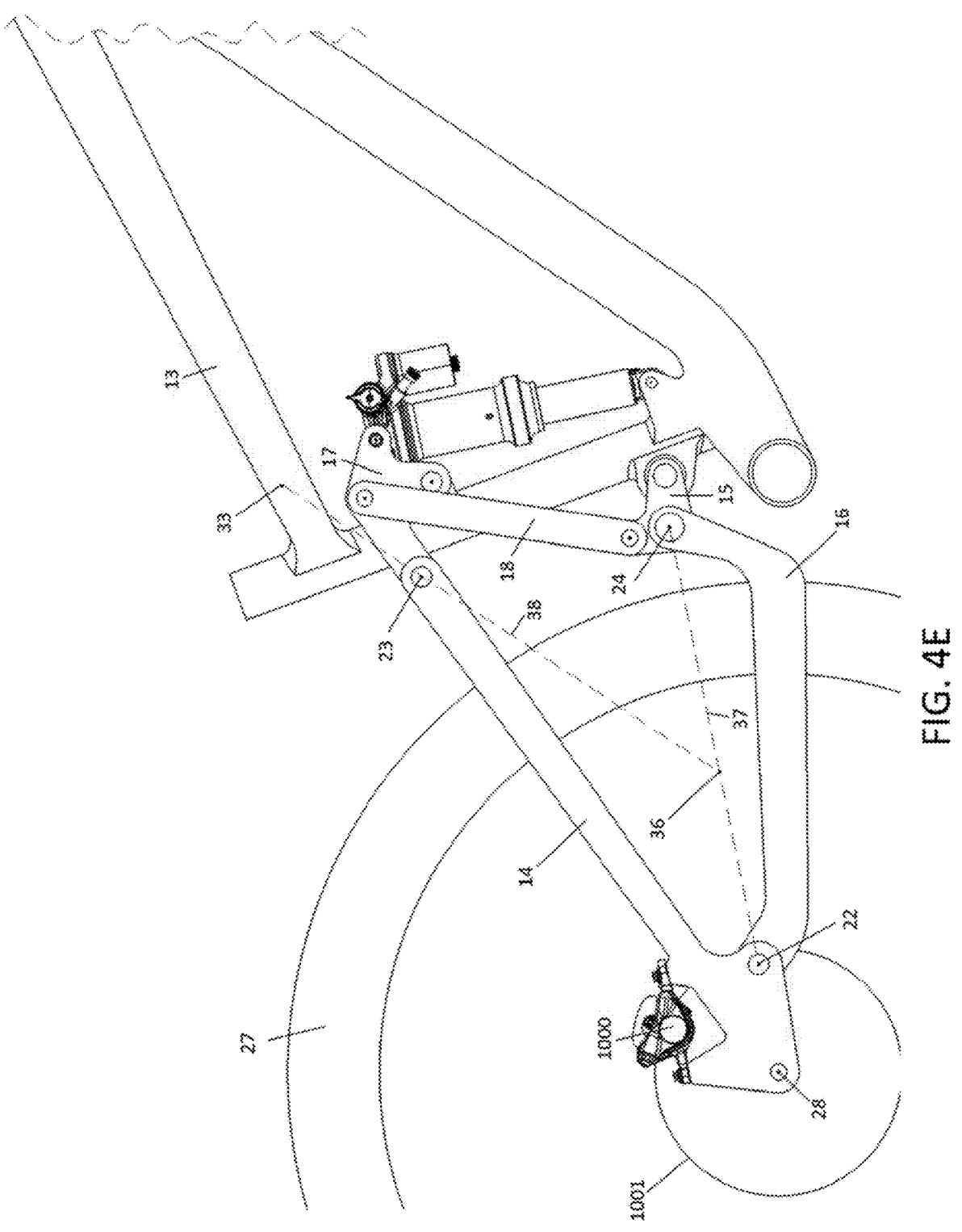
FIG. 4E is a detail view of a portion of the suspension system of FIG. 2 used to determine a spatial position of the solved-for IVC in FIG. 4D within the suspension system of the embodiment of FIG. 4B.

FIG. 4E shows a method of determining the spatial positioning of the hidden IVC solved for in FIG. 4D within the suspension system. In this example, the four known sides of the two triangles 22, 24, 23, 33 of FIG. 4D are represented as points 22, 24, 23, 33 in the suspension system in FIG. 4E. Dashed lines are extended through two points that each represent sides of the same triangle in FIG. 4D. For example, dashed line 37 is extended through IVC[14][16] 22 and IVC[15][16] 24 and dashed line 38 is extended through IVC[14][17] 23 and IVC[15][17] 33. The dashed lines 37 and 38 intersect at IVC[14][15] 36.

Figure 4F:
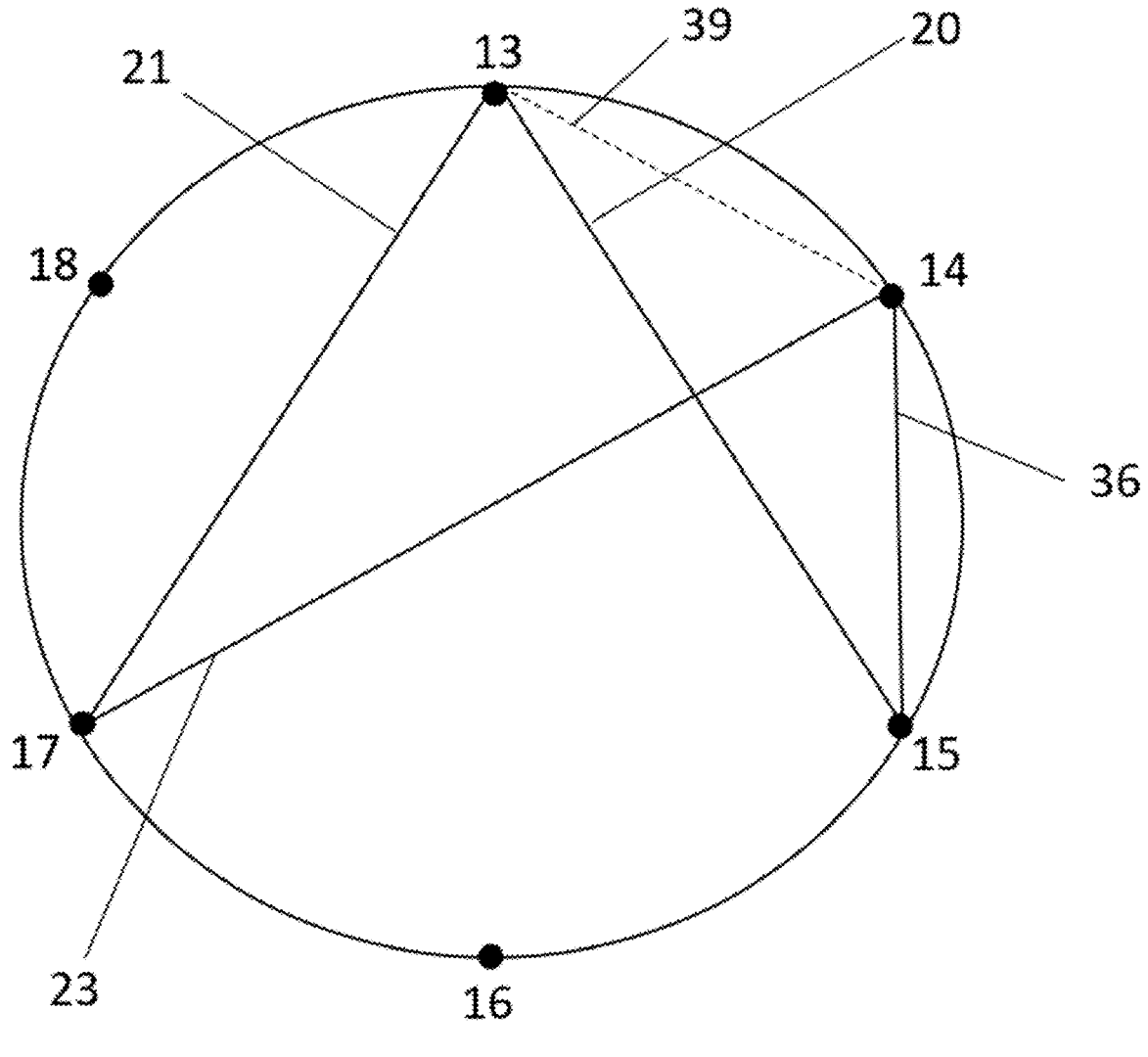
FIG. 4F is an analytical schematic showing a step of solving for the selected unknown IVC using the solved-for IVC in FIG. 4D in the method of determining the selected unknown IVC of the embodiment of FIG. 4B.

FIG. 4F shows an example of a final step in the method of solving for DIVC[AD][13][14]. In this example, unknown DIVC[AD][13][14] 39 is determined using known SIVC[13][15] 20 and solved-for IVC[14][15] 36 and known SIVC[13][17] 21 and IVC[14][17] 23.

Figure 4G:
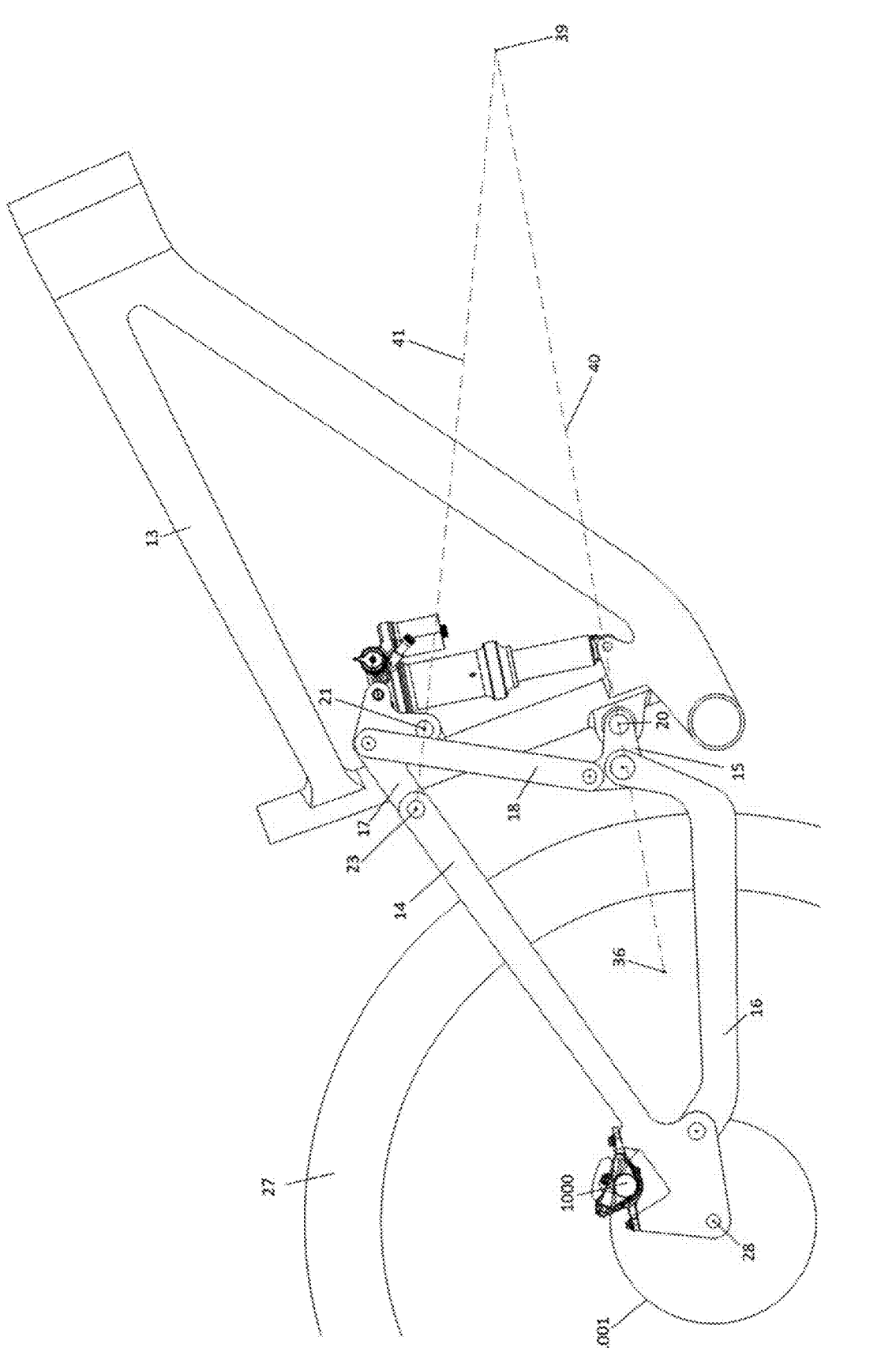
FIG. 4G is a detail view of a portion of the suspension system of FIG. 2 used to determine a spatial position of the solved-for IVC in FIG. 4F within the suspension system of the embodiment of FIG. 4B.

FIG. 4G shows a method of determining the spatial positioning of the hidden IVC solved for in FIG. 4F within the suspension system. In this example, the four known sides of the two triangles 20, 36, 21, 23 of FIG. 4G are represented as points 20, 36, 21, 23 in the suspension system in FIG. 4G. Dashed lines are extended through two points that each represent sides of the same triangle in FIG. 4F. For example, dashed line 40 is extended through SIVC[13][15] 20 and IVC[14][15] 36 and dashed line 41 is extended through SIVC[13][17] 21 and IVC[14][17] 23. The dashed lines 40 and 41 intersect at DIVC[AD][13][14] 39.

Figure 4H:
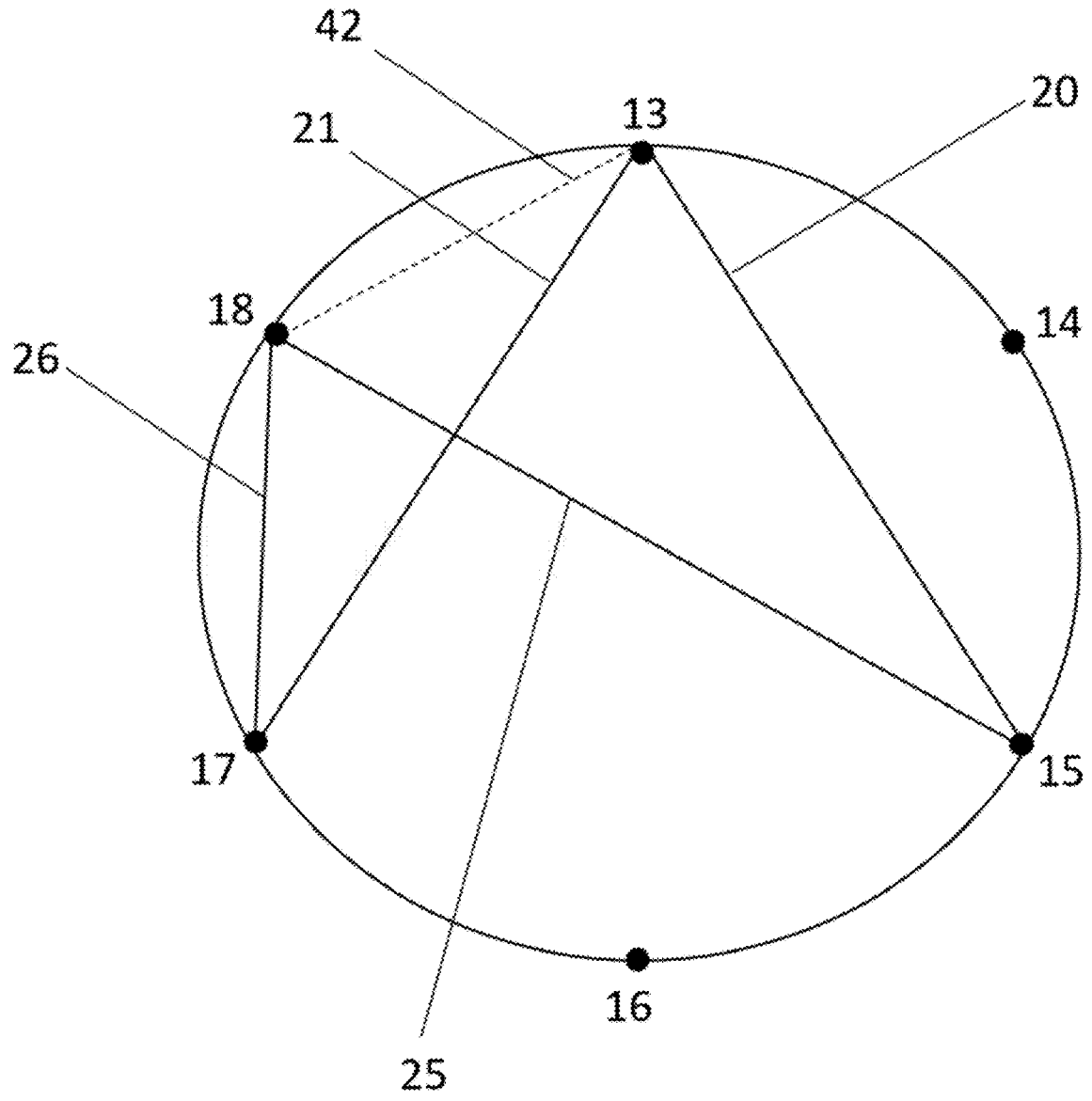
FIG. 4H is an analytical schematic showing one embodiment of a method of solving for a selected unknown IVC.
Figure 4I:
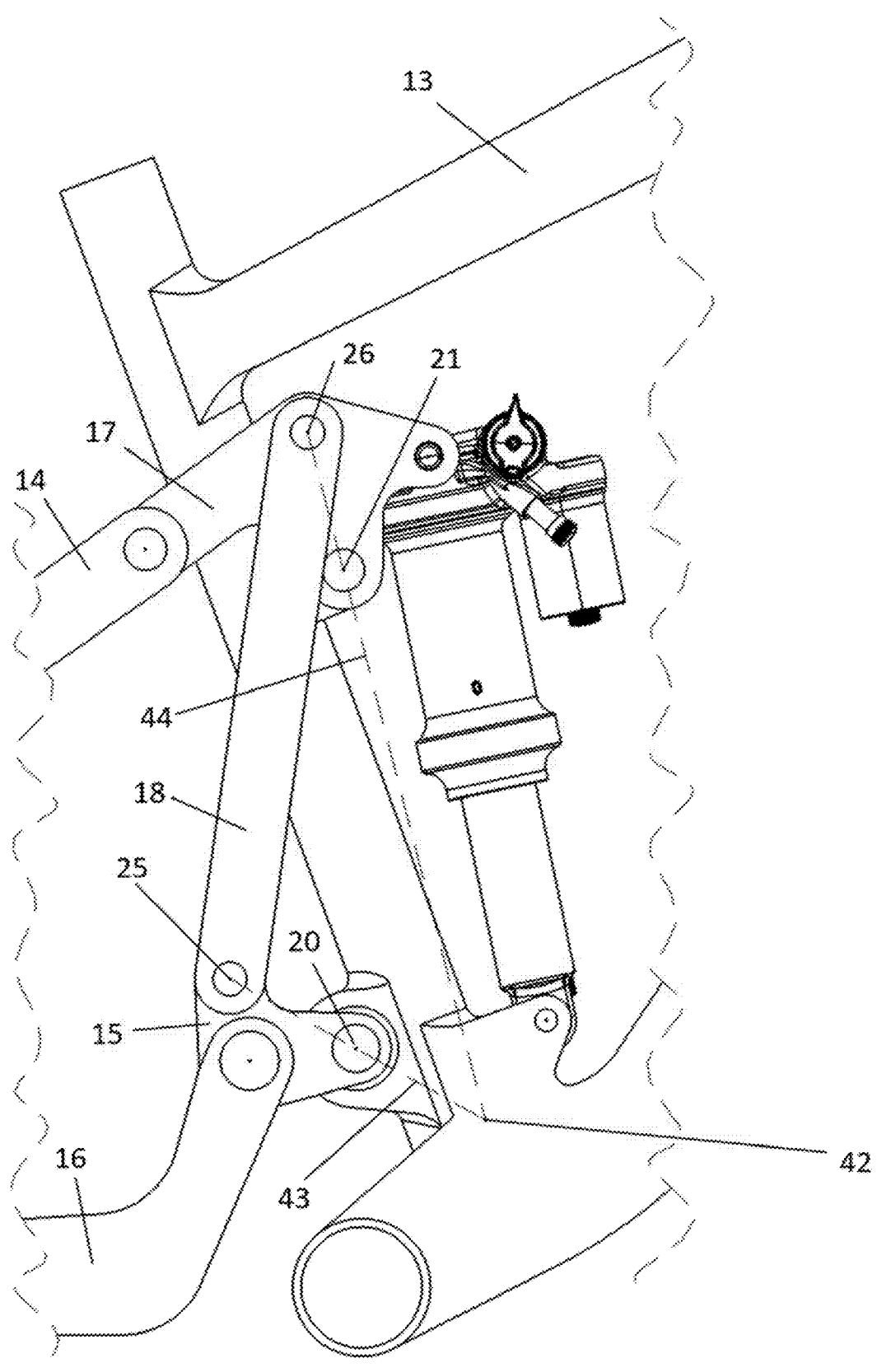
FIG. 4I is a close-up view of a portion of a suspension system of FIG. 2 used to determine a spatial position of the solved-for IVC in FIG. 4H within the suspension system of the embodiment of FIG. 4H.

Another unknown IVC of interest is IVC[13][18] 42. FIGS. 4H-I continues with the method of solving for IVC [13][18] 42 using the known IVCs in FIG. 4A. FIG. 4H shows a method of solving for IVC[13][18] 42 using SIVC [13][15] 20 and IVC[15][18] 25 and SIVC[13][17] 21 and IVC[17][18] 26. In this example, the same method is used as in FIGS. 4B-G: using two triangles to solve for the unknown IVC. However, other methods are contemplated herein for solving for the unknown IVC as would be appreciated by persons of skill in the art in light of the disclosure herein.

FIG. 4I shows a method of determining the spatial positing of the hidden IVC solved for in FIG. 4H within the suspension system. In this example, the four known sides of the two triangles 20, 25, 21, 26 of FIG. 4H are represented as points 20, 25, 21, 26 in the suspension system in FIG. 4I. Dashed lines are extended through two points that each represent sides of the same triangle in FIG. 4H. For example, dashed line 43 is extended through SIVC[13][15] 20 and IVC[15][18] 25 and dashed line 44 is extended through SIVC[13][17] 21 and IVC[17][18] 26. The dashed lines 43 and 44 intersect at IVC[13][18] 42.

In several embodiments, IVC migration plots or curves can be plotted graphically by solving for the IVC at each position between the extended and compressed suspension states. A position of the linkage in between the extended and compressed states is known as an intermediate state. The IVC migration curves depend upon the reference frame considered. In most embodiments, the suspended body is fixed as the driven wheel moves from the extended to the compressed state.

Figure 5:
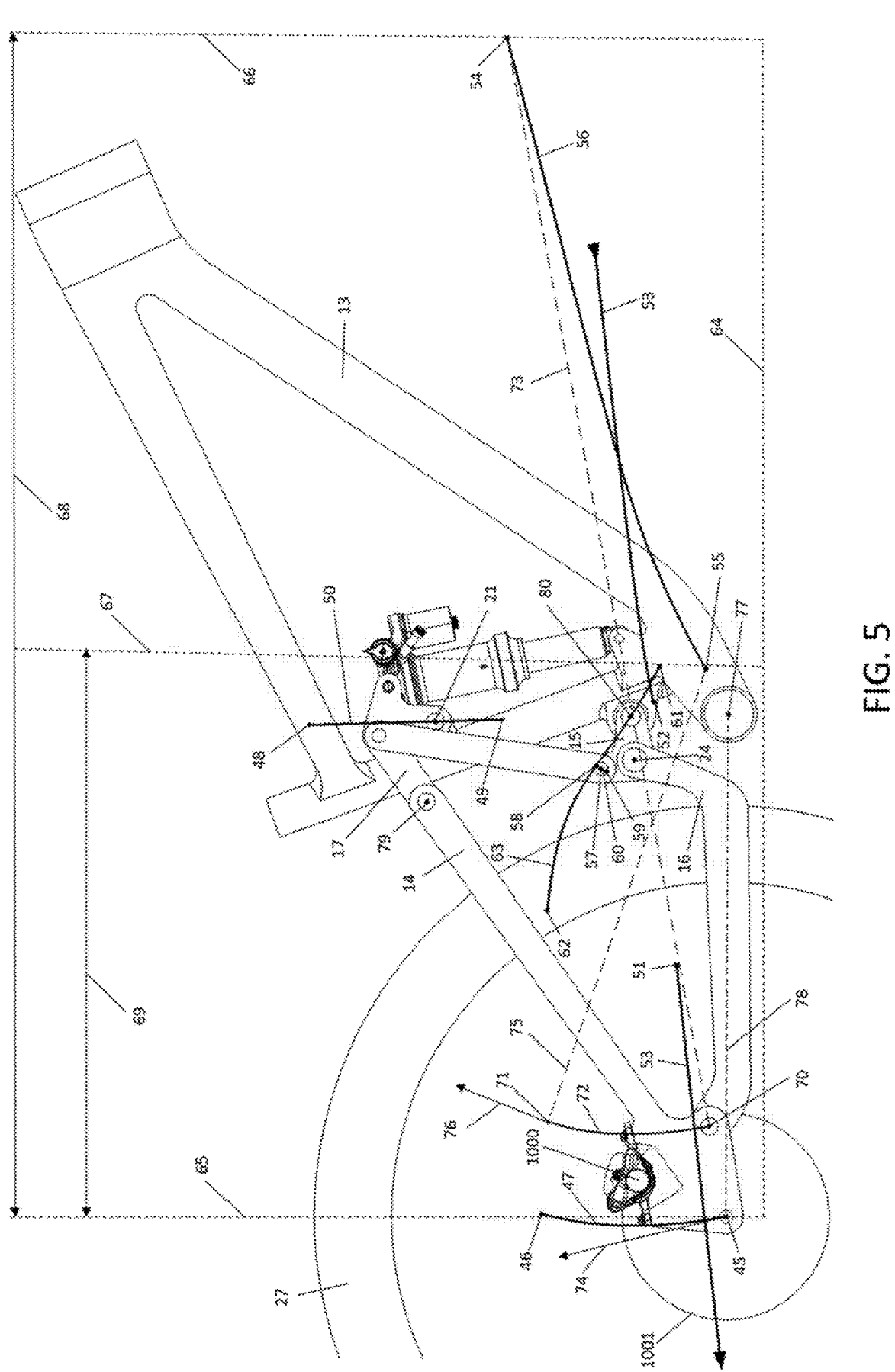
FIG. 5 shows a selected portion of the 15 IVC migration paths of the embodiment shown in FIG. 2.

FIG. 5 illustrates a selected portion of the 15 IVC migration paths of the embodiment shown in FIG. 2. Note that not all IVCs or IVC migrations are shown for clarity of the figure. As shown in FIG. 5, the various parts and IVCs of the suspension system may be located at different positions in the system depending on the state of the system. For example, the driven wheel axis may be located at different positions along the driven wheel axis migration path (DWAP) 47, which has a path length DWAP[L]. For example, the driven wheel axis 45 may be at extended state position as shown in FIG. 5, at compressed state position 46 as shown by the termination of DWAP 47, or at any other position along the DWAP 47. As another example, IVC[15] [17] 33 may be located at different positions along the IVC[15][17] migration path 50. For example, IVC[15][17] may be at extended state position 48, at compressed state position 49, or at any other position along the IVC[15][17] migration path 50. DIVC[AD][13][14] may be located at different positions along the DIVC[AD][13][14] migration path 56, which has a path length DIVC[AD][13][14][L]. For example, DIVC[AD][13][14] may be at extended state position 54, at compressed state position 55, or at any other position along the DIVC[AD][13][14] migration path 56. IVC[15][18] may be located at different positions along the IVC[15][18] migration path 60. For example, IVC[15][18] may be at extended state position 57, at inflection point 58 of bottom link 15, at compressed state position 59, or at any other position along the IVC[15][18] migration path 60. IVC[13][18] may be located at different positions along the IVC[13][18] migration path 63. For example, IVC[13][18] may be at extended state position 61, at compressed state position 62, or at any other position along the IVC[13][18] migration path 63.

The various migration paths may be composed of more than one migration path. For example, IVC[14][15] may be located at different positions along the IVC[14][15] migration path 53, which has an inflection point and is therefore composed of two migration paths. IVC[14][15] may be at extended state position 51, at compressed state position 52, or at any other position along the IVC[14][15] migration path 53. FIG. 5 shows IVC[14][17] at the extended state 79 and SIVC[13][15] at the extended state 80, but for the sake of clarity in the FIG. 5 does not show their migration paths.

Several different relationships may exist between IVCs, as shown in FIG. 5. For example, IVC[14][16] may have different positional relationships relative to various IVCs. IVC[14][16] may be located at different positions along the IVC[14][16] migration path 72. IVC[14][16] may be at extended state position 70, at compressed state position 71, or at any other position along the IVC[14][16] migration path 72. The relationship between IVC[14][16] at extended state position 70 and DIVC[AD][13][14] at extended state position 54 is represented by extended IVC line IVC[E] 73. In various examples, IVC[14][16] extended tangent direction IVC[14][16][ET] 74 is coincident to IVC[14][16] at extended state position 70 and perpendicular to IVC[E] 73. In various examples, the relationship between IVC[14][16] at compressed state position 71 and DIVC[AD][13][14] at compressed state position 55 is represented by compressed IVC line IVC[C] 75. In various examples, IVC[14][16] compressed tangent direction IVC[14][16][CT] 76 is coincident to IVC[14][16] at compressed state position 71 and perpendicular to IVC[C] 75.

In various examples, the base line 64 extends parallel to the ground at the extended state. Rear line 65 extends perpendicular to a rear end of base line 64 and intersects with driven wheel axis 45 at extended state position. Front line 66 extends perpendicular to a front end of base line 64 and intersects with DIVC[AD][13][14] at extended state position 54. Center line 67 is perpendicular to a center portion of base line 64 and intersects with DIVC[AD][13][14] at compressed state position 55. The DIVC extended direction variable (DIVC[AD][EDV]) 68 extends between rear line 65 and front line 66. The DIVC compressed direction variable (DIVC[AD][CDV]) 69 extends between rear line 65 and center line 67.

In numerous embodiments, a method of analyzing different behaviors of the suspension system is disclosed. For example, motions related to inflection point 58 of bottom link 15 may be analyzed as the suspension is moved from the extended to the compressed state. In one example, IVC[15][18] migration path 60 may be analyzed. IVC[15][18] migration path 60 reverses as the suspension moves from the extended state at least partially to the compressed state. In another example, this behavior may be visualized by analyzing IVC[13][18] migration path 63 in comparison to IVC[15][18] migration path 60. When the suspension is in the extended state, IVC[13][18] at extended state position 61 is not coincident to IVC[15][18] migration path 60. As the suspension moves towards the compressed state, IVC[15][18] moves from extended state position 57 towards inflection point 58 of bottom link 15 along IVC[15][18] migration path 60. At a point between the driven wheel axis 45 at the extended state position and at the compressed state 46, IVC[13][18] migration path 63 intersects IVC[15][18] migration path 60 at inflection point 58. As the suspension continues to move towards the compressed state, IVC[15][18] moves from inflection point 58 towards compressed state position 59 along the IVC[15][18] migration path 60.

In various embodiments, the 15 IVC migrations paths can be related. For example, IVC[15][18] migration path 60 ultimately affects DIVC[AD][13][14] migration path 56.

DIVC[AD][13][14] migration path 56 may be configured such that IVC[E] 73 is longer than IVC[C] 75 and the IVC[14][16][ET] 74 is directed more rearward than IVC [14][16][CT] 76. This configuration may impact the IVC [14][16] migration path 72, such that the rearward path at the extended state improves the suspension's ability to absorb bumps and is characteristic of providing a higher anti-squat percentage for pedaling efficiency in the beginning of the travel. The less rearward path at the compressed state minimizes the amount of feedback the chain or belt directs to the suspended body 13 and is characteristic of providing a lower anti-squat percentage to minimize the anti-squat force where bump absorption takes precedence. Thus, suspension performance may be improved through the interrelationship between the 15 IVC migration paths.

Tony Foale (Foale, Tony. *Motorcycle Handling and Chassis Design the Art and Science. Second Edition*. Spain: Tony Foale Designs by Tony Foale, 2002. PDF accessed 2011.) incorporated herein by reference in its entirety, details a simple graphical method to determine anti-squat and anti-rise percentages by using a side view of a belt or chain-driven two-wheel vehicle.

Figure 18:
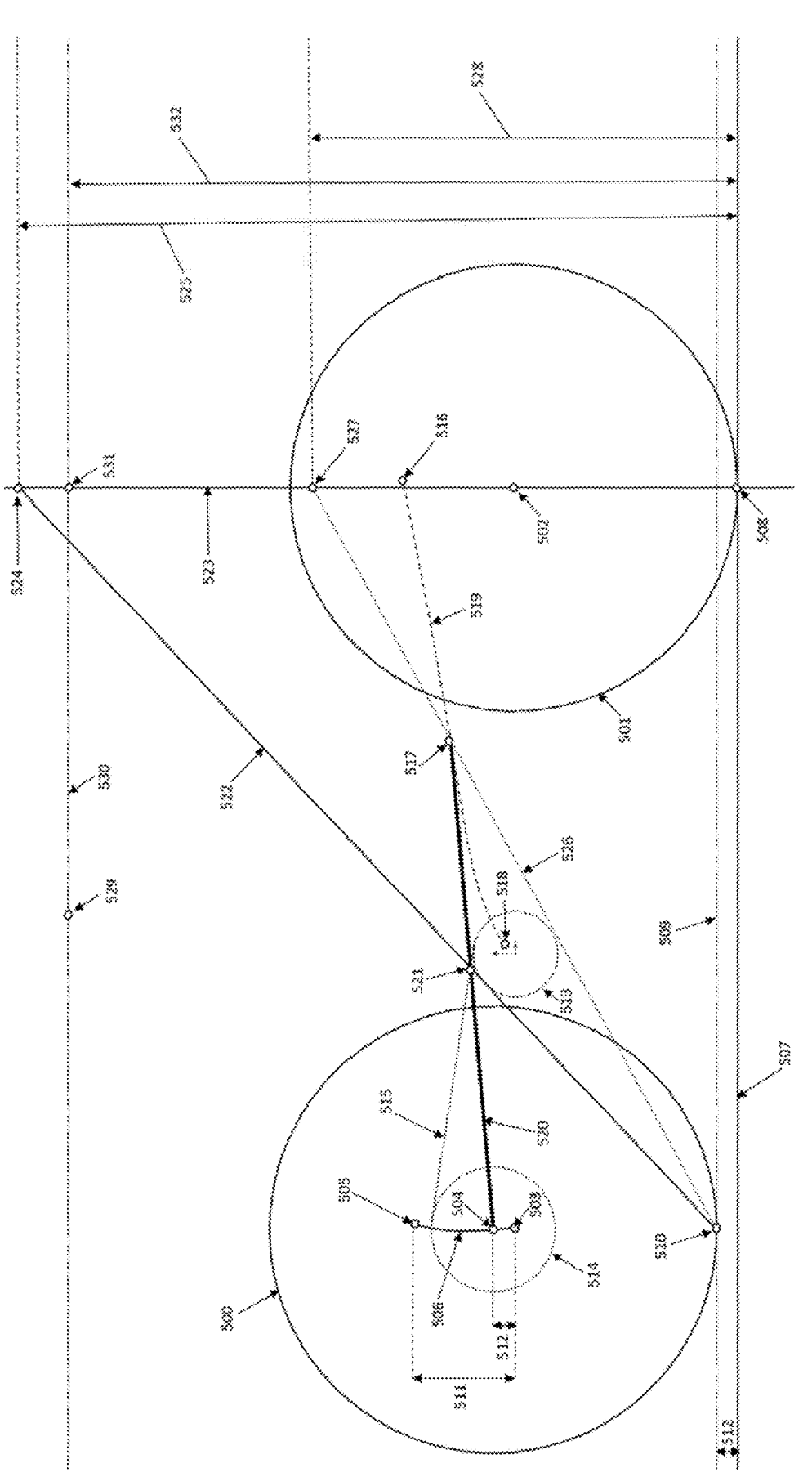
FIG. 18 is a graphical schematic showing an example calculation anti-squat and anti-rise.

The method described in Tony Foale is used in the analysis shown in FIG. 18. Shown in FIG. 18 are the following: Driven wheel 500; front wheel 501; Front wheel axis 502; Driven wheel axis at the extended state 503; Driven wheel axis at an intermediate state 504; Driven wheel axis at the compressed state 505; Driven wheel axis path (DWAP) 506 with length DWAP[L]; Ground line tangent to driven wheel at extended state and perpendicular to gravity 507; Tangent point 508 of front wheel 501 to ground line 507; Ground line at an intermediate state 509 is parallel to 507; Driven wheel tire to ground tangent point at an intermediate state 510; Total driven wheel suspension travel distance perpendicular to the ground line known as the total vertical wheel travel 511; Intermediate driven wheel suspension travel distance perpendicular to the ground line known as the intermediate vertical wheel travel 512; Driving cog 513; Driven cog 514; Chain force vector 515 that is tangent to the tops of the driving cog 513 and the driven cog 514; DIVC[AD] at the extended state 516; DIVC[AD] at an intermediate state 517; DIVC[AD] at the compressed state 518; DIVC[AD] migration path 519; Driving force vector 520 drawn through the driven wheel axis at an intermediate state 504 and the DIVC[AD] at an intermediate state 517; Instantaneous Force Center (IFC) 521 located at the intersection of chain force vector 515 and driving force vector 520; Anti-Squat force vector 522 drawn through the driven wheel tire to ground tangent point at an intermediate state 510 and the Instantaneous Force Center (IFC) 521; Squat layout line 523 which is perpendicular to the ground and passes through the front wheel axis; Anti-Squat definition point 524 where Anti-Squat force vector 522 intersects with Squat layout line 523; Anti-Squat measured distance 525 is the perpendicular distance from the ground line 508 to the Anti-Squat definition point 524; Anti-Rise force vector 526 is drawn through driven wheel tire to ground tangent point at an intermediate state 510 and DIVC[AD] at an intermediate state 517; Anti-Rise definition point 527 where Anti-Rise force vector 526 intersects the Squat layout line 523; Anti-Rise measured distance 528 is the perpendicular distance from the ground line 508 to the Anti-Rise definition point 527; COG 529 is the mass of the suspended body of the vehicle including the rider, passengers and any cargo; COG horizontal 530 is a line drawn parallel to the ground through COG 529; COG definition point 531 is the point in which the COG horizontal 530 intersects the Squat layout line 523; COG measured distance 532 is the perpendicular distance from the ground line 507 to the COG horizontal 530.

Anti-Squat may be defined as:

$$\text{Anti-Squat} = \left(\frac{\text{Anti-Squat measured distance}}{\text{COG measured distance}}\right)100\%$$

Anti-Squat in this example is then equal to:

$$\text{Anti-Squat} = \left(\frac{\text{Anti-Squat measured distance } (525)}{\text{COG measured distance } (532)}\right)100\%$$

Anti-Rise may be defined as:

$$\text{Anti-Rise} = \left(\frac{\text{Anti-Rise measured distance}}{\text{COG measured distance}}\right)100\%$$

Anti-Rise in this example is men equal to:

$$\text{Anti-Rise} = \left(\frac{\text{Anti-Rise measured distance } (528)}{\text{COG measured distance } (532)}\right)100\%$$

Anti-squat and anti-rise may be calculated at all points from the extended state to the compressed state to generate anti-squat and anti-rise curves. These curves are typically plotted as a function of "vertical wheel travel" which is equivalent to the total driven wheel suspension travel distance 511 perpendicular to the ground line 507 in FIG. 18. The anti-squat curve will change depending upon the sizes of driving cog 513 and driven cog 514 since this will change the location of the Instantaneous Force Center (IFC) 521. Note that in this example the DIVC[AD] is considered. As a result, both the anti-squat and anti-rise may be calculated using only the DIVC[AD] migration. If the suspension linkage was arranged so that the DIVC[A] was separate from the DIVC[D], the DIVC[A] migration would be used to calculate the anti-squat, while the DIVC[D] migration would be used to calculate the anti-rise using the same methodology.

When the suspended body is loaded with a rider, passenger or cargo the suspension will compress or sag to a desired vertical wheel travel at sag point 615 between the extended and compressed state. The ideal sag point varies depending upon desired ride characteristics but typically ranges between 15-45%. The suspension will be positioned near this sag point as the vehicle accelerates from a static position.

The sag percentage is defined as the following:

$$\text{Sag} = \left(\frac{\text{Vertical wheel travel value at sag point}}{\text{Total vertical wheel travel value}}\right)100\%$$

Figure 19:
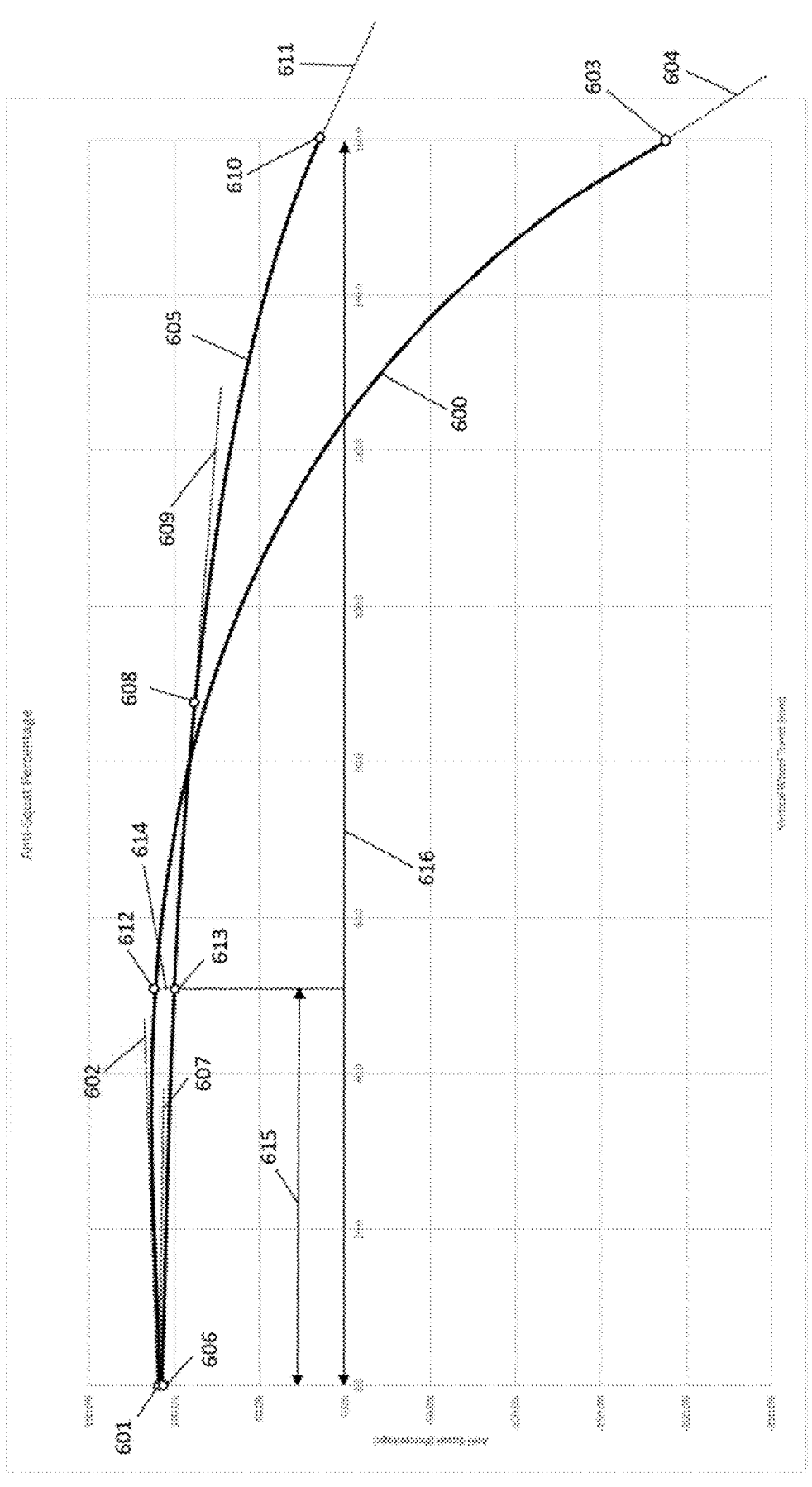
FIG. 19 is a graph depicting two possible anti-squat curves of one embodiment of the disclosed 6-bar linkage.

FIG. 19 shows two embodiments of anti-squat curves in accordance with various linkages disclosed herein with the same size driving cog. Sag percentage in this example is then equal to:

$$\text{Sag} = \left(\frac{\text{Vertical wheel travel at sag point } 615}{\text{Total vertical wheel travel } 616}\right)100\%$$

Anti-squat curve A 600 has a smaller driven cog than anti-squat curve B 605. Anti-squat curve A 600 has a generally stable anti squat value from the extended state 601 and the around sag point 612. Anti-squat curve A 600 initially has a positive slope as shown by tangent line 602. Anti-squat curve A 600 then has a negative slope as shown by tangent line 604. Anti-squat curve B 605 has a generally stable anti squat value from the extended state 606 and the around sag point 613. Anti-squat curve B 605 has a negative slope at the extended state as shown by tangent line 607. Anti-squat curve B 605 then has a slope at intermediate state 608 that has a negative slope as shown by tangent line 609. Tangent line 609 is more negative than tangent line 607. Anti-squat curve B 605 has a negative slope at extended state 610 shown by tangent line 611. Tangent line 611 is more negative than tangent line 609.

Both anti-squat curve A 600 and anti-squat curve B 605 provide a force opposing the weight transfer force. This results in efficient power transfer during acceleration since energy is not being wasted to compress the shock/damper. There is then a quick drop off around the sag point 612 and 613 to the compressed state 603 and 610. This is ideal because continuing a similar anti-squat percentage from 601 to 606 is detrimental in this portion of the travel since it would inhibit suspension compression from absorbing impacts.

Figure 20:
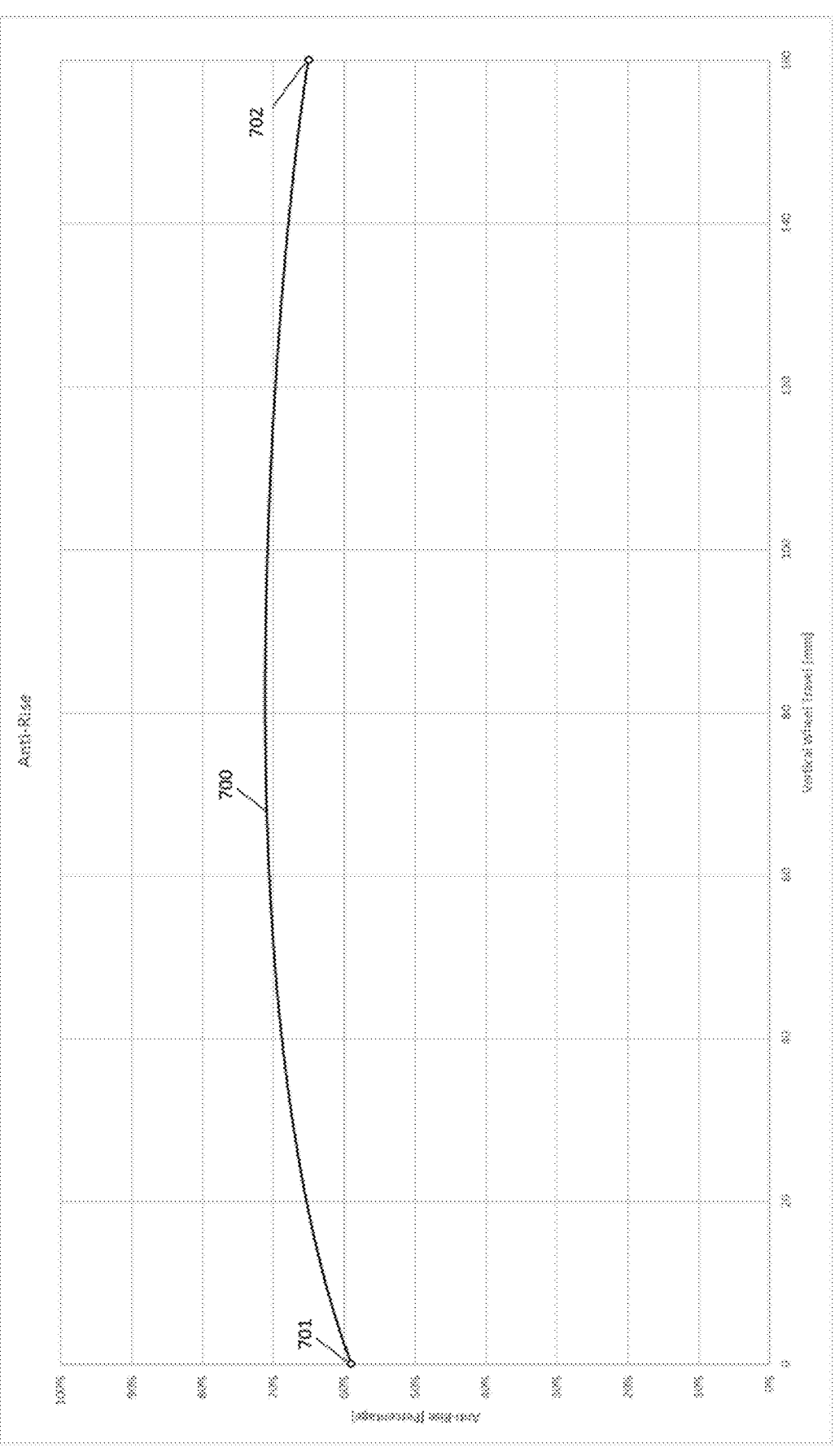
FIG. 20 is a graph of a possible anti-rise curve of one embodiment of the disclosed 6-bar linkage.

FIG. 20 shows a possible anti-rise curve 700 using this embodiment where 701 is the extended state of the suspension and 702 is the compressed state of the suspension. The anti-squat remains in the 30-100% range which is ideal. Anti-rise less than 100% may help improve traction while anti-rise greater than 0% may help stabilize geometry during deceleration.

Figure 21:
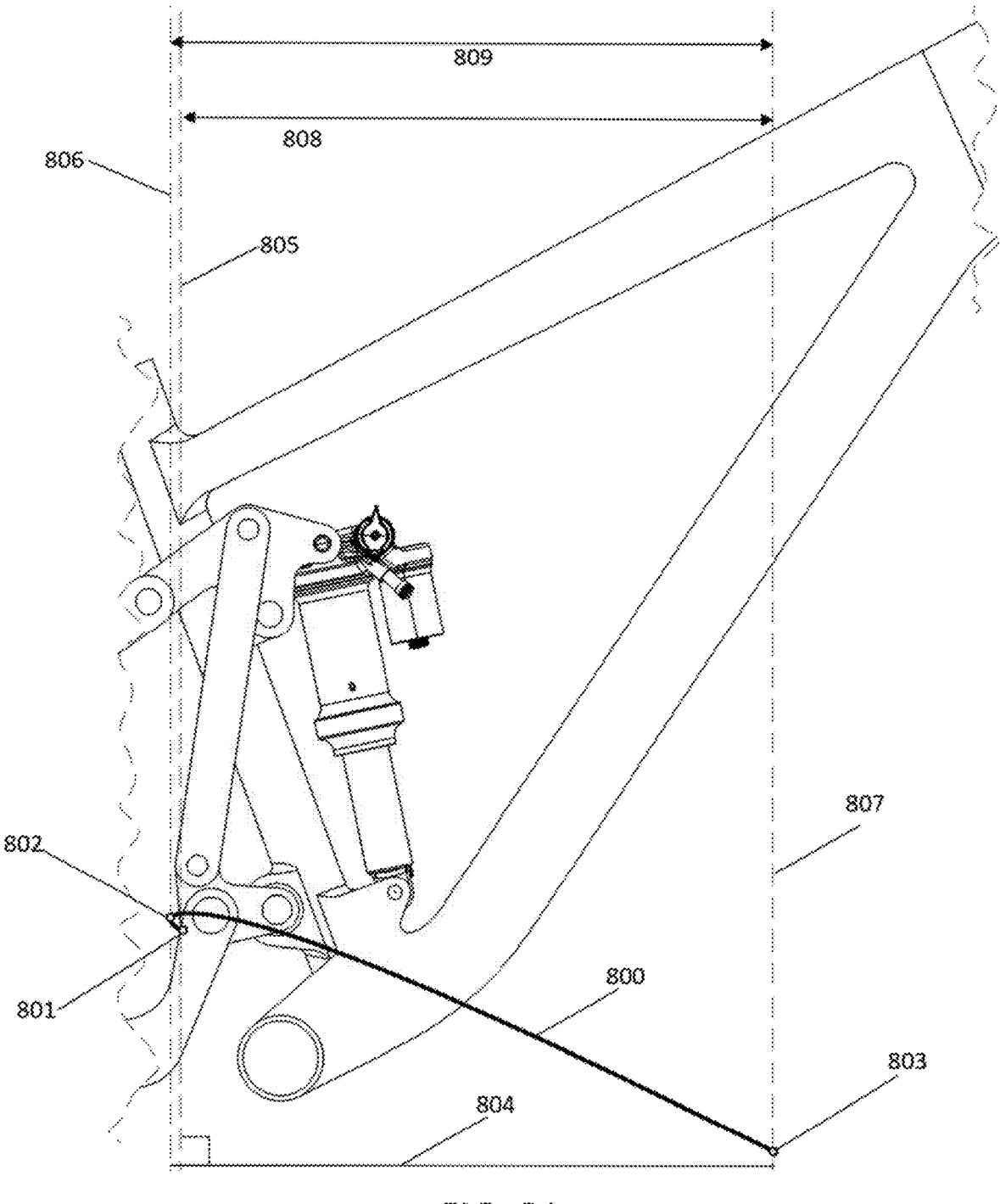
FIG. 21 is a graphical schematic of the instantaneous force center (IFC) of one embodiment of the disclosed 6-bar linkage.

In FIG. 21 the IFC 521 point defined in FIG. 18 may be traced as migration path 800 as the suspension moves from the extended state 801 to the compressed state 803. 804 is a line parallel to the ground line. Line 805 is perpendicular to 804 and passes through 801. IFC[T] Line 806 is perpendicular to 804 and is tangent to 800 at point 802. Line 807 is perpendicular to 804 and passes through 803. The IFC distance at the extended state (IFC[E]) 808 is the distance between 805 and 807. The IFC distance at an intermediate state (IFC[I]) 809 is the distance between 806 and 807. As the suspension moves from the extended state towards the compressed state IFC migration 800 moves generally rearward. As the suspension continues towards the compressed state IFC migration 800 moves forward. This is confirmed by comparing IFC[E] 808 and IFC[I] 809.

The IFC difference (IFC[D]) may be defined as:

IFC[D]=IFC[I]−IFC[E]

The (IFC[D]) in this example is then equal to the following:

IFC[D]=(IFC[I]809)−(IFC[E]808)

If IFC migration 800 moves generally rearward and then generally forward as the suspension moves from the extended state at least partially to the compressed state then IFC[D]>0. This equates to anti-squat and anti-rise behavior noted above.

The leverage rate (LR) is the ratio of the change in vertical wheel travel to the change in shock stroke. A plot can be generated to represent the instantaneous leverage rate from the fully extended to the fully compressed state. The motion ratio (MR) is the inverse of the LR. The higher the leverage rate the greater the mechanical advantage on the shock/damper and the lower the force required to compress the shock. The lower the leverage rate the lesser the mechanical advantage on the shock/damper and the higher the force required to compress the shock.

Figure 22:
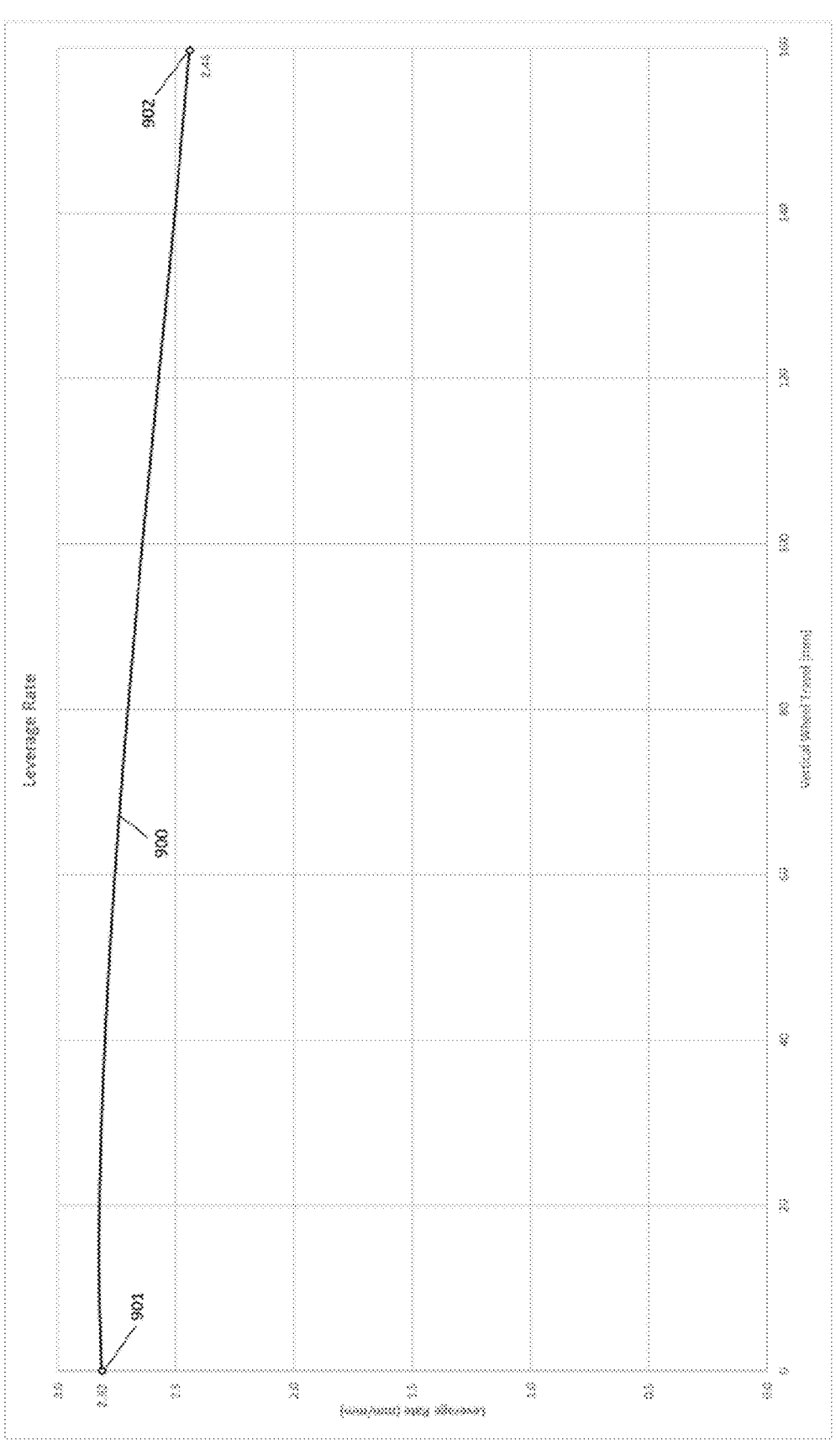
FIG. 22 is a graph of a possible leverage rate curve of one embodiment of the disclosed 6-bar linkage.

FIG. 22 shows a possible leverage rate curve 900 using this embodiment where 901 is the extended state of the suspension and 902 is the compressed state of the suspension. The LR falls generally linearly from 901 to 902. This is preferable because the higher LR in the beginning of the travel helps improve small bump sensitivity, and the lower leverage rate at the end of the travel helps prevent harsh bottom outs. In addition, the general linear trend of the LR curve provides a supported mid-stroke and the aids in shock tuning as there are no dramatic changes in the LR.

Note that anti-squat, anti-rise and leverage ratio are typically highly dependent variables in a typical 4-bar linkage or other suspension designs. As a result, the behavior of these three variables is significantly limited with these designs. The disclosed 6-bar linkage allows for greater separation of these variables so that each can be optimized as discussed above for ideal ride quality.

FIG. 5 also shows a relationship between the driven wheel axis at the extended state 45 and a driving cog axis 77, represented by the driving wheel axis to driving cog axis (DWDC) line 78.

It is contemplated that the relationships between the parts, IVCs, and IVC migration paths of the suspension system of the embodiment shown in FIG. 5 can vary depending on the type of vehicle. For example, for a motorized vehicle or a motor assisted vehicle with the motor mounted to the suspended body, or a human powered vehicle with a gearbox mounted to the suspended body, there is limited space for linkage bodies near the driving cog axis compared to a typical human powered bicycle. The vertical position of the DIVC migration path with respect to the ground has a large influence on the rearward extended and compressed tangent directions and the anti-squat response curve magnitude. The specific path of the DIVC has a large influence on the form of the anti-squat response curve. The vertical position of SIVC[13][15] 80 and IVC[15][16] 24 with respect to the ground at the extended state greatly influence the vertical position of DIVC[AD][13][14] migration path 56 with respect to the ground. However, these may not be easily located near the driving cog axis 77 due to the large motor or gearbox envelope.

With the disclosed suspension linkage, the vertical location of IVC[14][16] 70 at the extended state also greatly influences the vertical position of DIVC[AD][13][14] migration path 56. Due to the large number of IVCs (15) compared to (6) with a 4-bar linkage and the inherent adjustability of the system, the vertical location of IVC[14] [16] 70 at the extended state can be modified with minimal influence on the form of DIVC[AD][13][14] migration path 56. In other words, the magnitude of the anti-squat response curve can be adjusted or scaled while the general form of the anti-squat response curve is preserved. This is not typical with other systems, particularly those with non-linear anti-squat response curves. The position of IVC[14][16] 70 at the extended state can be adjusted to finely tune the anti-squat magnitude despite limited options to locate SIVC[13][15] 80 and IVC[15][16] 24 at the extended state. Therefore, there is a lesser dependency between the position of SIVC[13][15] 80 and IVC[15][16] 24 at the extended state, resulting in the ability to more finely tune the suspension performance.

In other systems, placing the SIVC outside of the motor or gearbox envelope results in limited suspension performance. For instance, placing the SIVC behind the motor or gearbox envelope often results in a longer distance between driving cog axis 77 and driven wheel axis 45 which inhibits the agility of the vehicle, or a low anti-squat response which decreases pedaling efficiency. Placing the SIVC above the motor or gearbox envelope results in an increased rearward extended tangent direction resulting in a large amount of feedback that the driving force directs to the rider, or an anti-squat response that is too high resulting in decreased pedaling efficiency.

Several other configurations are contemplated that improve suspension performance accordingly. In one embodiment, IVC[14][16] 70 at the extended state is located above DWDC line 78 when the suspension is in its extended state as in FIG. 5. This configuration may be preferable with a motorized vehicle or a motor assisted vehicle with the motor mounted to the suspended body, or a human powered vehicle with a gearbox mounted to the suspended body, or a traditional human powered vehicle where the suspended body form limits linkage body clearance near the driving cog axis. In these cases, SIVC[13][15] 80 and IVC[15][16] 24 can be placed outside the motor or gearbox or suspended body envelope while optimizing the anti-squat response curve magnitude and preserving its form. Chain or belt feedback to the rider, as well as the distance between driving cog axis 77 and driven wheel axis 45 for vehicle agility can also be optimized.

In another embodiment, IVC[14][16] 70 at the extended state is located on DWDC line 78. This configuration may be preferable with traditional human powered vehicles. It also may be preferable for a motorized vehicle or a motor assisted vehicle with a low-profile motor mounted to the suspended body, or a human powered vehicle with a low-profile gearbox mounted to the suspended body where linkage bodies may be placed closer to driving cog axis then with larger profile motors or gearboxes. In these cases, SIVC[13][15] 80 and IVC[15][16] 24 can be placed outside the motor or gearbox envelope or driving cog axis while optimizing the anti-squat response curve magnitude and preserving its form. Chain or belt feedback to the rider, as well as the distance between driving cog axis 77 and driven wheel axis 45 for vehicle agility can also be optimized.

In another embodiment, IVC[14][16] 70 at the extended state is located below DWDC line 78. This configuration may be preferable with traditional human powered vehicles. Where linkage bodies may be placed closer to driving cog axis than with the use of motors or gearboxes. In these cases, SIVC[13][15] 80 and IVC[15][16] 24 can be placed outside driving cog axis 77 while optimizing the anti-squat response curve magnitude and preserving its form. Chain or belt feedback to the rider, as well as the distance between driving cog axis 77 and driven wheel axis 45 for vehicle agility can also be optimized.

The movement of the DIVC[AD][13][14] migration path 56 can also provide improved performance. In various embodiments, DIVC[AD][13][14] migration path 56 moves rearward from the extended to the compressed state. This is confirmed by comparing DIVC[AD][EDV] 68 to DIVC [AD][CDV] 69. The relationship of these direction variables to the DIVC[AD][13][14] migration path 56 can be analyzed using the following equations:

$$DIVC[DV]=DIVC[EDV]-DIVC[CDV]$$

where DIVC[DV] is the DIVC Direction Variable Applying the above equation to the current example, the DIVC[DV] is then equal to the following:

$$DIVC[DV]=DIVC[AD][EDV]68-DIVC[AD][CDV] \atop 69$$

When DIVC[DV]>0, the DIVC[AD][13][14] migration path 56 moves rearward. In this embodiment, DIVC[AD][13][14][L] 56 is greater than the DWAP[L] 47. This is confirmed by comparing their ratio. The DIVC Ratio (DIVC[R]) may be defined as:

$$DIVC[R] = \left( \frac{DIVC[X][L]}{DWAP[L]} \right)$$

Applying the above equation to the current example, the DIVC[R] is then equal to the following:

$$DIVC[R] = \left( \frac{\text{Length of } 56}{\text{Length of } 47} \right)$$

Since DIVC[AD][13][14][L] is greater than the DWAP[L] in this example, then DIVC[R]>1.

Figure 6A:
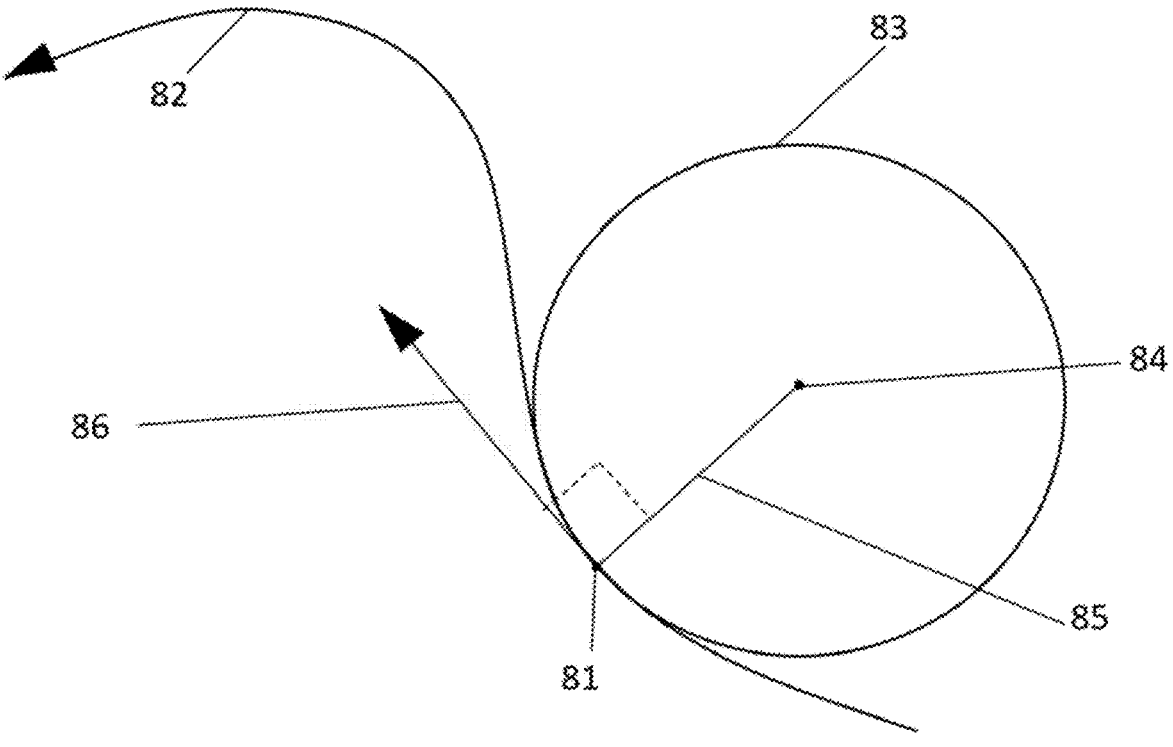
FIG. 6A shows one embodiment of analytical schematic of a IVC migration path.

In various embodiments, mathematical attributes of the IVC migration pathways may be analyzed. FIG. 6A shows one embodiment of an analysis schematic of a DIVC migration path. As shown in FIG. 6A, point 81 is a point located on curve/spline 82 where a circle 83 centered at 84 with radius 85 mathematically best fits curve/spline 82. The curvature k at point 81 of curve or spline 82 where R is radius 85 is defined by the following equation:

$$\text{Curvature} = k = \frac{1}{R}$$

As one example, the curvature of a straight line is defined to be zero since R=∞. Radius R is known as the radius of curvature (RC). Tangent vector (TV) 86 starts at point 81, is perpendicular to radius R 85, and points in the specified direction of curve 82. Point 84, is known as the center of curvature (CC) of curve 82 at point 81. The center of curvature (CC), the radius of curvature (RC), and the tangent vector (TV) may be found at every point along curve 82.

Figure 6B:
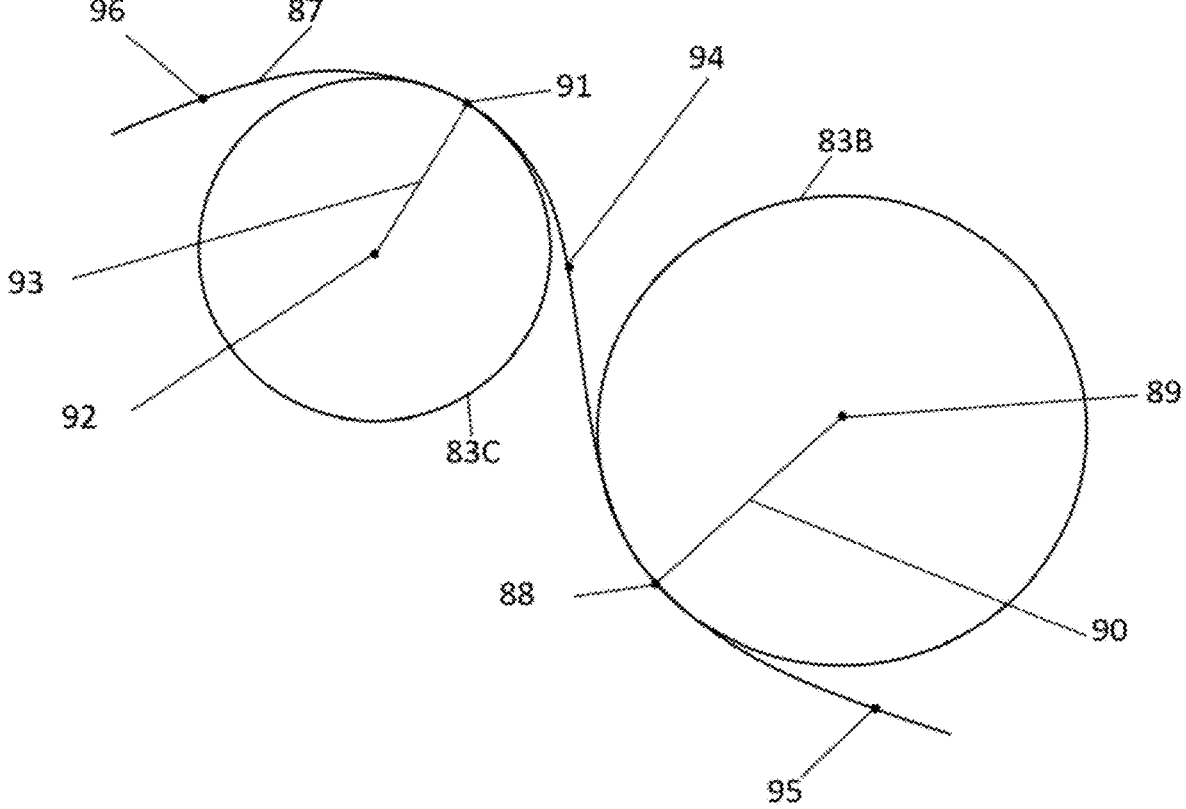
FIG. 6B shows one embodiment of analytical schematic of a IVC migration path.

FIG. 6B shows another embodiment of an analysis schematic of an IVC migration path. FIG. 6B shows a circle 83B and a circle 83C on a curve/spline 87. In FIG. 6B, the large circle 83B point 88 is a point located on curve/spline 87 where circle 83B best fits curve/spline 87. The circle 83B comprises circle CC 89 and circle RC 90. The circle 83C point 91 is a point located on curve/spline 87 where circle 83C best fits curve/spline 87. Circle 83C comprises circle CC 92 and circle RC 93. Circle CC 89 is located on the opposite side of curve 87 compared to circle CC 92. If either CC 89, 92 switches from one side of the curve to the other, curvature inflection results at inflection point 94 on curve 87, where k=0 and RC=∞. RC[min] 93 is the smallest RC value between a first end point 95 and a second end point 96 on curve 87.

Linear algebra may be used to estimate RC, CC and k at a point on a curve C. However, other methods of estimation are also contemplated. Using linear algebra, at least three points a, b, and c along a path may be used to define the CC. A circle may be defined that mathematically best fits through the points a, b and c. It may be noted that this is only an approximation since there is a discretization error. The closer together points a, b and c are, the more accurate the RC, CC and k values will be using this method. It is preferable that points a, b and c are within a 5% distance of the length of curve C for each increment.

As an example, three different points on curve C may be selected at locations a, b and c, where a and c are on opposite sides of b. An x,y coordinate can then be determined for both the CC and RC at point b using linear algebra. In this example, the RC magnitude is calculated and the CC (x,y) coordinates are determined. The following equations are representative of this method:

$$a = \begin{vmatrix} x_1 & y_1 & 1 \\ x_2 & y_2 & 1 \\ x_3 & y_3 & 1 \end{vmatrix}$$

$$a = x_1[(y_2*1)-(y_3*1)] - y_1[(x_2*1)-(x_3*1)] + 1[(x_2*y_3)-(x_3*y_2)]$$

$$b_x = -\begin{vmatrix} x_1^2+y_1^2 & y_1 & 1 \\ x_2^2+y_2^2 & y_2 & 1 \\ x_3^2+y_3^2 & y_3 & 1 \end{vmatrix}$$

$$b_x = -(x_1^2+y_1^2)[(y_2*1)-(y_3*1)] + y_1[((x_2^2+y_2^2)*1)-((x_3^2+y_3^2)*1)] - \\ 1[((x_2^2+y_2^2)*y_3)-((x_3^2+y_3^2)*y_2)]$$

$$b_y = \begin{vmatrix} x_1^2+y_1^2 & x_1 & 1 \\ x_2^2+y_2^2 & x_2 & 1 \\ x_3^2+y_3^2 & x_3 & 1 \end{vmatrix}$$

$$b_y = (x_1^2+y_1^2)[(x_2*1)-(x_3*1)] - \\ x_1[((x_2^2+y_2^2)*1)-((x_3^2+y_3^2)*1)] + 1[((x_2^2+y_2^2)*x_3)-((x_3^2+y_3^2)*x_2)]$$

$$c = -\begin{vmatrix} x_1^2+y_1^2 & x_1 & y_1 \\ x_2^2+y_2^2 & x_2 & y_2 \\ x_3^2+y_3^2 & x_3 & y_3 \end{vmatrix}$$

$$c = \\ -(x_1^2+y_1^2)[(x_2*y_3)-(x_3*y_2)] + x_1[((x_2^2+y_2^2)*y_3)-((x_3^2+y_3^2)*y_2)] - \\ y_1[((x_2^2+y_2^2)*x_3)-((x_3^2+y_3^2)*x_2)]$$

$$x = -\frac{b_x}{2a}$$

$$y = -\frac{b_y}{2a}$$

$$RC = \frac{\sqrt{b_x^2+b_y^2-4ac}}{2|a|}$$

Other methods can also be used. For example, as an alternative, calculus may be used to determine curvature k should the equation of curve C be known; however, it is contemplated that the equation of curve C may not be known.

In another example, computer aided design (CAD) tools may be used to plot the DIVC migration curve with great resolution. The number of the divisions into which the suspension travel is divided (i.e., the total number of IVC points created to generate a curve) can be large resulting in more accurate results.

A tool in some CAD software is the ability to display "curvature combs", curvature inflection points, and minimum radii of a curve or spline. Curvature combs visually display the curvature of a curve or spline by showing a network of "combs" or lines along the RC direction at a specified density along path C that represent the curvature k. The greater the magnitude of the comb, the greater k. In addition, the side of which the combs reside designate the curvature sign. Therefore, if the combs switch sides, there is an inflection point where k=0 and the curvature comb magnitude is zero.

Figure 7:
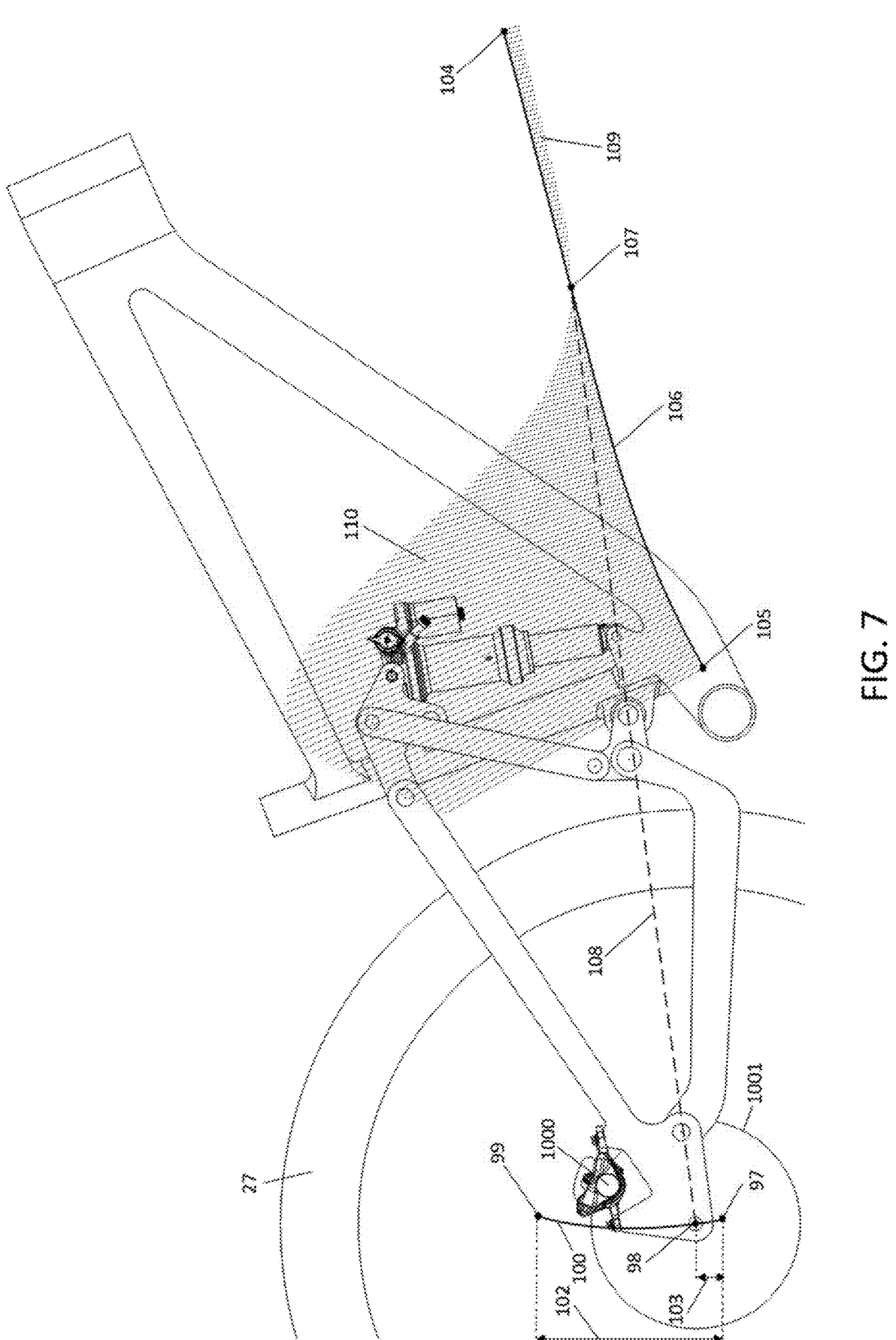
FIG. 7 is a side view of a suspension system analyzed using curvature combs.

FIG. 7 shows a side view of a suspension system analyzed using curvature combs. In FIG. 7, the driven wheel axis may be located at different positions along the driven wheel axis migration path DWAP 100, which has a length DWAP[L]. The driven wheel axis may be at an extended state position 97, at an intermediate state position 98, at a compressed state position 99, or at any other position along the driven wheel axis migration path DWAP 100. In the example shown in FIG. 7, a total driven wheel suspension travel distance VWT[T] 102 and an intermediate driven wheel suspension travel distance VWT[I] 103 are both perpendicular to the ground. A DIVC may be located at different positions along the DIVC[AD] migration curve 106. For example, DIVC may be at extended state position 104, at compressed state position 105, at curvature inflection point 107, or at any other position along the DIVC[AD] migration curve 106. A relationship between the driven wheel axis at intermediate state position 98 and DIVC[AD] 106 at curvature inflection point 107 is shown by driving vector at an intermediate state 108. Curvature combs 109 of DIVC[AD] 106 are shown between DIVC[AD] at extended state position 104 and DIVC[AD] at curvature inflection point 107. Curvature combs 110 of DIVC[AD] 106 are also shown between DIVC[AD] at curvature inflection point 107 and DIVC[AD] at compressed state position 105. In the depicted embodiment, curvature combs 109 and curvature combs 110 are on opposite sides of DIVC[AD] 106.

Percent travel can be defined as the following:

$$\text{Percent Travel} = \left(\frac{VWT[I]}{VWT[T]}\right) 100\%$$

Percent travel in the example depicted in FIG. 7 can be defined as the following:

$$\text{Percent Travel} = \left(\frac{\text{Intermediate driven wheel travel distance } 103}{\text{Total driven wheel travel distance } 102}\right) 100\%$$

In one embodiment, a curvature inflection point 107 of DIVC[AD] 106 occurs when Percent Travel≈10-50%. It is also contemplated that DIVC[R]≈>2.

Figure 8:
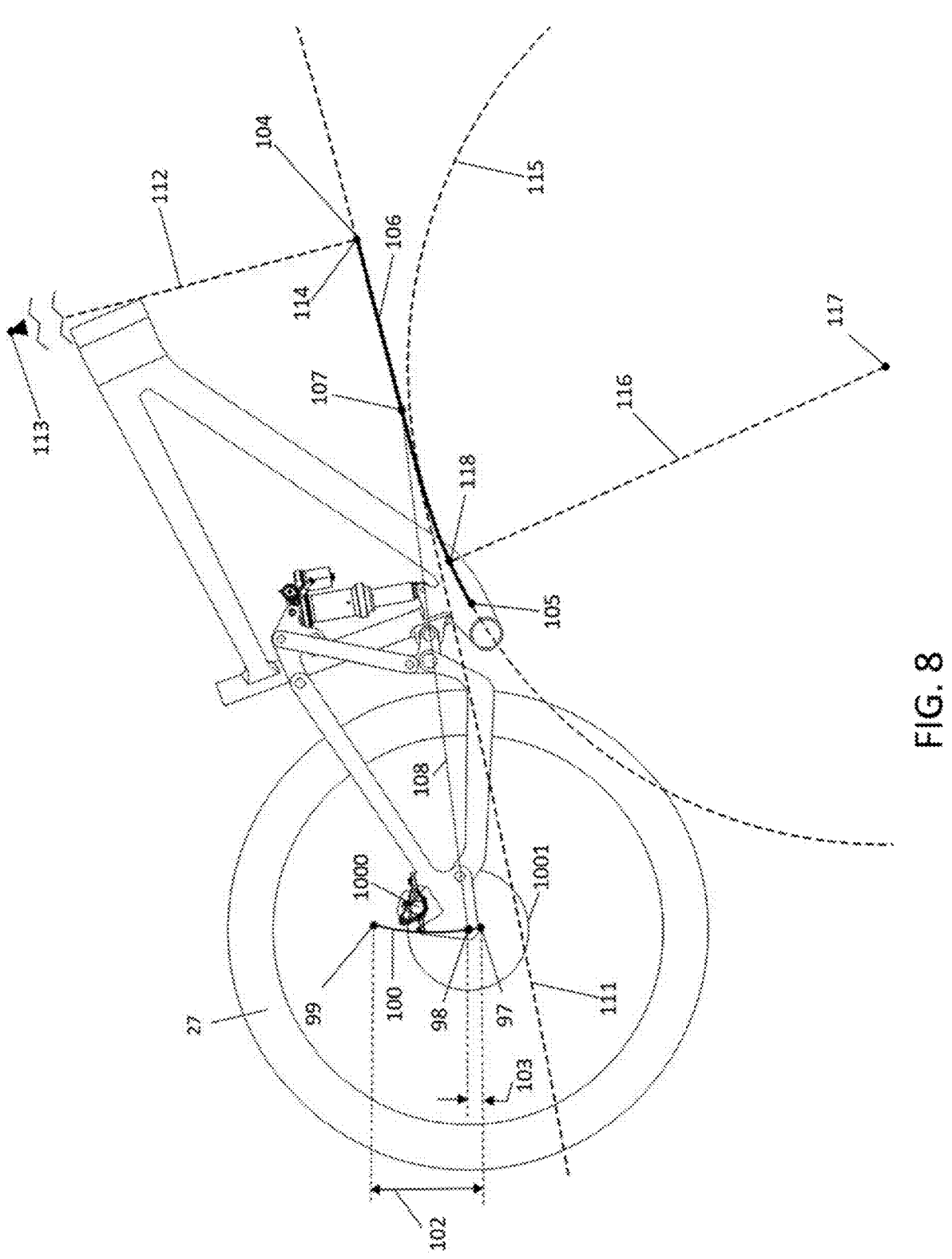
FIG. 8 shows a method of assessing suspension performance of the suspension system of FIG. 7 by analyzing a DIVC migration curve.

FIG. 8 shows a method of assessing suspension performance of the suspension system of FIG. 7 by analyzing the DIVC[AD] migration curve 106. As mentioned, DIVC[AD] may be at extended state position 104, at compressed state position 105, at curvature inflection point 107, or at any other position along the DIVC[AD] migration curve 106. FIG. 8 also shows Circle_Min[BI] 111 with RC_Min[BI] 112 centered at CC[BI] 113, which intersects with DIVC[AD] migration curve 106 at a first intersection point 114, as well as Circle_Min[AI] 115 with RC_Min[AI] 116 centered at CC[AI] 117, which intersects with DIVC[AD] migration curve 106 at a second intersection point 118. In the embodiment shown in FIG. 8, the minimum radius of curvature 112 of DIVC[AD] 106 between DIVC[AD] at the extended state 104 and curvature inflection point 107 is greater than the minimum radius of curvature 116 of DIVC[AD] 106 between inflection point 107 and DIVC[AD] at the compressed state 105, or:

$$RC\text{min}[BI] > RC\text{min}[AI]$$

Since the minimum radius of curvature are found on opposite sides of curvature inflection point 107, their corresponding CCs are on opposite sides of DIVC migration curve 106. The depicted DIVC[AD] migration curvature and minimum radius is characteristic of the acceleration (anti-squat) and deceleration (anti-rise) responses described in FIG. 19 and FIG. 20.

Figure 9:
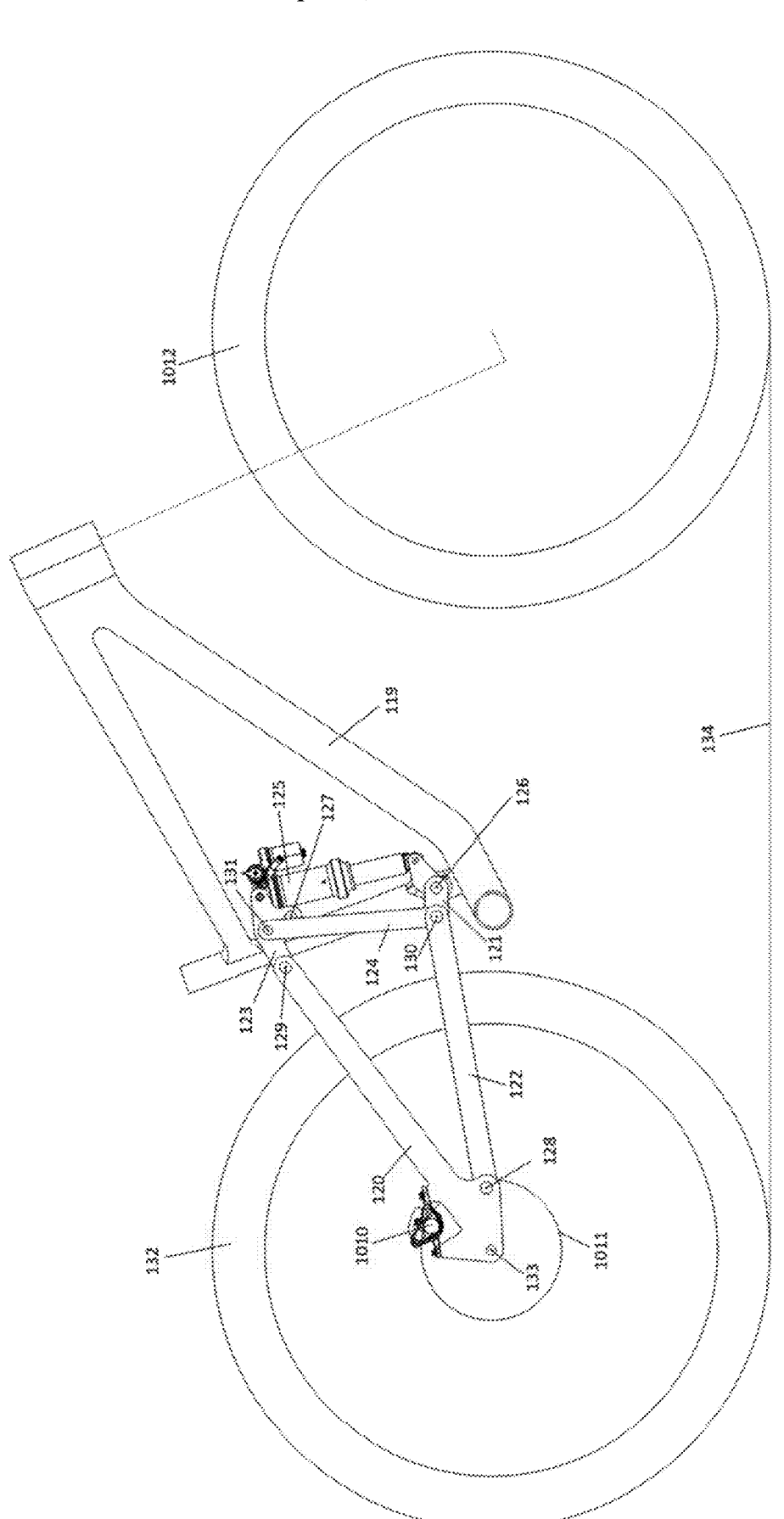
FIG. 9 shows another embodiment of a 6-bar linkage of the disclosed suspension system in the extended state.

FIG. 9 shows another embodiment of a 6-bar linkage of the disclosed suspension system in the extended state. In this embodiment, a suspension body 119 is suspended by at least the rear suspension of the vehicle. Seat-stay 120 is a dynamic body (DB), comprising both a wheel carrier and a brake carrier. Brake caliper 1010 is connected to seatstay 120 in this embodiment. Note that in other embodiments 120 maybe be a wheel carrier only, a brake carrier only, or it can be a non-dynamic body. The seat-stay 120 comprises a driven wheel axis 133 that is supports and allows a driven wheel 132 the ability to rotate relative thereto. The driven wheel 132 engages with the ground 134 in the extended state. Brake rotor 1011 is operatively connected to driven wheel 132 such that it can retard rotation when the brake caliper applies friction thereto. Front wheel 1012 is operatively connected to a fork such that it is able to rotate relative thereto. The fork is operatively connected to suspension body 119. Preferably, this operative connection is via a front suspension system not shown for simplicity. A chain-stay 122 is connects to the seat-stay 120 and a center link 124 via flexible joints. A lower link 121 is connected to the suspended body 119, the chain-stay 122, and the center link 124 via flexible joints. An upper link 123 is connected to the suspension body 119, the seat-stay 120 and the center link 124 via flexible joints. A damper 125 is operatively coupled any two of the various link bodies discussed above. In one example, the damper 125 is connected to the suspended body 119 and the upper link 123 via flexible joints. A variety of joints can be used to connect the various components as discussed in more detail above.

As mentioned previously, there are 15 IVCs in a 6-bar linkage. The known IVCs are shown in FIG. 9: SIVC[119][121] 126, SIVC[119][123] 127, IVC[120][122] 128, IVC[120][123] 129, IVC[121][122] (which is equal to IVC[121][124] and IVC[122][124]) at point P 130, and IVC[123][124] 131. Since IVC[121][122] is equal to IVC[121][124] and IVC[122][124] at point P 130, IVC[121][122] and IVC[121][124] are located on the same side of SIVC[119][121] 126 in this embodiment. In this embodiment, chain-stay 122 is a binary link, as it only directly rotates about two IVCs: IVC[120][122] 128 and P 130. For example, a triangle cannot be drawn from IVC[120][122] 128 to P 130; instead, only a line is possible.

Figure 10:
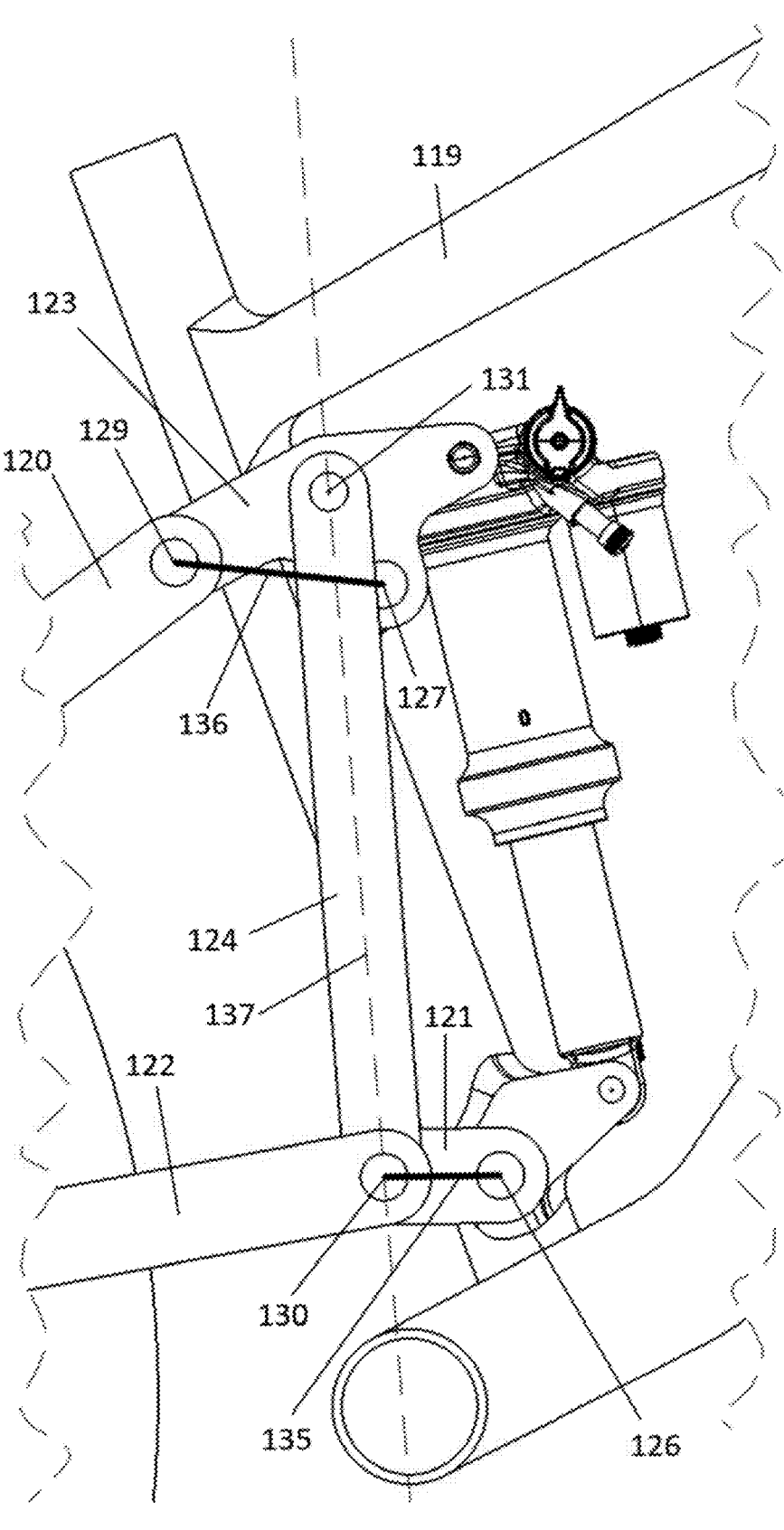
FIG. 10 is a detailed view of a portion of the suspension system of FIG. 9 showing some of the IVCs of the system.

FIG. 10 is a detail view of a portion of the suspension system of FIG. 9 showing some of the IVCs of the system. In FIG. 10, six of the 15 IVCs of the system are shown: SIVC[119][121] 126, SIVC[119][123] 127, IVC[120][123] 129, IVC[121][122]=IVC[121][124]=IVC[122][124]=IVC[P] 130 are shown. A lower base line 135 extends from SIVC[119][121] 126 to IVC[P] 130. An upper base line 136 extends from SIVC[119][123] 127 to IVC[120][123] 129. A dashed line 137 passes through IVC[P] 130 and IVC[123] [124] 131. IVC[123][124] 131 is located above the upper base line 136. The dashed line 137 passes directly through IVC[P] 130, such that it is not between SIVC[119][121] 126 and IVC[P] 130.

Figure 11:
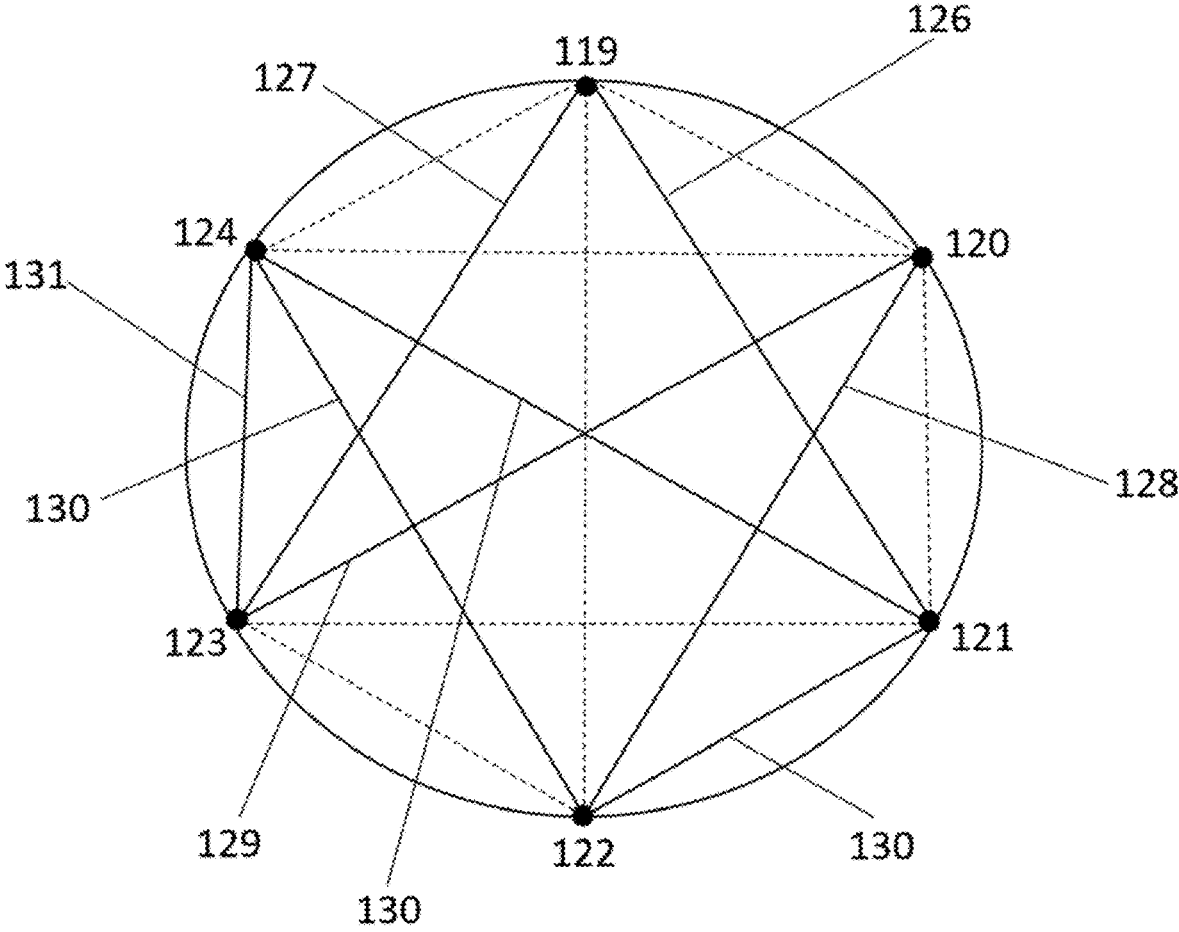
FIG. 11 is an analytical schematic representing the relationships between the various parts and IVCs of the suspension system of FIG. 9.

FIG. 11 is an analytical schematic representing the relationships between the various parts and IVCs of the suspension system of FIG. 9. The suspended body 119, seat-stay 120, lower link 121, chain-stay 122, upper link 123, and center link 124 are represented by points along the circumference of the analytical schematic. Lines represent the 15 IVCs linking each part of the suspension system. Solid lines show the known IVCs, SIVC[119][121] 126, SIVC[119] [123] 127, IVC[120][122] 128, IVC[120][123] 129, IVC [121][122]=IVC[121][124]=IVC[122][124]=IVC[P]    130, and IVC[123][124] 131, depicted in FIG. 9, while the dashed lines represent the unknown IVCs, DIVC[119][120], IVC[119][122], IVC[119][124], IVC[120][121], IVC[120] [124], IVC[121][123], and IVC[122][123], not shown in FIG. 9. The analytical schematic of FIG. 11 shows that there are two linkage bodies that are operatively coupled to the suspended body 119: lower link 121 and upper link 123 because the only solid lines in connection with the suspended body 119 are SIVC[119][121] 126 and SIVC[119] [123] 127.

As can be seen in FIG. 11, the 6-bar system is more complex than a 4-bar system. For example, DIVC[AD][119] [120] is derived using more IVC relationships. As discussed above with other embodiments, a change to the basic linkage layout can have a significant effect on IVC migration paths. This in effect gives rise to many more possible IVC migration paths as the suspension moves from a fully extended to a fully compressed state.

DIVC[AD][119][120] can be solved for by using the analytical schematic of FIG. 11 and the same methodology described previously. IVC migration plots or curves can be plotted graphically by solving for the IVC at each position between the extended and compressed suspension states. A position of the linkage in between the extended and compressed states is known as an intermediate state. The IVC migration curves depend upon the reference frame considered. In most cases, the suspended body is fixed as the driven wheel moves from the extended to the compressed state.

Figure 12:
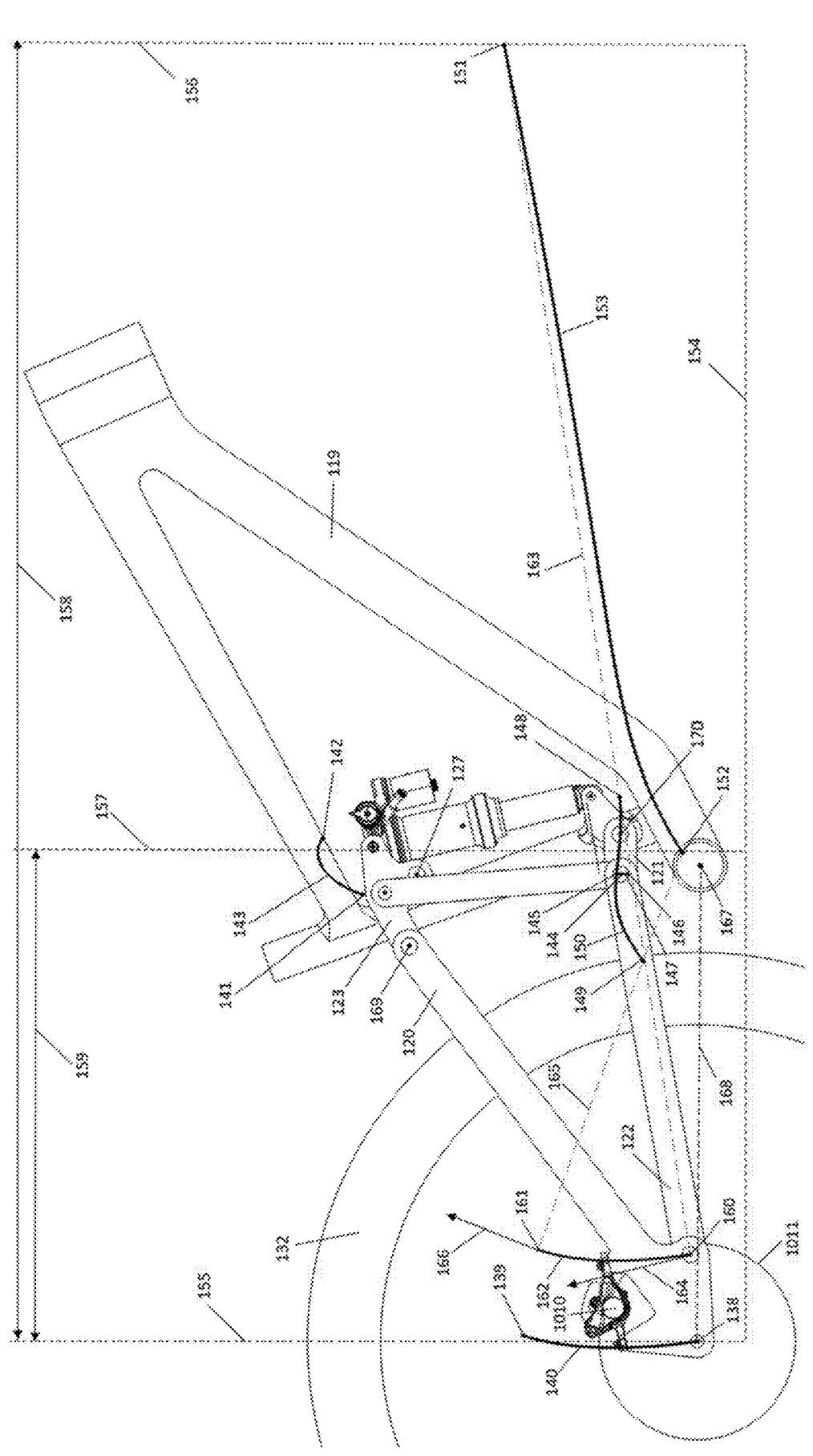
FIG. 12 shows a selected portion of the 15 IVC migration paths of the embodiment shown in FIG. 9.

FIG. 12 illustrates a selected portion of the 15 IVC migration paths of the embodiment shown in FIG. 9. Note that not all IVCs or IVC migrations are shown for clarity of the figure. As shown in FIG. 12, the various parts and IVCs of the suspension system may be located at different positions in the system depending on the state of the system. For example, the driven wheel axis may be located at different positions along the driven wheel axis migration path (DWAP) 140, which has a path length DWAP[L]. In various examples, the driven wheel axis may be at the extended state position 138, at the compressed state position 139, or at any other position along the DWAP 140. In various examples, IVC[122][123] may be located at different positions along the IVC[122][123] migration path 143. In various examples, IVC[122][123] may be at the extended state position 141, at the compressed state position 142, or at any other position along the IVC[122][123] migration path 143. In various examples, IVC[P] may be located at different positions along the IVC[P] migration path 147. In various examples, IVC[P] may be at the extended state position 144, at the inflection point of lower link 121, at the compressed state position 146, or at any other position along the IVC[P]

migration path 147. In various examples, IVC[119][122] may be located at different positions along the IVC[119] [122] migration path 150. In various examples, IVC[119] [122] may be at the extended state position 148, at the compressed state position 149, or at any other position along the IVC[119][122] migration path 150. In various examples, DIVC[AD][119][120] may be located at different positions along the DIVC[AD][119][120] migration path 153. In various examples, DIVC[AD][119][120] may be at the extended state position 151, at the compressed state position 152, or at any other position along the DIVC[AD][119][120] migration path 153. In various examples as illustrated in FIG. 12 IVC[120][123] can be at the extended state 169 and SIVC[119][121] can be at the extended state 170.

Several different relationships may exist between IVCs, as shown in FIG. 12. For example, IVC[120][122] may have different positional relationships relative to various IVCs. IVC[120][122] may be located at different positions along the IVC[120][122] migration path 162. IVC[120][122] may be at the extended state position 160, at the compressed state position 161, or at any other position along the IVC[120] [122] migration path 162. In various examples, the relationship between IVC[120][122] at the extended state position 160 and DIVC[AD][119][120] at the extended state position 151 is represented by extended IVC line IVC[E] 163. In various examples, IVC[120][122] extended tangent direction IVC[120][122][ET] 164 may be coincident to IVC[120] [122] at the extended state position 160 and perpendicular to IVC[E] 163. In various examples, the relationship between IVC[120][122] at the compressed state position 161 and DIVC[AD][119][120] at the compressed state position 152 is represented by compressed IVC line IVC[C] 165. In various examples, IVC[120][122] compressed tangent direction IVC[120][122][CT] 166 may be coincident to IVC[120][122] at the compressed state position 161 and perpendicular to IVC[C] 165.

FIG. 12 also shows a relationship between a driven wheel axis at the extended state position 138 and a driving cog axis 167 in the suspension system, represented by the driving wheel axis to driving cog axis (DWDC) line 168.

Several direction variables may exist within the suspension system depending on the system state. For example, with reference to FIG. 12, the suspension system may have a DIVC extended direction variable (DIVC[EDV]) when in the extended state or a DIVC compressed direction variable (DIVC[CDV]) when in the compressed state. The construction of these variables is shown through the various lines in FIG. 12. In various examples, base line 154 extends parallel to the ground at the extended state. Rear line 155 extends perpendicular to a rear end of base line 154 and intersects with driven wheel axis at extended state position 138. Front line 156 extends perpendicular to a front end of base line 154 and intersects with DIVC[AD][119][120] at the extended state position 151. Center line 157 is perpendicular to a center portion of base line 154 and intersects with DIVC [AD][119][120] at the compressed state position 152. The DIVC extended direction variable (DIVC[EDV]) 158 extends between rear line 155 and front line 156. The DIVC compressed direction variable (DIVC[CDV]) 159 extends between rear line 155 and center line 157.

Motions related to inflection point 145 of lower link 121 may be analyzed as the suspension is moved from the extended to the compressed state. In one example, IVC[P] migration path 147 may be analyzed. IVC[P] migration path 147 reverses as the suspension moves from the extended state at least partially to the compressed state. In another example, this behavior may be visualized by analyzing the IVC[119][122] migration path 150 in comparison to IVC[P] migration path 147. When the suspension is in the extended state, IVC[119][122] at the extended state position 148 is not coincident to lower link inflection point 145. As the suspension moves towards the compressed state, IVC[P] moves from the extended state position 144 towards lower link inflection point 145 along IVC[P] migration path 147. At a point between the driven wheel axis at the extended state position 138 and at the compressed state position 139, IVC[119][122] migration path 150 intersects IVC[P] migration path 147 at inflection point 145. As the suspension continues to move towards the compressed state, IVC[P] moves from inflection point 145 towards the compressed state position 146 along IVC[P] migration path 147.

Notably the various 15 IVC migrations paths are related. For example, IVC[P] migration path 147 ultimately affects DIVC[AD][119][120] migration path 153. DIVC[AD][119][120] migration path 153 is such that IVC[E] 163 is longer than IVC[C] 165 and the IVC[120][122][ET] 164 is directed more rearward than IVC[120][122][CT] 166. Therefore, the IVC[120][122] migration path 162 is such that the rearward path at the extended state improves the suspension's ability to absorb bumps and is characteristic of providing a higher anti-squat percentage for pedaling efficiency in the beginning of the travel The less rearward path at the compressed state minimizes the amount of feedback the chain or belt directs to the suspended body 13 and is characteristic of providing a lower anti-squat percentage to minimize the anti-squat force where bump absorption takes precedence. Thus, suspension performance may be improved through the interrelationship between the 15 IVC migration paths.

It is contemplated that the relationships between the parts, IVCs, and IVC migration paths of the suspension system of the embodiment shown in FIG. 12 will vary depending on the type of vehicle. For example, for a motorized vehicle or a motor assisted vehicle with the motor mounted to the suspended body, or a human powered vehicle with a gearbox mounted to the suspended body, there is limited space for linkage bodies near the driving cog axis compared to a typical human powered bicycle. The vertical position of the DIVC migration path with respect to the ground has a large influence on the rearward extended and compressed tangent directions and the anti-squat response curve magnitude. The specific path of the DIVC has a large influence on the form of the anti-squat response curve. The vertical position of SIVC[119][121] 170 and IVC[P] 144 with respect to the ground at the extended state greatly influence the vertical position of DIVC[AD][119][120] migration path 153 with respect to the ground. However, these may not be easily located near the driving cog axis 167 due to the large motor or gearbox envelope.

With the disclosed suspension linkage, the vertical location of IVC[120][122] 160 at the extended state also greatly influences the vertical position of DIVC[AD][119][120] migration path 153. Due to the large number of IVCs (15) compared to (6) with a 4-bar linkage and the inherent adjustability of the system, the vertical location of IVC[120][122] 160 at the extended state can be modified with minimal influence on the form of DIVC[AD][119][120] migration path 153. In other words, the magnitude of the anti-squat response curve can be adjusted or scaled while the general form of the anti-squat response curve is preserved. This is not typical with other systems, particularly those with non-linear anti-squat response curves. The position of IVC [120][122] 160 at the extended state can be adjusted to finely tune the anti-squat magnitude despite limited options to locate SIVC[119][121] 170 and IVC[P] 144 at the extended state. Therefore, there is a lesser dependency between the position of SIVC[119][121] 170 and IVC[P] 144 at the extended state, resulting in the ability to more finely tune the suspension performance.

In other systems, placing the SIVC outside of the motor or gearbox envelope results in limited suspension performance. For instance, placing the SIVC behind the motor or gearbox envelope often results in a longer distance between driving cog axis 167 and driven wheel axis 138 which inhibits the agility of the vehicle, or a low anti-squat response which decreases pedaling efficiency. Placing the SIVC above the motor or gearbox envelope results in an increased rearward extended tangent direction resulting in a large amount of feedback that the driving force directs to the rider, or an anti-squat response that is too high resulting in decreased pedaling efficiency.

Several other configurations are contemplated that improve suspension performance accordingly. In one embodiment, IVC[120][122] 160 at the extended state is located above DWDC line 168 when the suspension is in its extended state as in FIG. 12. This configuration may be preferable with a motorized vehicle or a motor assisted vehicle with the motor mounted to the suspended body, or a human powered vehicle with a gearbox mounted to the suspended body, or a traditional human powered vehicle where the suspended body form limits linkage body clearance near the driving cog axis. In these cases, SIVC[119] [121] 170 and IVC[P] 144 can be placed outside the motor or gearbox or suspended body envelope while optimizing the anti-squat response curve magnitude and preserving its form. Chain or belt feedback to the rider, as well as the distance between driving cog axis 167 and driven wheel axis 138 for vehicle agility can also be optimized.

In another embodiment, IVC[120][122] 160 at the extended state is located on DWDC line 168. This configuration may be preferable with traditional human powered vehicles. It also may be preferable for a motorized vehicle or a motor assisted vehicle with a low-profile motor mounted to the suspended body, or a human powered vehicle with a low-profile gearbox mounted to the suspended body where linkage bodies may be placed closer to driving cog axis then with larger profile motors or gearboxes. In these cases, SIVC[119][121] 170 and IVC[P] 144 can be placed outside the motor or gearbox envelope or driving cog axis while optimizing the anti-squat response curve magnitude and preserving its form. Chain or belt feedback to the rider, as well as the distance between driving cog axis 167 and driven wheel axis 138 for vehicle agility can also be optimized.

In another embodiment, IVC[120][122] 160 at the extended state is located below DWDC line 168. This configuration may be preferable with traditional human powered vehicles. Where linkage bodies may be placed closer to driving cog axis than with the use of motors or gearboxes. In these cases, SIVC[119][121] 170 and IVC[P] 144 can be placed outside driving cog axis 167 while optimizing the anti-squat response curve magnitude and preserving its form. Chain or belt feedback to the rider, as well as the distance between driving cog axis 167 and driven wheel axis 138 for vehicle agility can also be optimized.

It is contemplated that the embodiment depicted in FIG. 12 may achieve similar suspension performance as the embodiment shown in FIG. 5.

Figure 13:
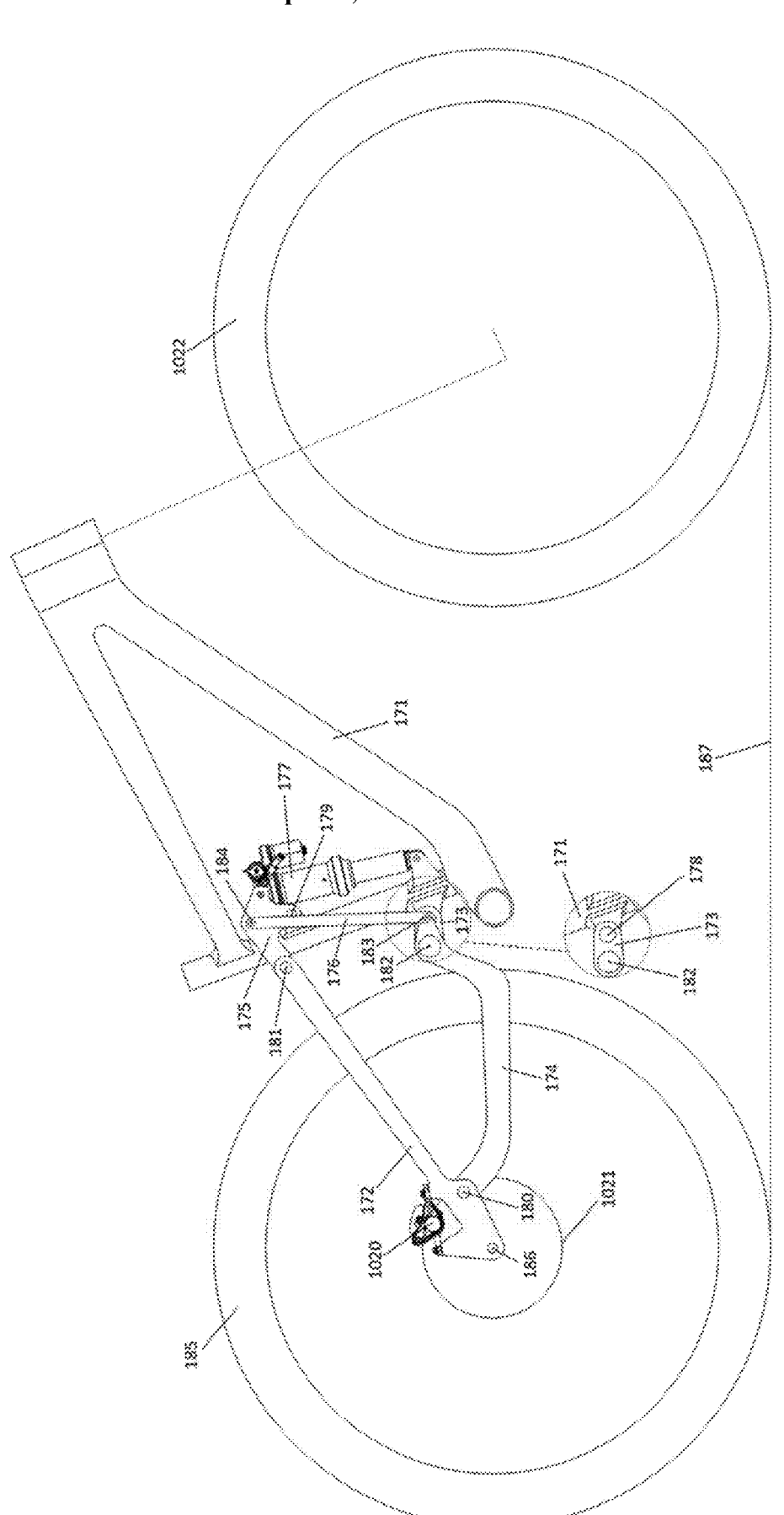
FIG. 13 shows an additional embodiment of a 6-bar linkage of the disclosed suspension system in the extended state.

FIG. 13 shows an additional embodiment of a 6-bar linkage of the disclosed suspension system in the extended state. In this embodiment, a front suspended body 171 is the suspended body of the vehicle. Seat-stay 172 is a dynamic body (DB), comprising both a wheel carrier and a brake carrier. Brake caliper 1020 is operatively connected to seatstay 172 in this embodiment. Note that in other embodiments 172 maybe be a wheel carrier only, a brake carrier only, or it can be a non-dynamic body. The seat-stay 120 comprises a driven wheel axis 186 that is operatively coupled to a driven wheel 185. The driven wheel 185 engages with the ground 187 in the extended state. Brake rotor 1021 is operatively connected to driven wheel 185 such that when the caliper is applied friction retards the rotation of the driven wheel 185. Front wheel 1022 is operatively connected to a fork which is operatively connected to suspension body 171. Preferably the front wheel is connected to the suspension body 171 via a front suspension. In accordance with one embodiment, a chain-stay 174 is connected to the seat-stay body 172, a lower link 173, and a middle link 176 via flexible joints. The lower link 173 is also operatively coupled to a suspended body 171 via a flexible joint. An upper link 175 is operatively coupled to the suspended body 171, the seat-stay 172 and the middle link 176 via flexible joints. A damper 177 is operatively coupled to two or more of the various link bodies. For example, the damper 177 is connected to the suspended body 171 and the upper link 175 via flexible joints. As mentioned, there are 15 IVCs in a 6-bar linkage. Seven of the 15 IVCs are shown in FIG. 13: SIVC[171][173] 178, SIVC[171][175] 179, IVC [172][174] 180, IVC[172][175] 181, IVC[173][174] 182, IVC[174][176] 183, and IVC[175][176] 184.

Figure 14:
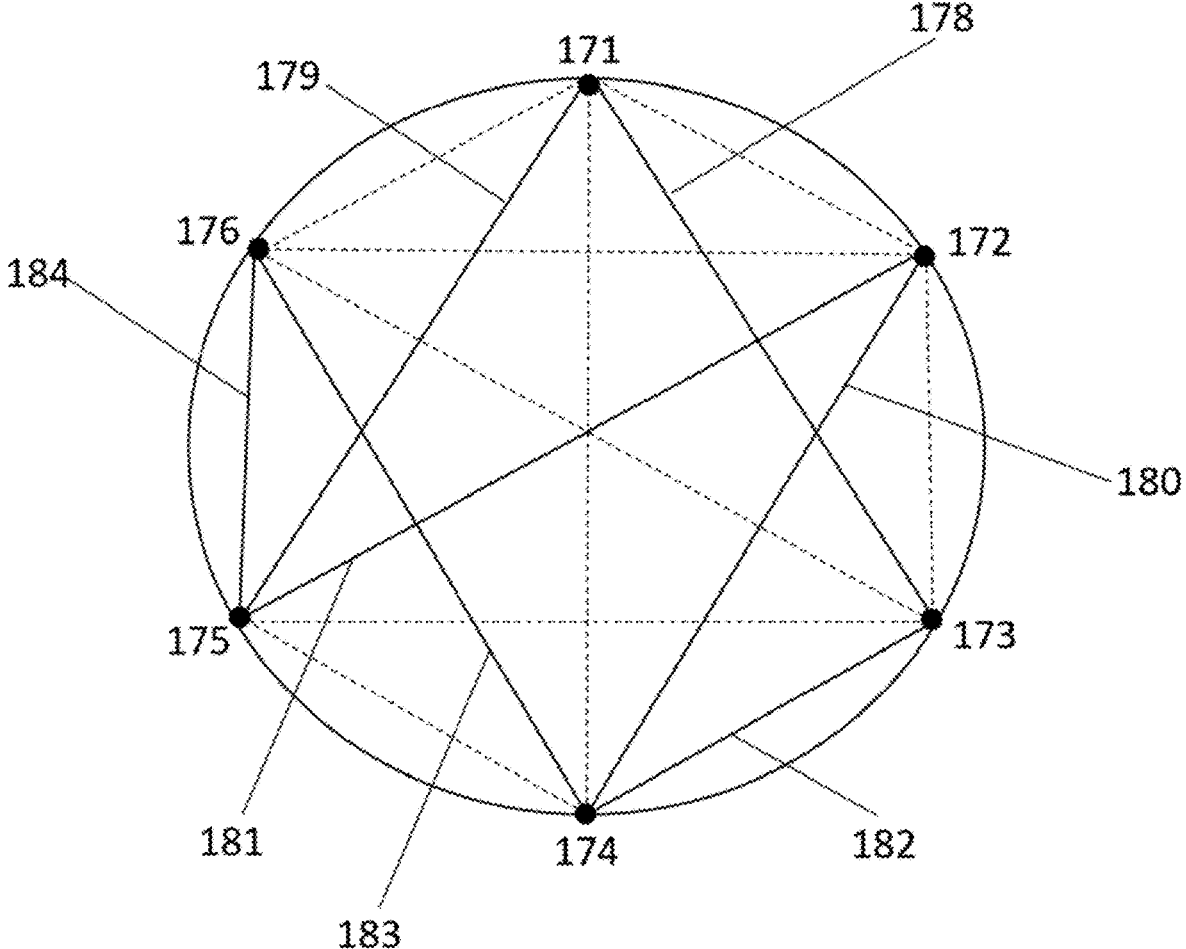
FIG. 14 is an analytical schematic representing the relationships between the various parts and IVCs of the suspension system of FIG. 13.

FIG. 14 is an analytical schematic representing the relationships between the various parts and IVCs of the suspension system of FIG. 13. The suspension body 171, seat-stay 172, lower link 173, chain-stay 174, upper link 175, and middle link 176 are represented by points along the circumference of the analytical schematic FIG. 14. Lines represent the 15 IVCs linking each part of the suspension system of FIG. 13. Solid lines show the known IVCs, SIVC[171][173] 178, SIVC[171][175] 179, IVC[172][174] 180, IVC[172] [175] 181, IVC[173][174] 182, IVC[174][176] 183, and IVC[175][176] 184, depicted in FIG. 13, while the dashed lines represent the unknown IVCs, DIVC[AD][171][172], IVC[171][174], IVC[171][176], IVC[172][173], IVC[172] [176], IVC[173][175], IVC[173][176], IVC[174][175], not shown in FIG. 13. The analytical schematic shows that there are two linkage bodies that are operatively coupled to suspended body 171: lower link 173 and upper link 175 because the solid lines in connection with the suspended body 171 are SIVC[171][173] 178 and SIVC[171][175] 179.

Similar to the processes discussed above, DIVC[AD] [171][172] is derived using more IVC relationships. Also, a change to the basic linkage layout can have a significant effect on IVC migration paths. This in effect gives rise to many more possible IVC migration paths as the suspension moves from a fully extended to a fully compressed state.

Initially, DIVC[AD][171][172] can be solved for using the analytical schematic of FIG. 14 and the same methodology previously disclosed. IVC migration plots or curves can be plotted graphically by solving for the IVC at each position between the extended and compressed suspension states. A position of the linkage in between the extended and compressed state is known as an intermediate state. The IVC migration curves depend upon the reference frame considered. The suspended body is fixed as the driven wheel moves from the extended to the compressed state.

Figure 15:
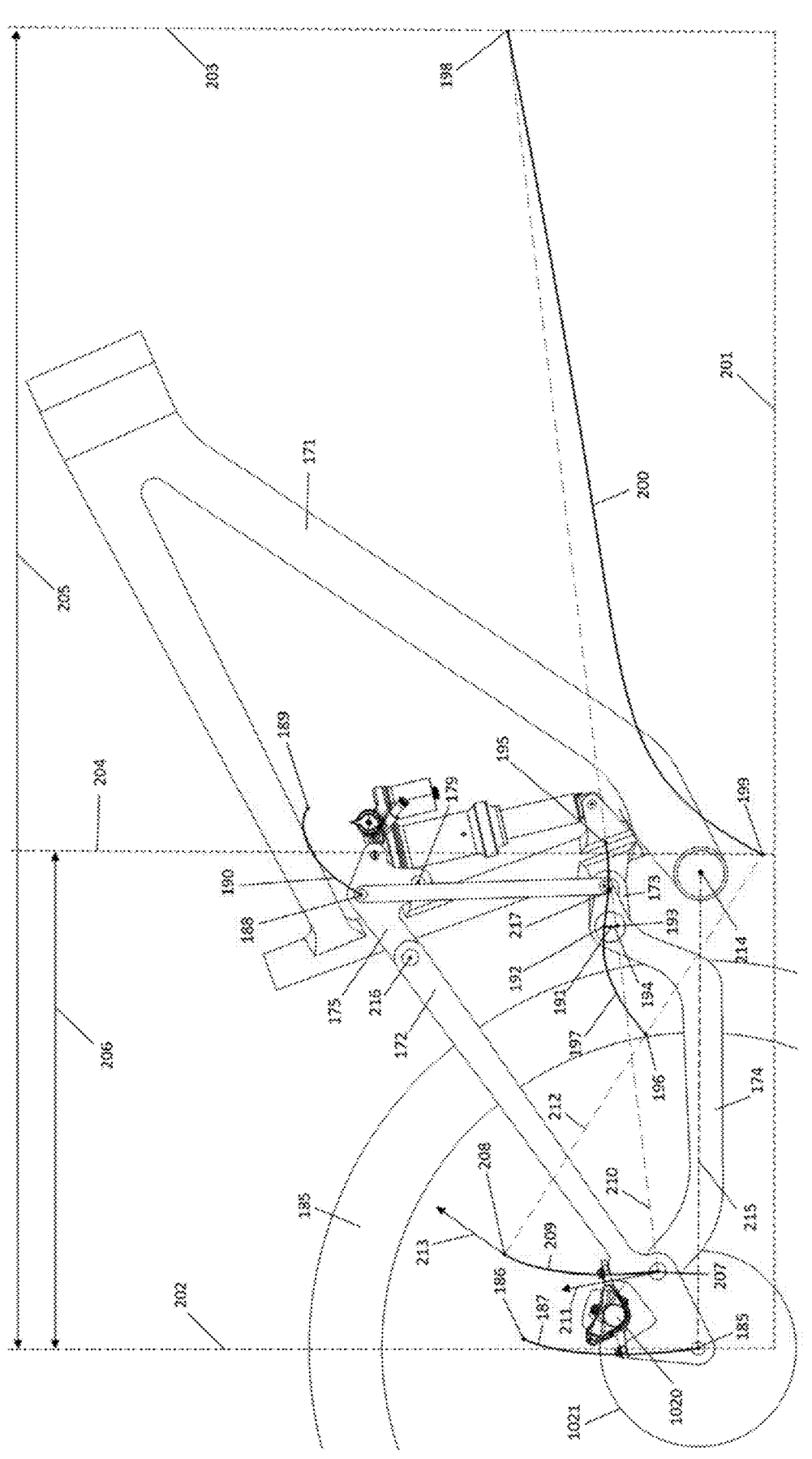
FIG. 15 shows a selected portion of the 15 IVC migration paths of the embodiment shown in FIG. 13.

FIG. 15 illustrates a selected portion of the 15 IVC migration paths of the embodiment shown in FIG. 13. Note that not all IVCs or IVC migrations are shown for clarity of the figure. As shown in FIG. 15, the various parts and IVCs of the suspension system may be located at different positions in the system depending on the state of the system. In various examples, the driven wheel axis may be located at different positions along the driven wheel axis migration path (DWAP) 187, which has a length DWAP[L]. In various examples, the driven wheel axis may be at the extended state position 185, at the compressed state position 186, or at any other position along the DWAP 187. In various examples, IVC[174][175] may be located at different positions along the IVC[174][175] migration path 190. In various examples, IVC[174][175] may be at the extended state position 188, at the compressed state position 189, or at any other position along the IVC[174][175] migration path 190. In various examples, IVC[173][174] may be located at different positions along the IVC[173][174] migration path 194. In various examples, IVC[173][174] may be at the extended state position 191, at the inflection point 192 of lower link 173, at the compressed state position 193, or at any other position along the IVC[173][174] migration path 194. In various examples, IVC[171][174] may be located at different positions along the IVC[171][174] migration path 197. In various examples, IVC[171][174] may be at the extended state position 195, at the compressed state position 196, or at any other position along the IVC[171][174] migration path 197. In various examples, DIVC[AD][171][172] may be located at different positions along the DIVC[AD][171][172] migration path 200. In various examples, DIVC[AD][171][172] may be at the extended state position 198, at the compressed state position 199, or at any other position along the DIVC [AD][171][172] migration path 200. FIG. 15 shows IVC [172][175] at the extended state 216 and SIVC[171][173] 217 at the extended state.

Several different relationships may exist between IVCs, as shown in FIG. 15. In various examples, IVC[172][174] may have different positional relationships relative to various IVCs. IVC[172][174] may be located at different positions along the IVC[172][174] migration path 209. In various examples, IVC[172][174] may be at the extended state position 207, at the compressed state position 208, or at any other position along the IVC[172][174] migration path 209. In various examples, the relationship between IVC[172] [174] at the extended state position 207 and DIVC[AD] [171][172] at the extended state position 198 is represented by extended IVC line IVC[E] 210. In various examples, IVC[172][174] extended tangent direction IVC[172][174] [ET] 211 may be coincident to IVC[172][174] at the extended state position 207 and perpendicular to IVC[E] 210. In various examples, the relationship between IVC [172][174] at the compressed state position 208 and DIVC [AD][171][172] at the compressed state position 199 is represented by compressed IVC line IVC[C] 212. In various examples, IVC[172][174] compressed tangent direction IVC[120][122][CT] 213 may be coincident to IVC[172] [174] at the compressed state position 208 and perpendicular to IVC[C] 212.

FIG. 15 also shows a relationship between the driven wheel axis at the extended state position 185 and the driving cog axis (DWDC) 214, represented by the driving wheel axis to driving cog axis (DWDC) line 215.

Several direction variables may exist within the suspension system depending on the system state. In various examples, base line 201 extends parallel to the ground at the extended state. Rear line 202 extends perpendicular to a rear end of base line 201 and intersects with driven wheel axis at the extended state position 185. Front line 203 extends perpendicular to a front end of base line 201 and intersects with DIVC[AD][171][172] may be at the extended state position 198. Middle line 204 extends perpendicular to a middle portion of base line 201 and intersects with DIVC [AD][171][172] at the compressed state position 199. DIVC extended direction variable (DIVC[EDV]) 205 extends between rear line 202 and front line 203. DIVC compressed direction variable (DIVC[CDV]) 206 extends between rear line 202 and middle line 204.

Motions related to inflection point 192 of lower link 173 may be analyzed as the suspension is moved from the extended to the compressed state. In various examples, IVC[173][174] migration path 194 may be analyzed. IVC [173][174] migration path 194 reverses as the suspension moves from the extended state at least partially to the compressed state. In another example, this behavior may be visualized by analyzing the IVC[171][174] migration path 197 in comparison to migration path IVC[173][174] 194. When the suspension is in the extended state, IVC[171] [174] at the extended state position 195 is not coincident to inflection point 192. As the suspension moves towards the compressed state, IVC[173][174] moves from the extended state position 191 towards the inflection point 192 along IVC[173][174] migration path 194. At a point between the driven wheel axis at the extended state position 185 and at the compressed state position 186, IVC[171][174] migration path 197 intersects IVC[173][174] migration path 194 at inflection point 192. As the suspension continues to move towards the compressed state, IVC[173][174] moves from the inflection point 192 towards the compressed state position 193 along IVC[173][174] migration path 194.

The 15 IVC migrations paths can be variously related. For example, IVC[173][174] migration path 194 ultimately affects DIVC[AD][171][172] migration path 200. DIVC [AD][171][172] migration path 200 is such that the rearward path at the extended state improves the suspension's ability to absorb bumps and is characteristic of providing a higher anti-squat percentage for pedaling efficiency in the beginning of the travel. The reduced rearward path at the compressed state minimizes the amount of feedback the chain or belt directs to the suspended body. This is characteristic of providing a lower anti-squat percentage to minimize the anti-squat force where bump absorption takes precedence. Thus, suspension performance may be improved through the interrelationship between the 15 IVC migration paths.

It is contemplated that the relationships between the parts, IVCs, and IVC migration paths of the suspension system of the embodiment shown in FIG. 15 will vary depending on the type of vehicle. For example, for a motorized vehicle or a motor assisted vehicle with the motor mounted to the suspended body, or a human powered vehicle with a gearbox mounted to the suspended body, there is limited space for linkage bodies near the driving cog axis compared to a typical human powered bicycle. The vertical position of the DIVC migration path with respect to the ground has a large influence on the rearward extended and compressed tangent directions and the anti-squat response curve magnitude. The specific path of the DIVC has a large influence on the form of the anti-squat response curve. The vertical position of SIVC[171][173] 217 and IVC[173][174] 191 with respect to the ground at the extended state greatly influence the vertical position of DIVC[AD][171][172] migration path 200 with respect to the ground. However, these may not be easily located near the driving cog axis 214 due to the large motor or gearbox envelope.

With the disclosed suspension linkage, the vertical location of IVC[172][174] 207 at the extended state also greatly influences the vertical position of DIVC[AD][171][172]

migration path 200. Due to the large number of IVCs (15) compared to (6) with a 4-bar linkage and the inherent adjustability of the system, the vertical location of IVC[172] [174] 207 at the extended state can be modified with minimal influence on the form of DIVC[AD][171][172] migration path 200. In other words, the magnitude of the anti-squat response curve can be adjusted or scaled while the general form of the anti-squat response curve is preserved. This is not typical with other systems, particularly those with non-linear anti-squat response curves. The position of IVC [172][174] 207 at the extended state can be adjusted to finely tune the anti-squat magnitude despite limited options to locate SIVC[171][173] 217 and IVC[173][174] 191 at the extended state. Therefore, there is a lesser dependency between the position of SIVC[171][173] 217 and IVC[173] [174] 191 at the extended state, resulting in the ability to more finely tune the suspension performance.

In other systems, placing the SIVC outside of the motor or gearbox envelope results in limited suspension performance. For instance, placing the SIVC behind the motor or gearbox envelope often results in a longer distance between driving cog axis 214 and driven wheel axis 185 which inhibits the agility of the vehicle, or a low anti-squat response which decreases pedaling efficiency. Placing the SIVC above the motor or gearbox envelope results in an increased rearward extended tangent direction resulting in a large amount of feedback that the driving force directs to the rider, or an anti-squat response that is too high resulting in decreased pedaling efficiency.

Several other configurations are contemplated that improve suspension performance accordingly. In one embodiment, IVC[172][174] 207 at the extended state is located above DWDC line 215 when the suspension is in its extended state as in FIG. 15. This configuration may be preferable with a motorized vehicle or a motor assisted vehicle with the motor mounted to the suspended body, or a human powered vehicle with a gearbox mounted to the suspended body, or a traditional human powered vehicle where the suspended body form limits linkage body clearance near the driving cog axis. In these cases, SIVC[171] [173] 217 and IVC[173][174] 191 can be placed outside the motor or gearbox or suspended body envelope while optimizing the anti-squat response curve magnitude and preserving its form. Chain or belt feedback to the rider, as well as the distance between driving cog axis 214 and driven wheel axis 185 for vehicle agility can also be optimized.

In another embodiment, IVC[172][174] 207 at the extended state is located on DWDC line 215. This configuration may be preferable with traditional human powered vehicles. It also may be preferable for a motorized vehicle or a motor assisted vehicle with a low-profile motor mounted to the suspended body, or a human powered vehicle with a low-profile gearbox mounted to the suspended body where linkage bodies may be placed closer to driving cog axis then with larger profile motors or gearboxes. In these cases, SIVC[171][173] 217 and IVC[173][174] 191 can be placed outside the motor or gearbox envelope or driving cog axis while optimizing the anti-squat response curve magnitude and preserving its form. Chain or belt feedback to the rider, as well as the distance between driving cog axis 214 and driven wheel axis 185 for vehicle agility can also be optimized. In another embodiment, IVC[172][174] 207 at the extended state is located below DWDC line 215. This configuration may be preferable with traditional human powered vehicles. Where linkage bodies may be placed closer to driving cog axis than with the use of motors or gearboxes. In these cases, SIVC[171][173] 217 and IVC

[173][174] 191 can be placed outside driving cog axis 214 while optimizing the anti-squat response curve magnitude and preserving its form. Chain or belt feedback to the rider, as well as the distance between driving cog axis 214 and driven wheel axis 185 for vehicle agility can also be optimized.

It is contemplated that the embodiment depicted in FIG. 15 may achieve similar suspension performance as the embodiments shown in FIGS. 5 and 12.

Figure 16A:
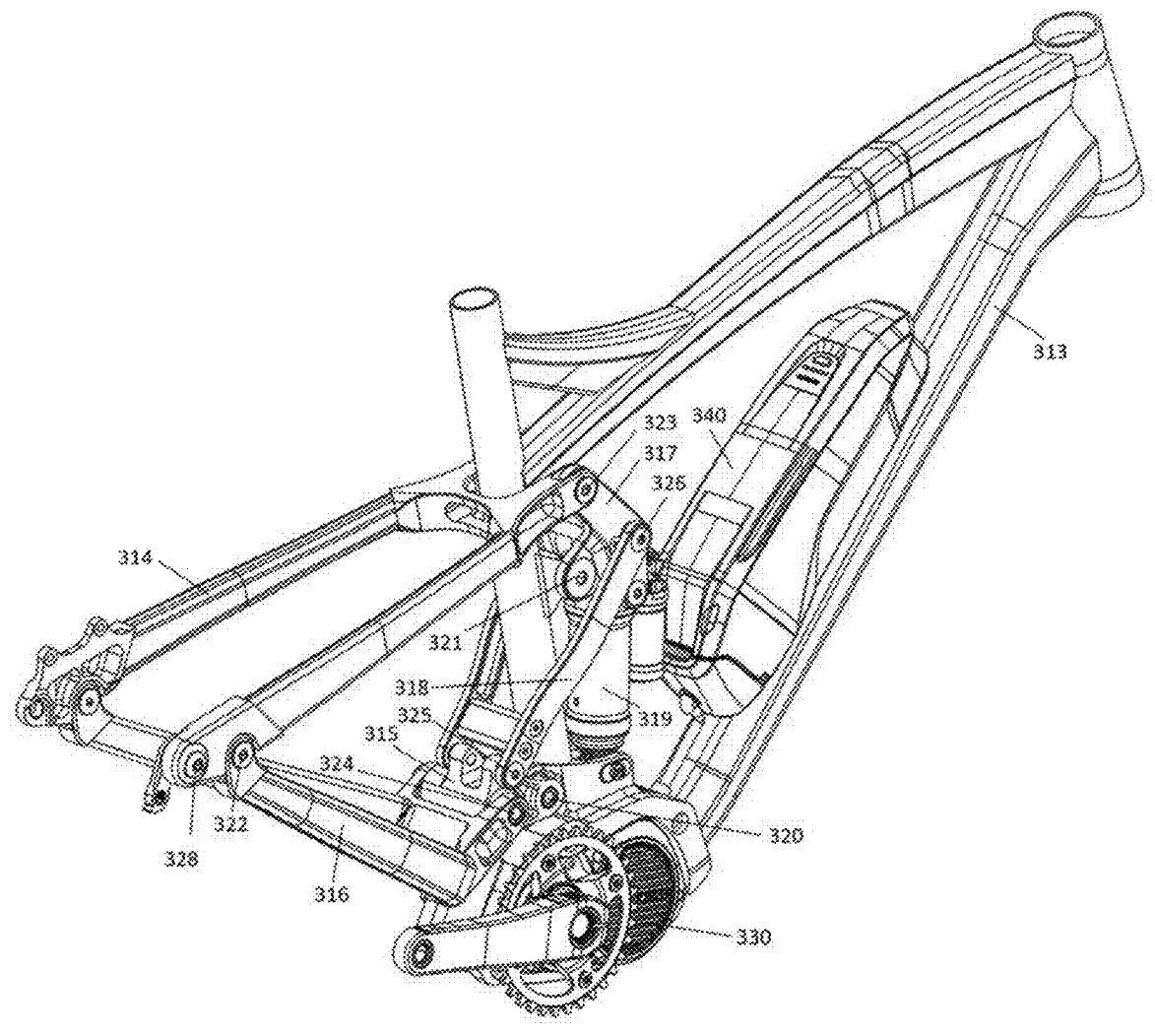
FIG. 16A-C show isometric and side views of an embodiment of the 6-bar linkage applied to a motor assisted bicycle frame.
Figure 16B:
Figure 16C:
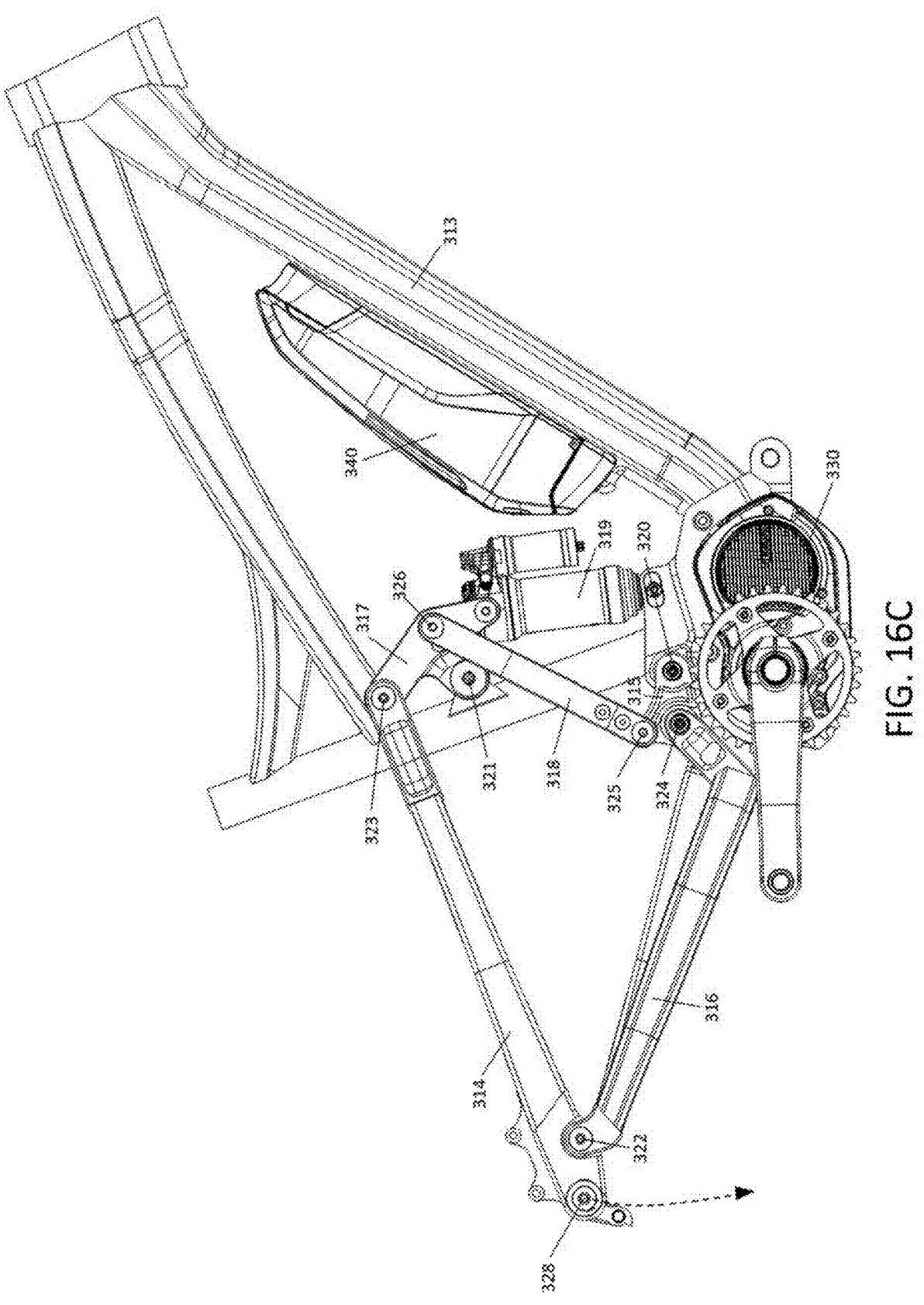

FIGS. 16A-16C variously illustrate examples of a bicycle with a motor assist to the human power. Such bicycles can benefit from the disclosure above with reference to the six-bar suspensions and the various configurations as described above. Consistent with the above embodiments, a suspension body 313, seat stay 314, chain stay 316, lower link 315, a center link 318, and an upper link 317 form the 6-bar linkage. These various links can include flexible joints/pivots similar to those discussed above with the joints establishing the known IVCs SIVC[313][315] 320, SIVC [313][317] 321, IVC[314][16] 322; IVC[314][17] 323, IVC [315][16] 324, IVC[315][318] 325, and IVC[317][318] 326. The unknown IVCs and the general configurations of each of the links relative to one another can similarly employ the various embodiments discussed above. Additionally, in these motor assist embodiments, the bicycles include a motor 330 that receive power from a battery 340. As discussed above, the location of the motor (e.g. with the crank) can lead to preferred linkage arrangements as discussed herein.

Figure 17A:
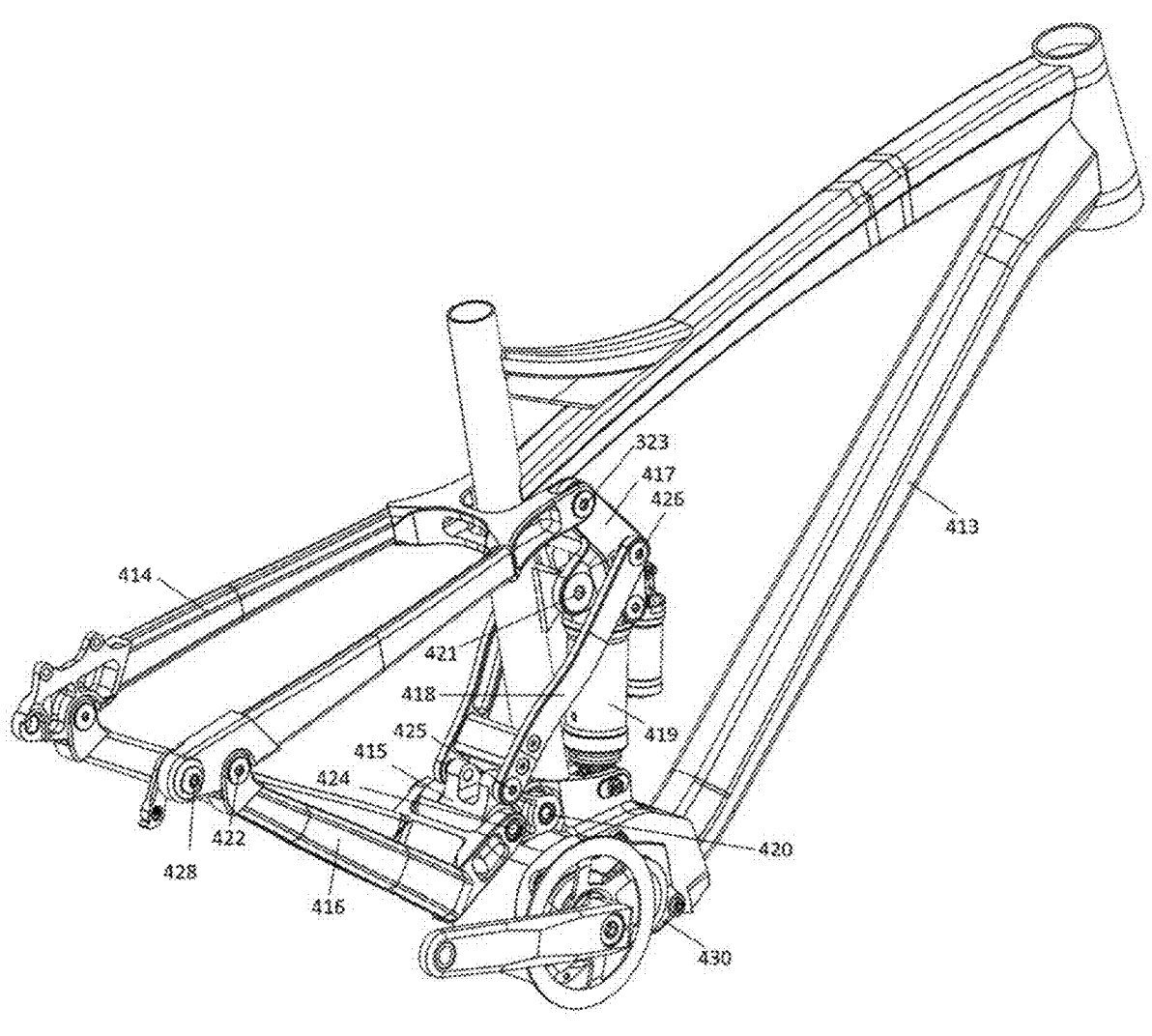
FIG. 17A-C show isometric and side views of an embodiment of the 6-bar linkage applied to a front internally geared bicycle frame.
Figure 17B:
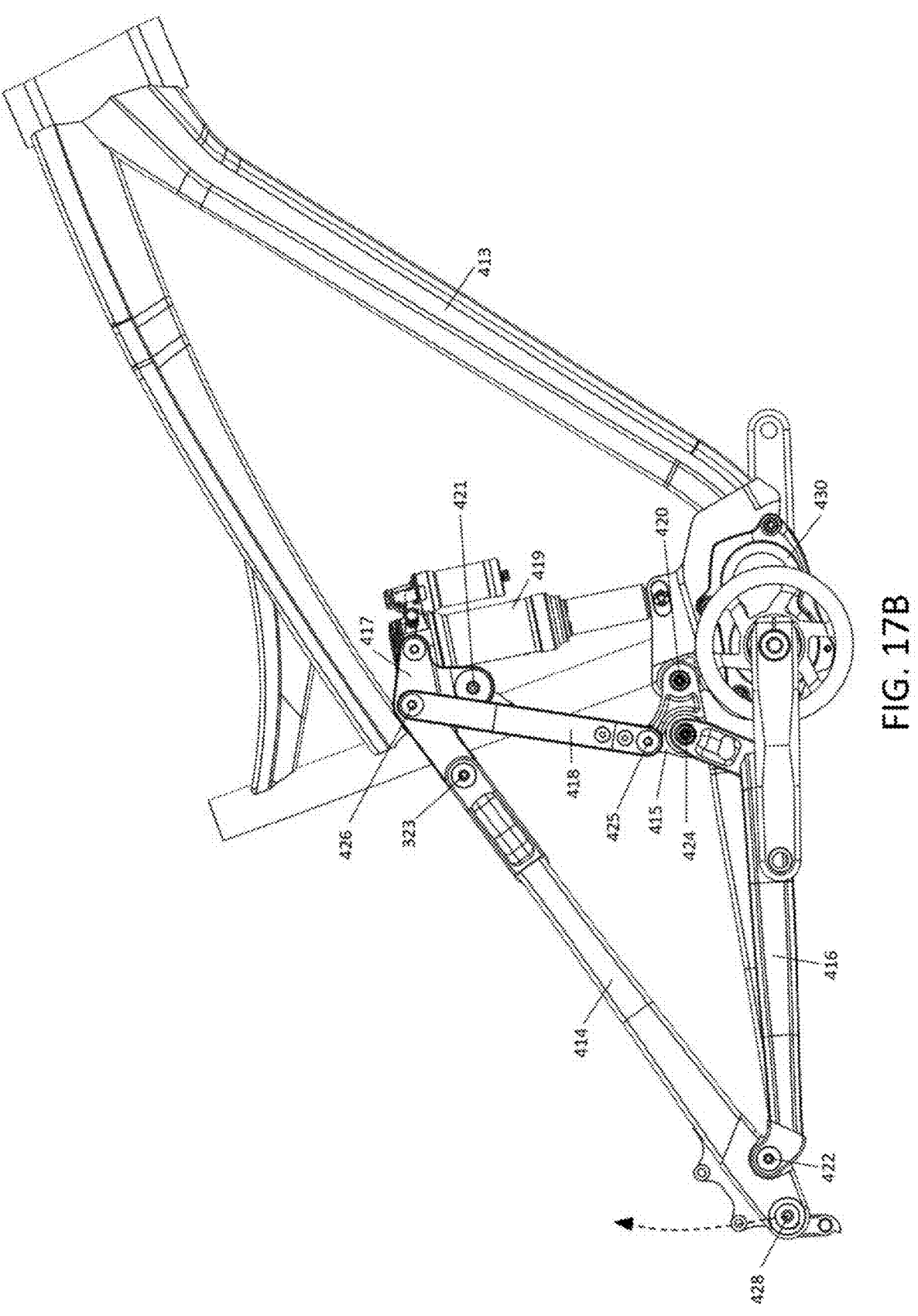
Figure 17C:
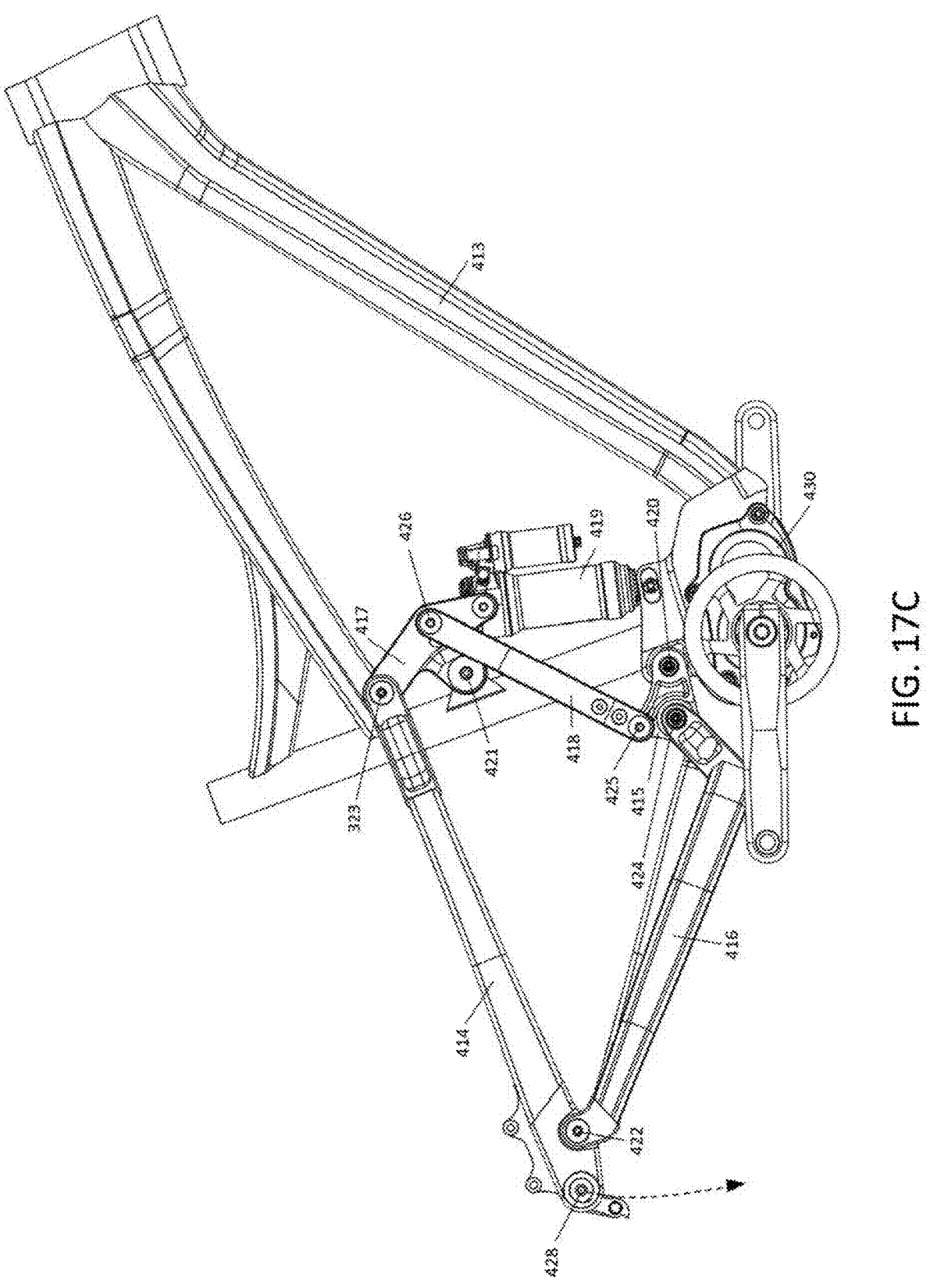

FIGS. 17A-17C variously illustrate examples of a bicycle with an internal gearbox drive coupled to the human powered crank. Such bicycles can benefit from the disclosure above with reference to the six-bar suspensions and the various configurations as described above. These various links can include flexible joints/pivots similar to those discussed above with the joints establishing the known IVCs SIVC[413][415] 420, SIVC[413][417] 421, IVC[414][16] 422; IVC[414][17] 423, IVC[415][16] 424, IVC[415][418] 425, and IVC[417][418] 426. The unknown IVCs and the general configurations of each of the links relative to one another can similarly employ the various embodiments discussed above. Additionally, in these internal gearbox embodiments, the bicycles include a gearbox 430 that receive power from the crank. As discussed above, the location of the gearbox placement can lead to preferred linkage arrangements as discussed herein.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. For example, while some embodiments specify particular relationships between parts of the system, other relationships are contemplated. It is also contemplated that steps to any disclosed method may be performed in any order. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A suspension linkage for two wheeled vehicles comprising:
a plurality of linkage bodies including:
a suspended body, a wheel carrier body, a third body, a fourth body, a fifth body, and a sixth body operatively coupled, wherein:
the fourth body is a chainstay body that includes a jointed connection to the wheel carrier body, and is pivotally connected at a concentric pivot to two others of the plurality of linkage bodies; and
a shock assembly configured to resist movement between the suspended body and at least one of the wheel carrier body, the third body, the fourth body, the fifth body, or the sixth body, wherein:
as the shock assembly moves in one direction between an extended state and a compressed state, a migration path of an instantaneous velocity center (IVC) of the concentric pivot reverses at an inflection point and a migration path of an IVC formed between the suspended body and the fourth body intersects the migration path of the IVC of the concentric pivot at the inflection point.

2. The suspension linkage of claim 1, wherein the fourth body is pivotally connected concentrically to the third body and the sixth body at the concentric pivot.

3. The suspension linkage of claim 1, wherein the wheel carrier body is a brake carrier body.

4. The suspension linkage of claim 1, wherein:
the third body (121) includes:
a jointed connection with the suspended body (119) defining an instantaneous velocity center (IVC) IVC [119][121] (126),
a jointed connection with the fourth body (122) defining an IVC[121][122] (130);
the fourth body (122) includes:
a jointed connection with the wheel carrier body (120) defining an IVC[120][122] (128);
the fifth body includes:
a jointed connection with the suspended body (119) defining an IVC[119][123] (127),
a jointed connection with the wheel carrier body defining an IVC[120][123] (129), and
a jointed connection with the sixth body defining an IVC[123][124] (131).

5. The suspension linkage of claim 4, wherein the wheel carrier body is a brake carrier body.

6. The suspension linkage of claim 1, wherein the jointed connection of the fourth body and the wheel carrier body is at a first end portion of the fourth body, and the concentric pivot is at a second end portion of the fourth body opposite the first end portion.

7. A suspension linkage for two wheeled vehicles comprising:
a plurality of operably coupled link bodies including a suspended body, a chainstay body, and a seatstay body, wherein the chainstay body includes a concentric pivot connection with at least two others of the plurality of link bodies, and wherein the chainstay body includes a jointed connection to the seatstay body; and
a shock assembly configured to resist a relative movement between the suspended body, and the chainstay body, wherein:
as the suspension linkage moves in one direction from an at least partially extended state to an at least partially compressed state, an axis at the concentric pivot connection follows a migration path that reverses at an inflection point and a migration path of an instantaneous velocity center formed between the suspended body and the chainstay body intersects the migration path of the axis of the concentric pivot at the inflection point.

8. The suspension linkage of claim 7, wherein the plurality of link bodies further includes a third link body and a fifth link body.

9. The suspension linkage of claim 8, wherein the plurality of link bodies further includes a sixth link body.

10. The suspension linkage of claim 9, wherein the shock assembly is pivotally connected between any two of the third link body, the fifth link body, the sixth link body, and the suspended body.

11. The suspension linkage of claim 8, wherein the shock assembly is pivotally connected between any two of the third link body, the fifth link body, and the suspended body.

12. The suspension linkage of claim 7, wherein:

the plurality of link bodies further includes a third link body, a fifth link body, and a sixth link body operatively coupled to one another and to the suspended body and the chainstay body.

13. The suspension linkage of claim 12, wherein the chainstay body is pivotally connected concentrically to the third link body and the sixth link body at the concentric pivot.

14. The suspension linkage of claim 12, wherein the chainstay body is a wheel carrier body and the seatstay body is a brake carrier body.

15. The suspension linkage of claim 12, wherein, an instantaneous velocity center (IVC) is defined at the axis.

16. The suspension linkage of claim 12, wherein the jointed connection between the chainstay body and the seatstay body is at a first end portion of the chainstay body, and the pivotal connection between the chainstay body and the two other bodies is at a second end portion of the chainstay body opposite the first end portion.

17. A suspension linkage for two wheeled vehicles comprising:

a plurality of linkage bodies including:

a suspended body, a second body, a third body, a fourth body, a fifth body, and a sixth body operatively coupled to form a plurality of instantaneous velocity centers (IVCs), wherein:

the suspended body defines an IVC[119][122] with the fourth body and the suspended body includes:

a jointed connection with the third body defining an IVC[119][121], a jointed connection with the fifth body defining an IVC[119][123];

the second body defines an IVC[120][124] with the sixth body, the second body is a seat-stay, and the second body includes:

a jointed connection with the fourth body defining an IVC[120][122], wherein the fourth body is a chain-stay, a jointed connection with the fifth body defining an IVC[120][123], the third body defines an IVC[121][124] with the sixth body and the third body includes:

a jointed connection with the fourth body defining an IVC[121][122], the fourth body defines an IVC[122][124] with the sixth body; and the fifth body includes a jointed connection with the sixth body defining an IVC[123][124], wherein at least one of the IVC[119][122], the IVC[120][124], the IVC[121][124], or the IVC[122][124] is a hidden IVC the IVC[121][122], the IVC[121][124], and the IVC[122][124] define respective migration paths that reverse at respective inflection points as the suspension linkage moves in a single direction between an extended state and a compressed state and a migration path of the IVC[119][122] intersects the respective migration paths of the IVC[121][122], the IVC[121][124], and the IVC[122][124] at the respective inflection points.

18. The suspension linkage of claim 17, wherein:

the third body (121) includes:

a jointed connection with the suspended body (119) defining an IVC[119][121]-(126), a jointed connection with the fourth body (122) defining an IVC[121][122] (130), and a jointed connection with the sixth body (124) defining an IVC[121][124] (130);

the fourth body (122) includes:

a jointed connection with a brake carrier body (120) defining an IVC[119][122] (128), and a jointed connection with the sixth body (124) defining an IVC[122][124] (130);

the fifth body (123) includes:

a jointed connection with the suspended body (119) defining an IVC[119][123] (127), a jointed connection with the brake carrier body (120) defining an IVC[120][123] (129), and a jointed connection with the sixth body (124) defining an IVC[123][124] (131), wherein the IVC[121][122] (130), the IVC[121][124] (130), and the IVC[122][124] (130) define an IVC group wherein each of the IVCs in the IVC group stays within about a distance of 5 mm to at least one other IVC in the IVC group as the suspension linkage moves between the-extended state and the compressed state.

19. The suspension linkage of claim 18, wherein the IVC[121][122], the IVC[121][124] and the IVC[122][124] are substantially the same IVC as one another as the suspension linkage moves between the extended state and the compressed state.

20. The suspension linkage of claim 18, wherein:

as the suspension linkage moves between the extended state and the compressed state there is relative motion between:

the third body (121) and the fourth body (122), the third body (121) and the sixth body (124), and the fourth body (122) and the sixth body (124).

21. A suspension linkage for two wheeled vehicles comprising:

a plurality of linkage bodies including:

a suspended body, a wheel carrier body, a third body, a fourth body, a fifth body, and a sixth body operatively coupled defining at least eight primary instantaneous velocity centers, wherein:

at least three primary instantaneous velocity centers (IVCs) are defined at a concentric pivot; and a shock assembly configured to resist movement between the suspended body and at least one of the wheel carrier body, the third body, the fourth body, the fifth body, or the sixth body, wherein:

as the shock assembly moves in one direction between an extended state and a compressed state, a migration path of at least one of the eight primary IVCs reverses at an inflection point and a migration path of an IVC formed between the suspended body and the wheel carrier body intersects the migration path of the at least one of the eight primary IVCs of the concentric pivot at the inflection point.

\* \* \* \* \*